United States Patent
Maragoudakis

(10) Patent No.: US 10,856,152 B2
(45) Date of Patent: *Dec. 1, 2020

(54) CONTROLLING ACCESS TO PROTECTED FUNCTIONALITY OF A HOST DEVICE USING A WIRELESS DEVICE

(71) Applicant: Apple Inc., Cupertino, CA (US)

(72) Inventor: Zachary Maragoudakis, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/777,652

(22) Filed: Jan. 30, 2020

(65) Prior Publication Data

US 2020/0196151 A1     Jun. 18, 2020

Related U.S. Application Data

(63) Continuation of application No. 16/036,658, filed on Jul. 16, 2018, now Pat. No. 10,555,175, which is a (Continued)

(51) Int. Cl.
*H04M 1/66* (2006.01)
*H04W 12/08* (2009.01)
(Continued)

(52) U.S. Cl.
CPC ............ *H04W 12/08* (2013.01); *H04B 1/385* (2013.01); *H04L 63/0853* (2013.01);
(Continued)

(58) Field of Classification Search
CPC ......... H04M 1/72519; H04M 1/72583; H04M 1/72522; H04M 1/72547; H04M 1/0214;
(Continued)

(56) References Cited

U.S. PATENT DOCUMENTS 5,797,031 A    8/1998  Shapiro et al.
8,023,895 B2   9/2011  Smith
(Continued)

FOREIGN PATENT DOCUMENTS

WO    2014/143843 A1    9/2014

OTHER PUBLICATIONS

"Notice of Allowance," dated Jul. 5, 2019 in U.S. Appl. No. 16/265,824. 5 pages. (copy not provided).
(Continued)

*Primary Examiner* — Temica M Beamer
(74) *Attorney, Agent, or Firm* — Kilpatrick, Townsend & Stockton

(57) ABSTRACT

A wearable device can establish a verified session with a host device (e.g., by establishing that the wearable device is present in the vicinity of the host device and is currently being worn). The existence of such a verified session can be used to control user access to sensitive information that may be stored in or otherwise accessible to a host device. For example, the host device and/or application programs executing thereon can be configured to restrict a user's ability to invoke program functionality that accesses sensitive information based on whether a verified session with a wearable device is currently in progress.

20 Claims, 24 Drawing Sheets

Related U.S. Application Data continuation of application No. 15/706,549, filed on Sep. 15, 2017, now Pat. No. 10,039,003, which is a continuation of application No. 14/774,633, filed as application No. PCT/US2014/027989 on Mar. 14, 2014, now abandoned, which is a continuation of application No. PCT/US2013/032550, filed on Mar. 15, 2013.

(51) Int. Cl.

| | | |
|---|---|---|
| *H04M 1/67* | (2006.01) | |
| *H04M 1/725* | (2006.01) | |
| *H04W 12/00* | (2009.01) | |
| *H04W 4/80* | (2018.01) | |
| *H04L 29/06* | (2006.01) | |
| *H04W 12/06* | (2009.01) | |
| *H04B 1/3827* | (2015.01) | |
| *H04W 12/02* | (2009.01) | |
| *H04W 12/04* | (2009.01) | |

(52) U.S. Cl.
CPC .......... *H04L 63/107* (2013.01); *H04M 1/67* (2013.01); *H04M 1/7253* (2013.01); *H04M 1/72519* (2013.01); *H04W 4/80* (2018.02); *H04W 12/003* (2019.01); *H04W 12/02* (2013.01); *H04W 12/04* (2013.01); *H04W 12/06* (2013.01); *H04B 2001/3861* (2013.01); *H04M 1/72569* (2013.01); *H04M 2250/02* (2013.01); *H04M 2250/12* (2013.01)

(58) Field of Classification Search
CPC .......... H04W 52/02; H04W 52/0229; H04W 52/0225; H04W 52/028
USPC ....................... 455/566, 90.3, 574
See application file for complete search history.

(56) References Cited

U.S. PATENT DOCUMENTS

| | | |
|---|---|---|
| 8,370,431 B1 | 2/2013 | Wang et al. |
| 8,370,432 B2 | 2/2013 | Digate et al. |
| 10,039,206 B1 | 7/2018 | Wishman et al. |
| 10,440,578 B2 | 10/2019 | Maragoudakis |
| 2003/0108009 A1 | 6/2003 | Petersen |
| 2005/0221798 A1 | 10/2005 | Sengupta et al. |
| 2006/0189382 A1 | 8/2006 | Muir et al. |
| 2009/0195497 A1* | 8/2009 | Fitzgerald ............. G06F 1/3203 345/156 |
| 2009/0239591 A1* | 9/2009 | Alameh .................. H04M 1/05 455/574 |
| 2012/0015629 A1 | 1/2012 | Olsen et al. |
| 2012/0017084 A1 | 1/2012 | Hutton |
| 2012/0041767 A1 | 2/2012 | Hoffman et al. |
| 2012/0206335 A1 | 8/2012 | Osterhout et al. |
| 2012/0254290 A1 | 10/2012 | Naaman |
| 2014/0337621 A1 | 11/2014 | Nakhimov |
| 2016/0037345 A1 | 2/2016 | Margadoudakis |
| 2016/0087933 A1 | 3/2016 | Johnson et al. |
| 2018/0007558 A1 | 1/2018 | Maragoudakis |

OTHER PUBLICATIONS

"Non-Final Office Action," dated Mar. 8, 2019 in U.S. Appl. No. 16/265,824. 7 pages. (copy not provided).

"Notice of Allowance," dated Sep. 25, 2019 in U.S. Appl. No. 16/036,658. 7 pages. (copy not included).

"Notice of Allowance," dated Jul. 10, 2019 in U.S. Appl. No. 16/036,658. 7 pages. (copy not included).

"Non-Final Office Action," dated Oct. 9, 2018 in U.S. Appl. No. 16/036,658. 4 pages. (copy not included).

"Final Office Action," dated Jul. 16, 2018 in U.S. Appl. No. 16/036,658. 7 pages. (copy not included).

"Notice of Allowance," dated Mar. 30, 2018 in U.S. Appl. No. 15/706,549. 10 pages. (copy not included).

"Non-Final Office Action," dated Oct. 10, 2017 in U.S. Appl. No. 15/706,549. 6 pages. (copy not included).

"Notice of Allowance," dated Jun. 19, 2017 in U.S. Appl. No. 14/774,633. 5 pages. (copy not included).

"Non-Final Office Action," dated Nov. 18, 2016 in U.S. Appl. No. 14/774,633. 13 pages. (copy not included).

"International Search Report and Written Opinion," dated Dec. 18, 2013 in International Application No. PCT/US2013/032550. 11 pages.

"International Search Report and Written Opinion," dated Sep. 24, 2015 in International Application No. PCT/US2014/027989. 10 pages.

"International Search Report and Written Opinion," dated Aug. 21, 2014 in International Application No. PCT/US2014/027989. 11 pages.

\* cited by examiner

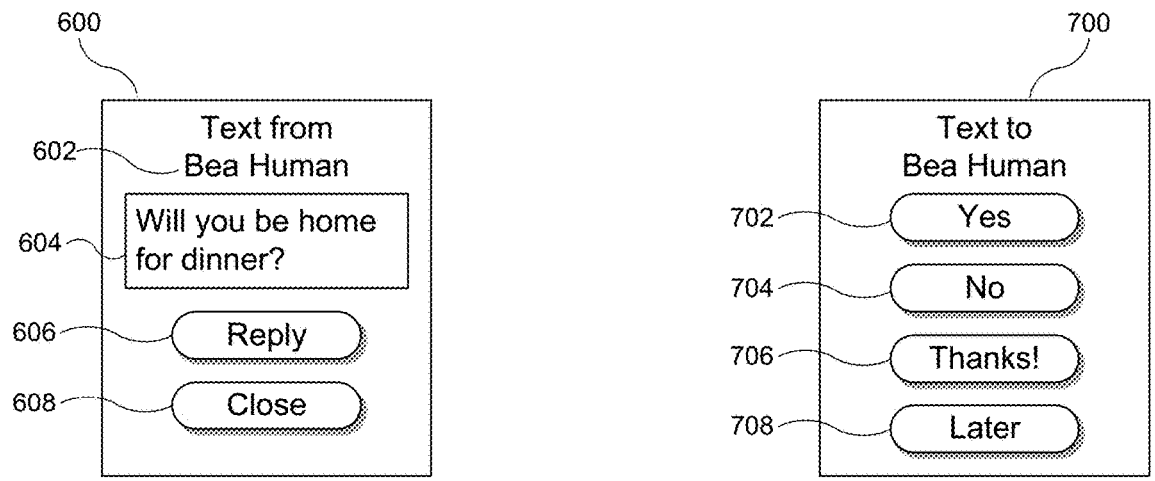
FIG. 6
FIG. 7
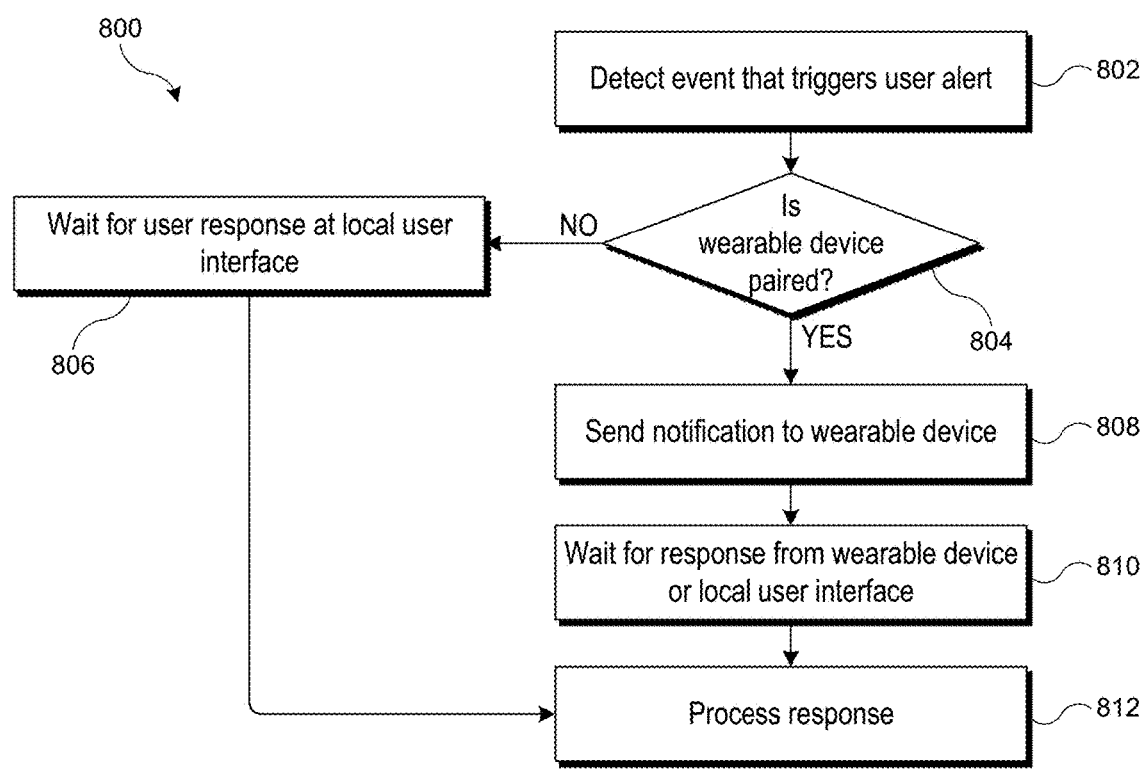
FIG. 8

CONTROLLING ACCESS TO PROTECTED FUNCTIONALITY OF A HOST DEVICE USING A WIRELESS DEVICE

CROSS-REFERENCE TO RELATED APPLICATIONS

This application is a continuation of and claims priority to U.S. patent application Ser. No. 16/036,658 (will issue as U.S. Pat. No. 10,555,175 on Feb. 4, 2020), filed Jul. 16, 2018, entitled, "CONTROLLING ACCESS TO PROTECTED FUNCTIONALITY OF A HOST DEVICE USING A WIRELESS DEVICE," which is a continuation of U.S. patent application Ser. No. 15/706,549 (now U.S. Pat. No. 10,039,003), filed Sep. 15, 2017, entitled "CONTROLLING ACCESS TO PROTECTED FUNCTIONALITY OF A HOST DEVICE USING A WIRELESS DEVICE," which is a continuation of U.S. patent application Ser. No. 14/774,633, filed Sep. 10, 2015, entitled "CONTROLLING ACCESS TO PROTECTED FUNCTIONALITY OF A HOST DEVICE USING A WIRELESS DEVICE," which is a U.S. National Phase under 35 USC 371 of PCT Application No. PCT/US14/27989 filed Mar. 14, 2014, entitled "CONTROLLING ACCESS TO PROTECTED FUNCTIONALITY OF A HOST DEVICE USING A WIRELESS DEVICE," which is a continuation of International Application No. PCT/US13/32550 filed Mar. 15, 2013, entitled "CONTROLLING ACCESS TO PROTECTED FUNCTIONALITY OF A HOST DEVICE USING A WIRELESS DEVICE," the disclosures of which are incorporated herein by reference in their entirety.

BACKGROUND

The present disclosure relates generally to wireless electronic devices and in particular to controlling access to protected functionality of a host device using a wireless device.

Mobile electronic devices, such as mobile phones, smart phones, tablet computers, media players, and the like, have become quite popular. Many users carry a device almost everywhere they go and use their devices for a variety of purposes, including making and receiving phone calls, sending and receiving text messages and emails, navigation (e.g., using maps and/or a GPS receiver), purchasing items in stores (e.g., using contactless payment systems), and/or accessing the Internet (e.g., to look up information).

However, a user's mobile device is not always readily accessible. For instance, when a mobile device receives a phone call, the device may be in a user's bag or pocket, and the user may be walking, driving, carrying something, or involved in other activity that makes it inconvenient or impossible for the user to reach into the bag or pocket to find the device.

SUMMARY

Certain embodiments of the present invention relate to wearable electronic devices that can be connected (e.g., via wireless pairing) with another device (referred to herein as a "host device"), such as a smart phone, other mobile phone, tablet computer, media player, laptop computer, or the like. When paired, the wearable device can provide access to various functionalities of the host device.

Certain embodiments of the present invention pertain to systems and methods in which a wearable device can establish a verified session with a host device (e.g., by establishing that the wearable device is present in the vicinity of the host device and is currently being worn). The existence of such a verified session can be used to control user access to sensitive information that may be stored in or otherwise accessible to a host device. Sensitive information can include, for example, personal information such as financial account numbers or records, medical records, confidential business documents such as business plans or trade secrets, and any other type of information that may be subject to access restrictions. A host device can execute various application programs (also referred to as "apps") that provide access to sensitive information. The host device and/or the application programs themselves can be configured (e.g., via suitable program code) to restrict a user's ability to invoke program functionality that accesses sensitive information based on whether a verified session with a wearable device is currently in progress.

For example, the host device can maintain information (metadata) identifying an app as "protected," e.g., because the app can provide access to sensitive information. In response to a request to initiate execution of the app (also referred to as "launching" the app), the host device can confirm the verified session with the wearable device (e.g., as described above) and launch the app only if the session is confirmed. Thus, access to an app can be restricted to instances where a wearable device is present and a verified session is in progress. In some cases, further restrictions can be applied; for example, that the user ID assigned to the wearable device matches a user ID associated with the host device.

As another example, an app may have a "public" mode and a "protected" mode of operation. The public mode can support a subset of app functionality that does not involve accessing sensitive information, while the protected mode can support additional functionality that may involve accessing sensitive data. For instance, a banking app may provide public-mode functions such as locating a nearby branch or obtaining general information about available services, which do not involve any particular customer's data and may be of interest to customers and non-customers alike. The same app may also provide protected-mode functions such as checking a specific customer's account balances, paying bills from the customer's account, transferring funds to another account, or the like; such functions do involve sensitive customer data and are not of (legitimate) interest to non-customers. Accordingly, the app can be launched in the public mode regardless of whether a verified session is in progress, while any transition to the protected mode (either upon launch or in response to subsequent user input) can be contingent on determining that a verified session is in progress. In some instances, an app can require both a verified session with a wearable device and user entry of a password or other credential as a condition of accessing protected functionality.

To the extent that the presence of the wearable device and/or the current existence of a verified session between the wearable device and a host device reliably indicates the presence of an authorized user, access restrictions of the kind described herein can help to protect sensitive information against unauthorized access.

In some embodiments, a verified session can be established between the host device and a wearable device. Establishing a verified session can include, for example, verifying that the wearable device is being worn, and a verified session can be terminated if the wearable device ceases to be worn. A host device can identify an application program to be launched and determine whether the application program has a protected mode (e.g., a mode that allows access to sensitive information such as financial records, medical records, government-issued identification records, business data, and so on). If the application program has a protected mode, the host device can determine whether the verified session between the host device and the wearable device is in progress and can launch the application program in the protected mode if the verified session is in progress. If the verified session is not in progress, the host device can launch the application in a public mode (e.g., a mode that does not allow access to sensitive information) or decline to launch the application (e.g., if the application does not have a public mode). In some embodiments, an application can have only a public mode, and the host device can launch such an application regardless of whether the verified session is in progress.

Various techniques can be used to determine whether a verified session between a host device and a wearable device is in progress. For example, a verified session can be considered as in progress so long as the wearable device remains in communication with the host device. In some embodiments, a specific proximity requirement (e.g., estimated distance between the devices being less than a threshold distance) can also be applied. In some embodiments, determining whether a verified session is in progress can include the host device sending a session confirmation request to the wearable device and determining whether a received response is valid. For example, the verified session can include a session key (e.g., a cryptographic key based on a shared secret between the host device and the wearable device), and the session confirmation request can include a random nonce generated by the host device. The wearable device can encrypt the nonce using the session key and return the encrypted nonce to the host device, which can decrypt the encrypted nonce and determine whether the decrypted nonce matches the nonce that was sent. Other information can also be exchanged and verified, such as a device identifier of the wearable device and/or an assigned user identifier of the wearable device.

In some embodiments, an executing application program can selectively enter a protected mode during execution. For example, an application program can receive a user request to invoke a functionality of the application program that is available only in a protected mode of the application. In response, the application program can determine whether a verified session between the host device and a wearable device is in progress (e.g., as described above) and can enter the protected mode in the event that the verified session is in progress. The application program can also impose other conditions on entering the protected mode. For example, the application program can prompt the user to enter a security credential for a user account accessible to the application and verify the security credential (e.g., by comparing to a locally-stored correct credential or by communicating with a remote server that stores the correct credential).

The following detailed description together with the accompanying drawings will provide a better understanding of the nature and advantages of the present invention.

BRIEF DESCRIPTION OF THE DRAWINGS

FIG. 6 illustrates another interface for alerting a user according to an embodiment of the present invention.

FIG. 7 illustrates a user interface for selecting a predefined message according to an embodiment of the present invention.

FIG. 8 is a flow diagram of a process for generating an event notification and receiving a response according to an embodiment of the present invention.

DETAILED DESCRIPTION

Certain embodiments of the present invention relate to wearable electronic devices that can be connected (e.g., via wireless pairing) with another device (referred to herein as a "host device"), such as a smart phone, other mobile phone, tablet computer, media player, laptop computer, or the like. When paired, the wearable device can provide access to various functionality of the host device.

In some embodiments, a wearable device can be operated by a user to respond to an event notification generated by a host device. The wearable device can receive a notification of the event from the host device and present the user with an alert and a prompt to respond. If the user responds to the prompt, the wearable device can transmit the response to the host device. For example, a user can respond to a phone call, text message, or other communication received at the host device.

In some embodiments, a wearable device can be operated by a user to initiate a functionality of a host device, independently of any prior event notification. For example, the wearable device can present a user interface via which the user can select a functionality to be invoked and further interfaces to control that functionality. Accordingly, a user can operate a wearable device to provide a phone number and instruct a host device to place a phone call to that number, or a user can operate a wearable device to send a text message to a specified recipient, or a user can operate a wearable device to control media playback and/or any other functionality available on a particular host device.

Figure 1:
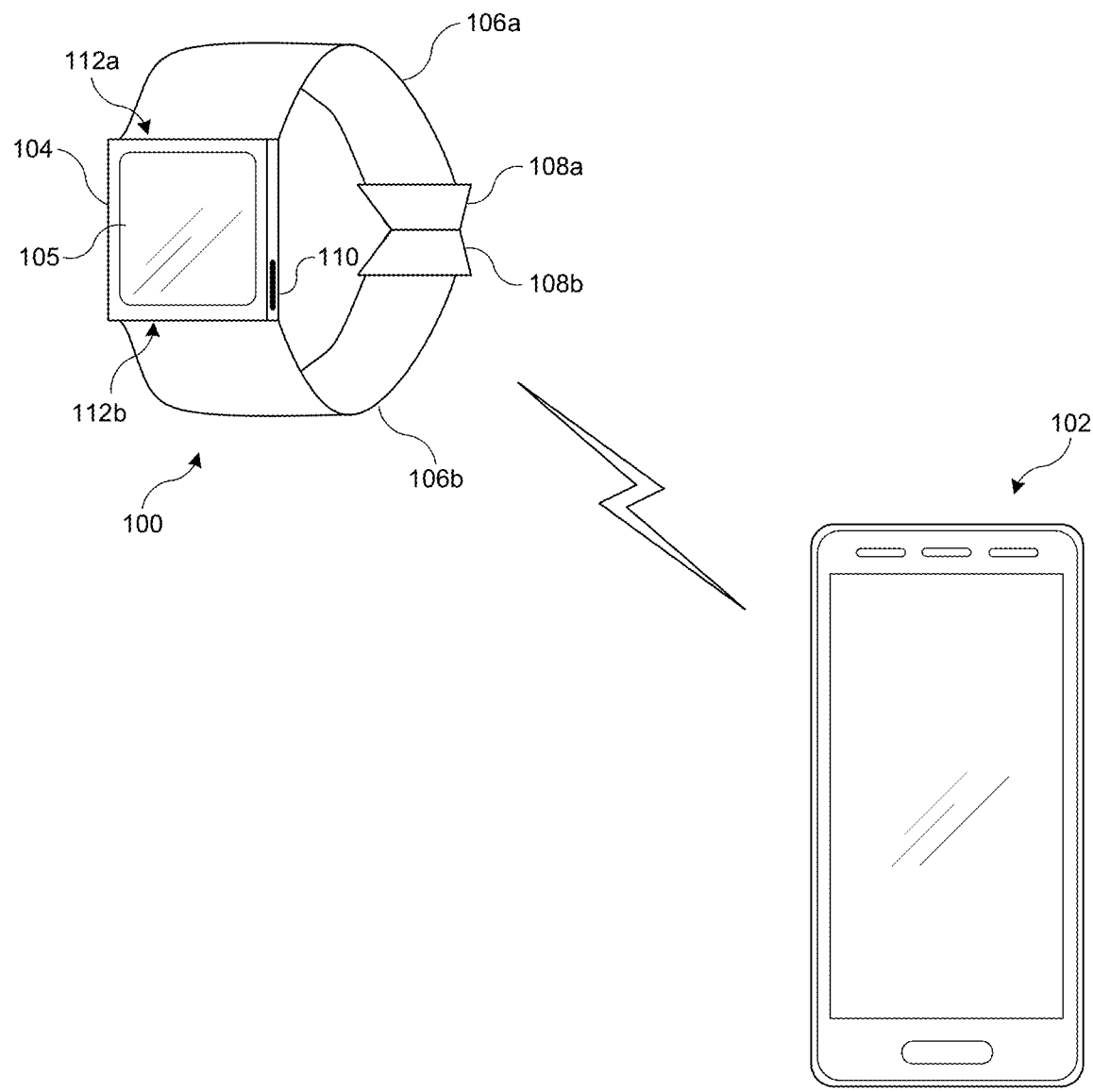
FIG. 1 shows a wearable device communicating wirelessly with a host device according to an embodiment of the present invention.

FIG. 1 shows a wearable device 100 communicating wirelessly with a host device 102 according to an embodiment of the present invention. In this example, wearable device 100 is shown as a wristwatch-like device with a face portion 104 connected to straps 106a, 106b.

Face portion 104 can include, e.g., a touchscreen display 105 that can be appropriately sized depending on where on a user's person wearable device 100 is intended to be worn. A user can view information presented by wearable device 100 on touchscreen display 105 and provide input to wearable device 100 by touching touchscreen display 105. In some embodiments, touchscreen display 105 can occupy most or all of the front surface of face portion 104.

Straps 106a, 106b can be provided to allow device 100 to be removably worn by a user, e.g., around the user's wrist. In some embodiments, straps 106a, 106b can be made of any flexible material (e.g., fabrics, flexible plastics, leather, chains or flexibly interleaved plates or links made of metal or other rigid materials) and can be connected to face portion 104, e.g., by hinges. Alternatively, straps 106a, 106b can be made of a rigid material, with one or more hinges positioned at the junction of face 104 and proximal ends 112a, 112b of straps 106a, 106b and/or elsewhere along the lengths of straps 106a, 106b to allow a user to put on and take off wearable device 100. Different portions of straps 106a, 106b can be made of different materials; for instance, flexible or expandable sections can alternate with rigid sections. In some embodiments, one or both of straps 106a, 106b can include removable sections, allowing wearable device 100 to be resized to accommodate a particular user's wrist size. In some embodiments, straps 106a, 106b can be portions of a continuous strap member that runs behind or through face portion 104. Face portion 104 can be detachable from straps 106a, 106b; permanently attached to straps 106a, 106b; or integrally formed with straps 106a, 106b.

The distal ends of straps 106a, 106b opposite face portion 104 can provide complementary clasp members 108a, 108b that can be engaged with each other to secure the distal ends of straps 106a, 106b to each other, forming a closed loop. In this manner, device 100 can be secured to a user's person, e.g., around the user's wrist; clasp members 108a, 108b can be subsequently disengaged to facilitate removal of device 100 from the user's person. The design of clasp members 108a, 108b can be varied; in various embodiments, clasp members 108a, 108b can include buckles, magnetic clasps, mechanical clasps, snap closures, etc. In some embodiments, one or both of clasp members 108a, 108b can be movable along at least a portion of the length of corresponding strap 106a, 106b, allowing wearable device 100 to be resized to accommodate a particular user's wrist size.

Straps 106a, 106b can be two distinct segments, or they can be formed as a continuous band of an elastic material (including, e.g., elastic fabrics, expandable metal links, or a combination of elastic and inelastic sections), allowing wearable device 100 to be put on and taken off by stretching a band formed straps 106a, 106b. In such embodiments, clasp members 108a, 108b can be omitted.

Straps 106a, 106b and/or clasp members 108a, 108b can include sensors that allow wearable device 100 to determine whether it is being worn at any given time. Wearable device 100 can operate differently depending on whether it is currently being worn or not. For example, wearable device 100 can inactivate various user interface and/or RF interface components when it is not being worn. In addition, in some embodiments, wearable device 100 can notify host device 102 when a user puts on or takes off wearable device 100.

Host device 102 can be any device that communicates with wearable device 100. In FIG. 1, host device 102 is shown as a smart phone; however, other host devices can be substituted, such as a tablet computer, a media player, any type of mobile phone, a laptop or desktop computer, or the like. Other examples of host devices can include point-of-sale terminals, security systems, environmental control systems, and so on. Host device 102 can communicate wirelessly with wearable device 100, e.g., using protocols such as Bluetooth or Wi-Fi. In some embodiments, wearable device 100 can include an electrical connector 110 that can be used to provide a wired connection to host device 102 and/or to other devices, e.g., by using suitable cables. For example, connector 110 can be used to connect to a power supply to charge an onboard battery of wearable device 100.

In some embodiments, wearable device 100 and host device 102 can interoperate to enhance functionality available on host device 102. For example, wearable device 100 and host device 102 can establish a pairing using a wireless communication technology such as Bluetooth. While the devices are paired, host device 102 can send notifications of selected events (e.g., receiving a phone call, text message, or email message) to wearable device 100, and wearable device 100 can present corresponding alerts to the user. Wearable device 100 can also provide an input interface via which a user can respond to an alert (e.g., to answer a phone call or reply to a text message). In some embodiments, wearable device 100 can also provide a user interface that allows a user to initiate an action on host device 102, such as placing a phone call, sending a text message, or controlling media playback operations of host device 102. Techniques described herein can be adapted to allow a wide range of host device functions to be enhanced by providing an interface via wearable device 100.

It will be appreciated that wearable device 100 and host device 102 are illustrative and that variations and modifications are possible. For example, wearable device 100 can be implemented in any wearable article, including a watch, a bracelet, a necklace, a ring, a belt, a jacket, or the like. In some instances, wearable device 100 can be a clip-on device or pin-on device that has a clip or pin portion that attaches to the user's clothing. The interface portion (including, e.g., touchscreen display 105) can be attached to the clip or pin portion by a retractable cord, and a user can easily pull touchscreen display 105 into view for use without removing the clip or pin portion, then let go to return wearable device 100 to its resting location. Thus, a user can wear device 100 in any convenient location.

Figure 2:
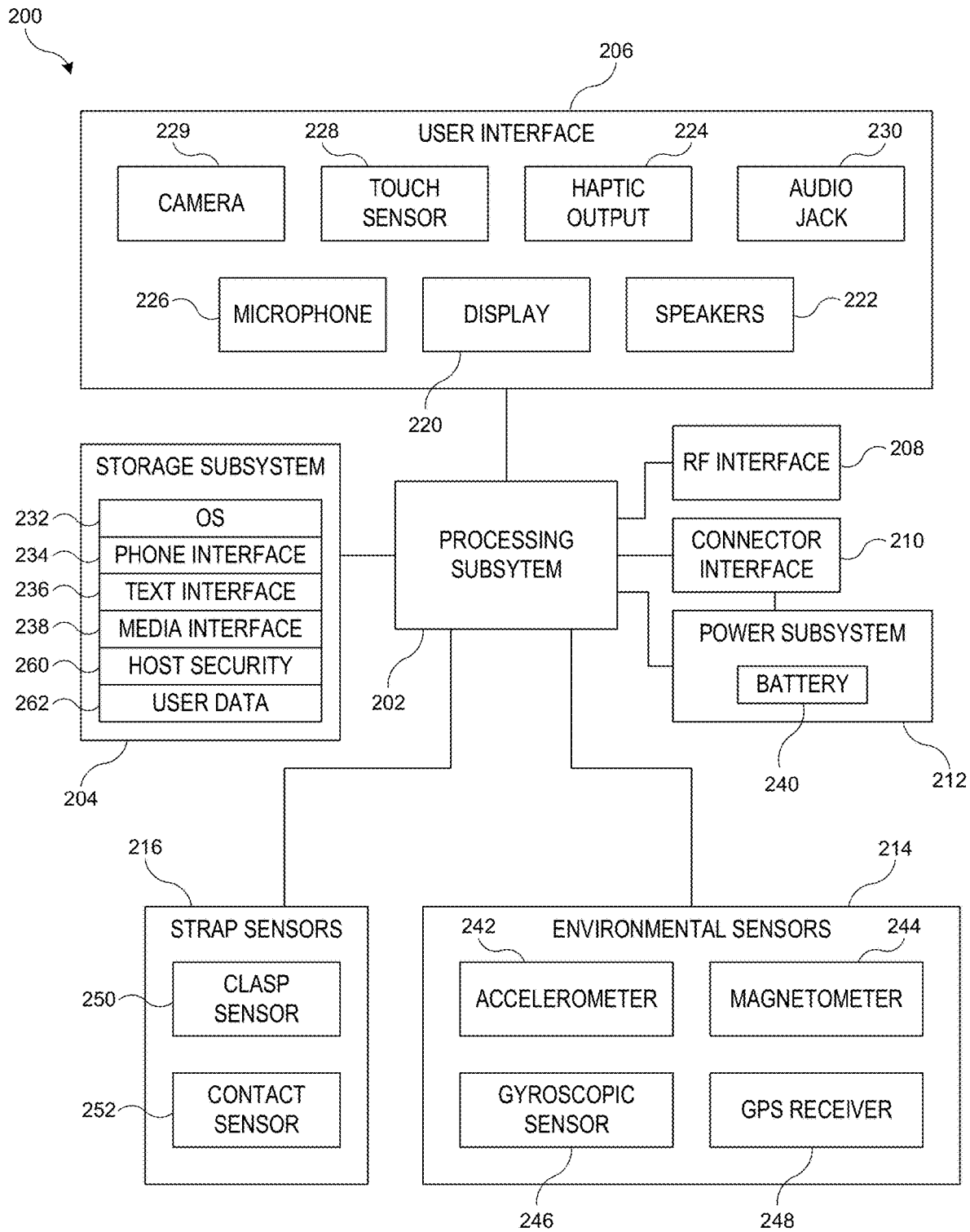
FIG. 2 is a simplified block diagram of a wearable device according to an embodiment of the present invention.

Wearable device 100 can be implemented using electronic components disposed within face portion 104, straps 106a, 106b, and/or clasp members 108a, 108b. FIG. 2 is a simplified block diagram of a wearable device 200 (e.g., implementing wearable device 100) according to an embodiment of the present invention. Wearable device 200 can include processing subsystem 202, storage subsystem 204, user interface 206, RF interface 208, connector interface 210, power subsystem 212, environmental sensors 214, and strap sensors 216. Wearable device 200 can also include other components (not explicitly shown).

Storage subsystem 204 can be implemented, e.g., using magnetic storage media, flash memory, other semiconductor memory (e.g., DRAM, SRAM), or any other non-transitory storage medium, or a combination of media, and can include volatile and/or non-volatile media. In some embodiments, storage subsystem 204 can store media items such as audio files, video files, image or artwork files; information about a user's contacts (names, addresses, phone numbers, etc.); information about a user's scheduled appointments and events; notes; and/or other types of information, examples of which are described below. In some embodiments, storage subsystem 204 can also store one or more application programs to be executed by processing subsystem 202 (e.g., video game programs, personal information management programs, media playback programs, interface programs associated with particular host devices and/or host device functionalities, etc.).

User interface 206 can include any combination of input and output devices. A user can operate input devices of user interface 206 to invoke the functionality of wearable device 200 and can view, hear, and/or otherwise experience output from wearable device 200 via output devices of user interface 206.

Examples of output devices include display 220, speakers 222, and haptic output generator 224. Display 220 can be implemented using compact display technologies, e.g., LCD (liquid crystal display), LED (light-emitting diode), OLED (organic light-emitting diode), or the like. In some embodiments, display 220 can incorporate a flexible display element or curved-glass display element, allowing wearable device 200 to conform to a desired shape. One or more speakers 222 can be provided using small-form-factor speaker technologies, including any technology capable of converting electronic signals into audible sound waves. In some embodiments, speakers 222 can be used to produce tones (e.g., beeping or ringing) and can but need not be capable of reproducing sounds such as speech or music with any particular degree of fidelity. Haptic output generator 224 can be, e.g., a device that converts electronic signals into vibrations; in some embodiments, the vibrations can be strong enough to be felt by a user wearing wearable device 200 but not so strong as to produce distinct sounds.

Examples of input devices include microphone 226, touch sensor 228, and camera 229. Microphone 226 can include any device that converts sound waves into electronic signals. In some embodiments, microphone 226 can be sufficiently sensitive to provide a representation of specific words spoken by a user; in other embodiments, microphone 226 can be usable to provide indications of general ambient sound levels without necessarily providing a high-quality electronic representation of specific sounds.

Touch sensor 228 can include, e.g., a capacitive sensor array with the ability to localize contacts to a particular point or region on the surface of the sensor and in some instances, the ability to distinguish multiple simultaneous contacts. In some embodiments, touch sensor 228 can be overlaid over display 220 to provide a touchscreen interface (e.g., touchscreen interface 105 of FIG. 1), and processing subsystem 202 can translate touch events (including taps and/or other gestures made with one or more contacts) into specific user inputs depending on what is currently displayed on display 220.

Camera 229 can include, e.g., a compact digital camera that includes an image sensor such as a CMOS sensor and optical components (e.g. lenses) arranged to focus an image onto the image sensor, along with control logic operable to use the imaging components to capture and store still and/or video images. Images can be stored, e.g., in storage subsystem 204 and/or transmitted by wearable device 200 to other devices for storage. Depending on implementation, the optical components can provide fixed focal distance or variable focal distance; in the latter case, autofocus can be provided. In some embodiments, camera 229 can be disposed along an edge of face member 104 of FIG. 1, e.g., the top edge, and oriented to allow a user to capture images of nearby objects in the environment such as a bar code or QR code. In other embodiments, camera 229 can be disposed on the front surface of face member 104, e.g., to capture images of the user. Zero, one, or more cameras can be provided, depending on implementation.

In some embodiments, user interface 206 can provide output to and/or receive input from an auxiliary device such as a headset. For example, audio jack 230 can connect via an audio cable (e.g., a standard 2.5-mm or 3.5-mm audio cable) to an auxiliary device. Audio jack 230 can include input and/or output paths. Accordingly, audio jack 230 can provide audio to the auxiliary device and/or receive audio from the auxiliary device. In some embodiments, a wireless connection interface can be used to communicate with an auxiliary device.

Processing subsystem 202 can be implemented as one or more integrated circuits, e.g., one or more single-core or multi-core microprocessors or microcontrollers, examples of which are known in the art. In operation, processing system 202 can control the operation of wearable device 200. In various embodiments, processing subsystem 202 can execute a variety of programs in response to program code and can maintain multiple concurrently executing programs or processes. At any given time, some or all of the program code to be executed can be resident in processing subsystem 202 and/or in storage media such as storage subsystem 204.

Through suitable programming, processing subsystem 202 can provide various functionality for wearable device 200. For example, in some embodiments, processing subsystem 202 can execute an operating system (OS) 232 and various applications for interfacing with a host device, such as a phone-interface application 234, a text-interface application 236, and/or a media interface application 238. In some embodiments, some or all of these application programs can interact with a host device, e.g., by generating messages to be sent to the host device and/or by receiving and interpreting messages from the host device. In some embodiments, some or all of the application programs can operate locally to wearable device 200. For example, if wearable device 200 has a local media library stored in storage subsystem 204, media interface application 238 can provide a user interface to select and play locally stored media items. Examples of interface applications are described below.

In some embodiments, processing subsystem 202 can also execute a host security process 260 that provides support for establishing and maintaining a verified communication session with a host device; examples of such processes are described below. A verified communication session can provide an enhanced level of security, and various operations of wearable device 200 and/or a host device can be made conditional on whether a verified communication session between the devices is in progress. For instance, host security process 260 can facilitate unlocking a host device when wearable device 200 is present, depending on whether a verified session is in progress. User data 262 can include any information specific to a user, such as identification information, user-specified settings and preferences, customized information (e.g., contacts, predefined text messages), and any other user-related data. In some embodiments, executing applications and processes can access user data 262 to facilitate operations; examples are described below.

RF (radio frequency) interface 208 can allow wearable device 200 to communicate wirelessly with various host devices. RF interface 208 can include RF transceiver components such as an antenna and supporting circuitry to enable data communication over a wireless medium, e.g., using Wi-Fi (IEEE 802.11 family standards), Bluetooth® (a family of standards promulgated by Bluetooth SIG, Inc.), or other protocols for wireless data communication. RF interface 208 can be implemented using a combination of hardware (e.g., driver circuits, antennas, modulators/demodulators, encoders/decoders, and other analog and/or digital signal processing circuits) and software components. In some embodiments, RF interface 208 can provide near-field communication ("NFC") capability, e.g., implementing the ISO/IEC 18092 standards or the like; NFC can support wireless data exchange between devices over a very short range (e.g., 20 centimeters or less). Multiple different wireless communication protocols and associated hardware can be incorporated into RF interface 208.

Connector interface 210 can allow wearable device 200 to communicate with various host devices via a wired communication path, e.g., using Universal Serial Bus (USB), universal asynchronous receiver/transmitter (UART), or other protocols for wired data communication. In some embodiments, connector interface 210 can provide a power port, allowing wearable device 200 to receive power, e.g., to charge an internal battery. For example, connector interface 210 can include a connector such as a mini-USB connector or a custom connector, as well as supporting circuitry. In some embodiments, the connector can be a custom connector that provides dedicated power and ground contacts, as well as digital data contacts that can be used to implement different communication technologies in parallel; for instance, two pins can be assigned as USB data pins (D+ and D−) and two other pins can be assigned as serial transmit/receive pins (e.g., implementing a UART interface). The assignment of pins to particular communication technologies can be hardwired or negotiated while the connection is being established. In some embodiments, the connector can also provide connections for audio and/or video signals, which may be transmitted to or from host device 102 in analog and/or digital formats.

In some embodiments, connector interface 210 and/or RF interface 208 can be used to support synchronization operations in which data is transferred from a host device to wearable device 200 (or vice versa). For example, as described below, a user can customize certain information for wearable device 200 (e.g., a "favorite" contacts list and/or specific predefined text messages that can be sent). While user interface 206 can support data-entry operations, a user may find it more convenient to define customized information on a separate device (e.g., a tablet or smartphone) that has a larger interface (e.g., including a real or virtual alphanumeric keyboard), then transfer the customized information to wearable device 200 via a synchronization operation. Synchronization operations can also be used to load and/or update other types of data in storage subsystem 204, such as media items, application programs, and/or operating system programs. Synchronization operations can be performed in response to an explicit user request and/or automatically, e.g., when wireless device 200 resumes communication with a particular host device or in response to either device receiving an update to its copy of synchronized information.

Environmental sensors 214 can include various electronic, mechanical, electromechanical, optical, or other devices that provide information related to external conditions around wearable device 200. Sensors 214 in some embodiments can provide digital signals to processing subsystem 202, e.g., on a streaming basis or in response to polling by processing subsystem 202 as desired. Any type and combination of environmental sensors can be used; shown by way of example are accelerometer 242, a magnetometer 244, a gyroscope 246, and a GPS receiver 248.

Some environmental sensors can provide information about the location and/or motion of wearable device 200. For example, accelerometer 242 can sense acceleration (relative to freefall) along one or more axes, e.g., using piezoelectric or other components in conjunction with associated electronics to produce a signal. Magnetometer 244 can sense an ambient magnetic field (e.g., Earth's magnetic field) and generate a corresponding electrical signal, which can be interpreted as a compass direction. Gyroscopic sensor 246 can sense rotational motion in one or more directions, e.g., using one or more MEMS (micro-electro-mechanical systems) gyroscopes and related control and sensing circuitry. Global Positioning System (GPS) receiver 248 can determine location based on signals received from GPS satellites.

Other sensors can also be included in addition to or instead of these examples. For example, a sound sensor can incorporate microphone 226 together with associated circuitry and/or program code to determine, e.g., a decibel level of ambient sound. Temperature sensors, proximity sensors, ambient light sensors, or the like can also be included.

Strap sensors 216 can include various electronic, mechanical, electromechanical, optical, or other devices that provide information as to whether wearable device 200 is currently being worn. For instance, clasp sensor 250 can be at least partially disposed within either or both of clasp members 108a, 108b of FIG. 1 and can detect when clasp members 108a, 108b are engaged with each other or disengaged from each other. For example. engaging clasp members 108a, 108b to each other can complete an electrical circuit, allowing current to flow through clasp sensor 250; disengaging clasp members 108a, 108b from each other can break the circuit. As another example, one or more contact sensors 252 can be disposed in straps 106a, 106b and can detect contact with a user's skin, e.g., based on capacitive sensing, galvanic skin response, or the like. Contact sensors 252 can also include pressure sensors (e.g., piezoelectric devices) or the like. Any other type of sensor that indicates whether wearable device 200 is currently being worn can be used in addition to or instead of strap sensors 216. For instance, physiological or biometric sensors, such as pulse sensors, ECG sensors, or the like can be provided. In some embodiments, physiological or biometric sensors can be used in verifying the identity of the wearer of wearable device 200.

Power subsystem 212 can provide power and power management capabilities for wearable device 200. For example, power subsystem 212 can include a battery 240 (e.g., a rechargeable battery) and associated circuitry to distribute power from battery 240 to other components of wearable device 200 that require electrical power. In some embodiments, power subsystem 212 can also include circuitry operable to charge battery 240, e.g., when connector interface 210 is connected to a power source. In some embodiments, power subsystem 212 can include a "wireless" charger, such as an inductive charger, to charge battery 240 without relying on connector interface 210. In some embodiments, power subsystem 212 can also include other power sources, such as a solar cell, in addition to or instead of battery 240.

In some embodiments, power subsystem 212 can control power distribution to components within wearable device 200 to manage power consumption efficiently. For example, power subsystem 212 can automatically place device 200 into a "hibernation" state when strap sensors 216 indicate that device 200 is not being worn. The hibernation state can be designed to reduce power consumption; accordingly, user interface 206 (or components thereof), RF interface 208, connector interface 210, and/or environmental sensors 214 can be powered down (e.g., to a low-power state or turned off entirely), while strap sensors 216 are powered up (either continuously or at intervals) to detect when a user puts on wearable device 200. As another example, in some embodiments, while wearable device 200 is being worn, power subsystem 212 can turn display 220 and/or other components on or off depending on motion and/or orientation of wearable device 200 detected by environmental sensors 214. For instance, if wearable device 200 is designed to be worn on a user's wrist, power subsystem 212 can detect raising and rolling of a user's wrist, as is typically associated with looking at a wristwatch, based on information provided by accelerometer 242. In response to this detected motion, power subsystem 212 can automatically turn display 220 and/or touch sensor 228 on; similarly, power subsystem 212 can automatically turn display 220 and/or touch sensor 228 off in response to detecting that user's wrist has returned to a neutral position (e.g., hanging down).

Power subsystem 212 can also provide other power management capabilities, such as regulating power consumption of other components of wearable device 200 based on the source and amount of available power, monitoring stored power in battery 240, generating user alerts if the stored power drops below a minimum level, and so on.

In some embodiments, control functions of power subsystem 212 can be implemented using programmable or controllable circuits operating in response to control signals generated by processing subsystem 202 in response to program code executing thereon, or as a separate microprocessor or microcontroller.

It will be appreciated that wearable device 200 is illustrative and that variations and modifications are possible. For example, strap sensors 216 can be omitted, and wearable device 200 can include a user-operable control (e.g., a button or switch) that the user can operate to indicate when wearable device 200 is being worn. Controls can also be provided, e.g., to turn on or off display 220, mute or unmute sounds from speakers 222, etc. In some embodiments, other environmental sensors (e.g., accelerometer 242) can be used to determine whether wearable device 200 is being worn, in addition to or instead of strap sensors 216. Wearable device 200 can include any types and combination of sensors and in some instances can include multiple sensors of a given type.

In various embodiments, a user interface can include any combination of any or all of the components described above, as well as other components not expressly described. For example, in some embodiments, the user interface can include, e.g., just a touchscreen, or a touchscreen and a speaker, or a touchscreen and a haptic device. Where the wearable device has an RF interface, a connector interface can be omitted, and all communication between the wearable device and other devices can be conducted using wireless communication protocols. A wired power connection, e.g., for charging a battery of the wearable device, can be provided separately from any data connection.

Further, while the wearable device is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

A host device such as host device 102 of FIG. 1 can be implemented as an electronic device using blocks similar to those described above (e.g., processors, storage media, user interface devices, data communication interfaces, etc.) and/or other blocks or components. Those skilled in the art will recognize that any electronic device capable of communicating with a particular wearable device can act as a host device with respect to that wearable device.

Communication between a host device and a wireless device can be implemented according to any communication protocol (or combination of protocols) that both devices are programmed or otherwise configured to use. In some instances, standard protocols such as Bluetooth protocols can be used. In some instances, a custom message format and syntax (including, e.g., a set of rules for interpreting particular bytes or sequences of bytes in a digital data transmission) can be defined, and messages can be transmitted using standard serial protocols such as a virtual serial port defined in certain Bluetooth standards. Embodiments of the invention are not limited to particular protocols, and those skilled in the art with access to the present teachings will recognize that numerous protocols can be used.

Figure 3A:
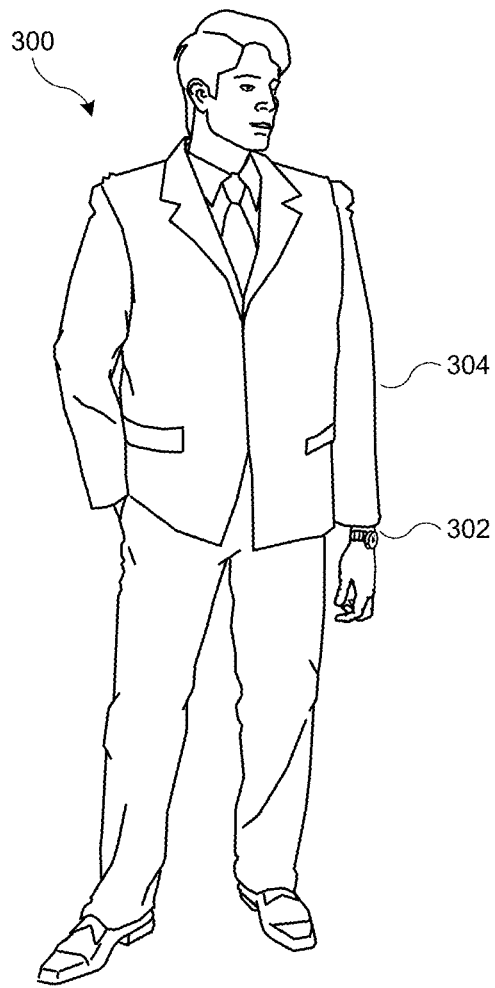
FIGS. 3A and 3B illustrate a user operating a wearable device according to an embodiment of the present invention.
Figure 3B:
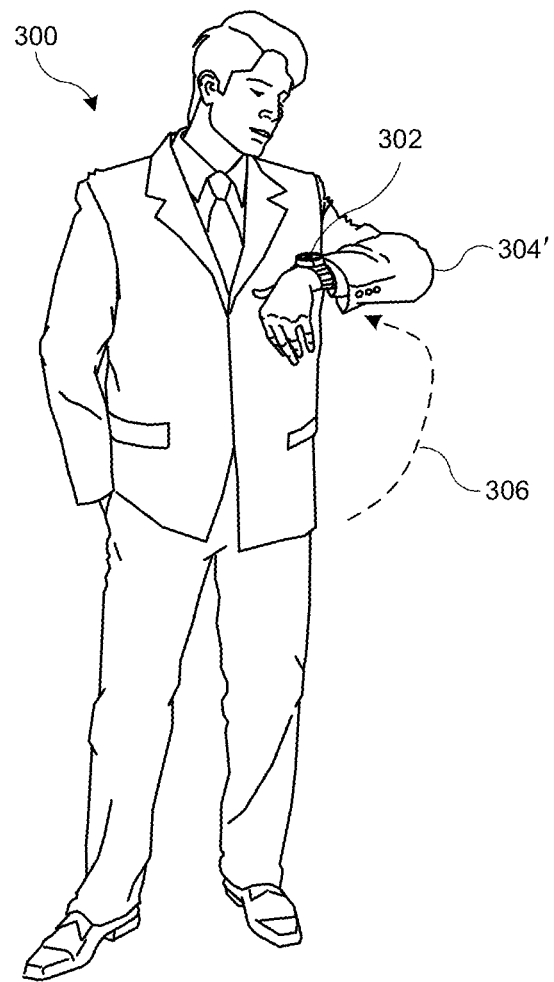

In some embodiments, wearable device 200 can detect a transition from an "idle" position to an "active" position. For example, FIGS. 3A and 3B illustrate a user 300 wearing wearable device 302, which in this example is a wrist-worn device. As shown in FIG. 3A, when user 300 is not actively using wearable device 302, the user's arm 304 may hang naturally at his side. To begin using wearable device 302, user 300 can rotate his arm to the position 304' shown in FIG. 3B, raising the elbow to bring wearable device 302 into his line of sight. Dashed line 306 indicates an approximate motion path of wearable device 302. Motion sensors (e.g., accelerometer 242 and/or gyroscopic sensor 246) can detect a characteristic motion associated with bringing wearable device 302 into the user's line of sight; upon detecting this motion, wearable device 302 can automatically prepare itself to be used, e.g., by activating user interface components such as display 220 and/or touch sensor 228. Other patterns of motion can also be detected and can trigger activation of user interface components; for example, shaking of the wrist or a specific motion pattern of the arm or hand (e.g., moving in an "S" curve or circle or triangle). In some embodiments, wearable device 302 (or other wearable devices described herein) can have a button (e.g., on the side of face 104 in FIG. 1) that a user can toggle to turn on or off a touchscreen interface; the button can be provided in addition to or instead of motion-based detection of activation.

Referring again to FIG. 1, in some embodiments, host device 102 can send various event notifications to wearable device 100, and the user can respond to the notifications via wearable device 100. For example, host device 102 can alert wearable device 100 to incoming communications such as phone calls, text messages, voicemail messages, email messages, and the like; upcoming meetings or events; stock market events such as change in price of a particular stock; location-based reminders; and/or any other event that can be identified by host device 102. In some embodiments, the user may be able to select which types of events should generate notifications to wearable device 100, e.g., by interacting with a settings menu provided on host device 102.

Figure 4:
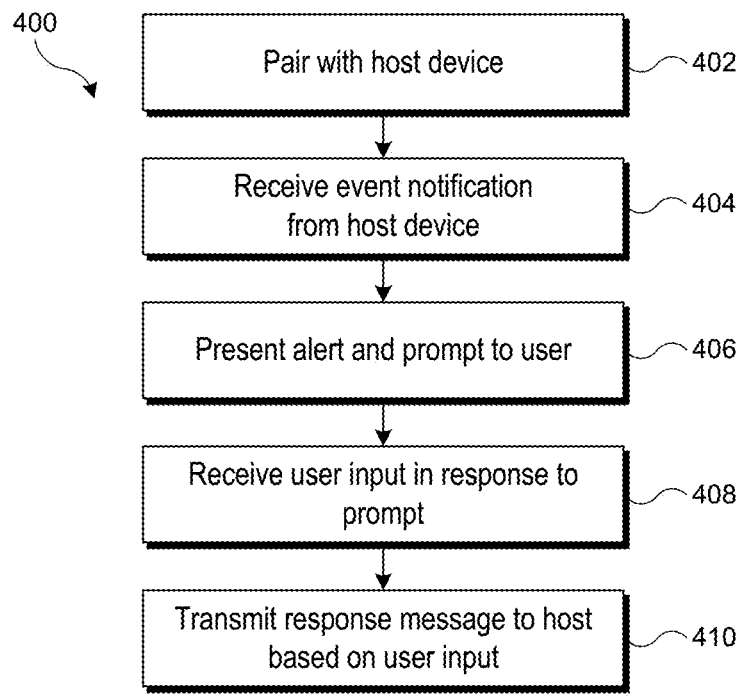
FIG. 4 is a flow diagram of a process for responding to an event notification according to an embodiment of the present invention.

FIG. 4 is a flow diagram of a process 400 for responding to an event notification according to an embodiment of the present invention. Process 400 can be implemented in a wearable device, e.g., wearable device 100 of FIG. 1 or wearable device 200 of FIG. 2, which can be interacting with host device 102. In some embodiments, the implementation of process 400 can include program code executed by a processor of wearable device 100.

At block 402, wearable device 100 can pair with a host device, e.g., host device 102. For example, standard Bluetooth pairing techniques can be used; other techniques for establishing a wireless connection between two devices can be used. In some embodiments, an initial pairing between two devices may involve user interaction with one or both devices to confirm that the pairing should be established. Once the initial pairing is established, the two devices can automatically reconnect to each other (without further user intervention) any time they come within communication range and are operating their respective RF transceivers.

At block 404, wearable device 100 can receive an event notification from host device 102. For example, host device 102 can send a notification indicating an incoming phone call, text message, or email message. At block 406, wearable device 100 can present an alert to the user and can prompt the user for a response. The alert can include, e.g., an audible alert, a vibration, a visual alert, or any combination of multiple alerts. The prompt can include, e.g., a visual prompt on display 220, an audio prompt (e.g., a voice prompt), or the like.

Figure 5:
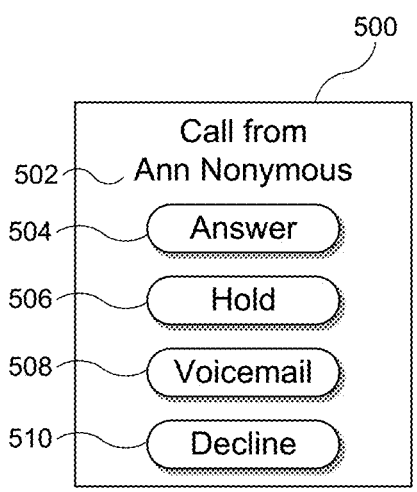
FIG. 5 illustrates an interface for alerting a user according to an embodiment of the present invention.

FIG. 5 illustrates an alert-and-prompt screen 500 that can be displayed at block 406 when the event notification corresponds to an incoming phone call. Screen 500 can show an identifier of the caller 502; the identifier can be determined by host device 102 (e.g., based on a contacts list stored therein and/or caller identifying information received by host device 102) and sent to wearable device 100 as part of the event notification. Screen 500 can also prompt the user to respond to the call, e.g., by selecting virtual button 504 to instruct the phone to answer the call, virtual button 506 to instruct the phone to place the caller on hold, virtual button 508 to instruct the phone to divert the call to voicemail, and virtual button 510 to decline the call. Other alerts and prompts can be used, depending on the type of event, available response options, screen size of the wearable device, user preferences, and similar design considerations.

In some embodiments, a sequence of screens can be presented as part of prompting the user for a response. For example, FIG. 6 illustrates a prompt screen 600 that can be displayed at block 406 of process 400 when the event notification corresponds to an incoming text message. Screen 600 shows an identifier of the sender of the text 602; as with a phone caller, the identifier of a sender of a text can be determined by host device 102 (e.g., based on a contacts list stored therein and/or source identifying information received by host device 102). Screen 600 can also show a preview of the text message 604; in some embodiments, the user can scroll (e.g., by sliding a finger up or down on a touchscreen) to view more message content. Screen 600 can also prompt the user to respond to the text, e.g., by selecting virtual button 606 to reply to the text or virtual button 608 to exit from screen 600 without responding.

If the user selects virtual button 606, a message selection screen 700 as shown in FIG. 7 can be displayed, providing a menu of predefined text messages from which the user can select. For example, virtual button 702 can be selected to send a "yes" message, virtual button 704 can be selected to send a "no" message; virtual button 706 can be selected to send a "thanks" message; and virtual button 708 can be selected to send a "later" message indicating that the user will contact the sender later. It is to be understood that buttons 702, 704, 706, 708 may not contain the full text message to be sent but rather a short identifier. For example, the "no" identifier on button 704 can be associated with a less terse message such as "No, sorry," and the "later" identifier on button 708 can be associated with a more specific message such as "I'll call you later."

Referring again to FIG. 4, at block 408, wearable device 100 can receive a user input in response to the prompt. For example, the user can select virtual buttons via one or more of screens 500, 600, or 700, depending on context and what the user desires to do. At block 410, wearable device 100 can transmit a response message to the host based on the received user input.

It is not required that a user actually respond to any particular alert on wearable device 100. For example, in some embodiments process 400 can simply time out and end at block 408 if the user does not provide input within some fixed time period (e.g., 1 minute, 2 minutes, 5 minutes); the time period can be different for different types of events. As another example, a user can select the "close" option (button 608) from a screen such as screen 600, and this can be interpreted by wearable device 100 as an indication that the user does not intend to respond. In some instances, a user may instead choose to respond to an alert by using host device 102 directly; in such cases, host device 102 can notify wearable device 100 if a response is received directly at host device 102.

FIG. 8 is a flow diagram of a process 800 for generating an event notification and receiving a response according to an embodiment of the present invention. Process 800 can be implemented in a host device, e.g., host device 102 of FIG. 1, which can be interacting with a wearable device 100 that executes process 400 of FIG. 4 or similar processes. In some embodiments, the implementation of process 800 can include program code executed by a processor of host device 102.

At block 802, host device 102 can detect an event that triggers a user alert, such as an incoming call or text message. At block 804, host device 102 can determine whether a wearable device (e.g., wearable device 100) is currently paired. If not, then at block 806, host device 102 can wait for a user input at its local interface to determine whether and how the user chooses to respond.

If wearable device 100 is currently paired, then at block 808, host device 102 can send an event notification to wearable device 100. Any communication protocol can be used, including standard Bluetooth messages (e.g., incoming call alert), a message that conforms to a customized serial protocol that can be transmitted using Bluetooth's virtual serial port capability, or messages conforming to other protocols that are mutually understood by the host device and the wearable device. The notification can include information identifying the type of event (e.g., incoming phone call, text message received, stock market alert, etc.) and additional details specific to the event (e.g., name or other identifier of the caller, content of a text message, etc.).

At block 810, host device 102 can wait for a response, which can come from either the wearable device or a local user interface of host device 102. For example, a user may receive an alert of an incoming call on wearable device 100 but choose to answer the call using host device 102. Accordingly, host device 102 can monitor activity on the connection to wearable device 100 to detect a response and at the same time present a local interface (e.g., on its own touchscreen display) and monitor that interface to detect a response.

At block 812, host device 102 can process the received response, regardless of whether it was received from wearable device 100 or via a local user interface of host device 102. For example, referring to FIG. 5, if a user selects one of virtual buttons 504, 506, 508, 510 from screen 500 on wearable device 100, host device 102 can receive a response from wearable device 100 indicating which button was selected. In response to answer button 504 being selected, host device 102 can answer the call; call audio can be routed to wearable device 100 or to another audio input/output device, such as an internal audio interface of host device 102 or a wireless headset that is paired with or otherwise in communication with host device 102. In response to hold button 506 being selected, host device 102 can answer the call and play a message to the caller indicating that the caller should hold. The user can later take the call off hold, e.g., via a local user interface of host device 102 or via wearable device 100, allowing the user to speak with the caller. In response to voicemail button 508 being selected, host device 102 can redirect the call to a voicemail account associated with the user, allowing the caller to leave a message. In response to decline button 510 being selected, host device 102 can reject or terminate the call.

As another example, referring to FIG. 7, if a user selects to reply to a text message with a predefined response, e.g., by selecting one of buttons 702, 704, 706, 708 on screen 700, host device 102 can generate and send the corresponding text message back to the sender. In some embodiments, wearable device 100 may provide an index or other short name as an identifier for the text message. Host device 102 can maintain a lookup table or other data structure that maps the identifier to the actual message to be sent (e.g., a short-name identifier such as "later" or an index such as "3" can be mapped to "I'll call you later," which is the message that would be sent). In some embodiments, a user can define a set of text messages to be included in the predefined list by interacting with host device 102, and host device 102 can provide short names and/or other identifiers for the user-defined messages to wearable device 100, e.g., in a synchronization operation.

It is not required that a user actually respond to a particular alert, either locally on host device 102 or via wearable device 100. In some instances, process 800 can allow the alert to time out after a specific period (e.g., 1 minute, 2 minutes, 5 minutes) if the user does not respond, in which case process 800 can end at block 806 or 810. For example, if an incoming call is not answered within the specified time period after generating the alert, host device 102 can take a default action such as diverting the call to a voicemail system. In some embodiments, if the user does not respond within the specified time period, host device 102 can discontinue the alert and/or replace the alert with an informational notice that is visible to the user (e.g., a missed-call notification or the like).

It will be appreciated that processes 400 and 800 are illustrative and that variations and modifications are possible. Steps described as sequential may be executed in parallel, order of steps may be varied, and steps may be modified, combined, added or omitted. For instance, in some embodiments, a host device can present a user alert via its own local interface in addition to sending a notification to a wearable device; in some embodiments, the host device presents a user alert via its own local user interface only when the wearable device is not paired; and in some embodiments, the user can specify whether the host should send a particular notification to the wearable device, present an alert locally, do both, or do neither. A user alert on a host device or a wearable device can take the form of any sensory input detectable by a human and can include visual alerts (e.g., lights; displayed text, icons and or images), audible alerts (e.g., tones, buzzes, ringtones, musical sounds, and/or speech sounds), and/or tactile alerts (e.g., a vibration).

The particular response options described above, e.g., with reference to FIGS. 5-7, are also illustrative, and the user may have other options for responding to a given alert. Further, while processes 400 and 800 have been described with reference to specific types of events (incoming call, incoming text message), it is to be understood that notifications of other types of events can be processed in the same manner. For any type of event, the user can have the option to select one of a set of responses (which may be limited) via the wearable device's user interface or to use the host device's local user interface to respond. In some instances, the host device's interface can offer a larger or different range of possible response options than the wearable device (e.g., composing an arbitrary message as opposed to selecting from a finite set of predefined messages).

Figure 9:
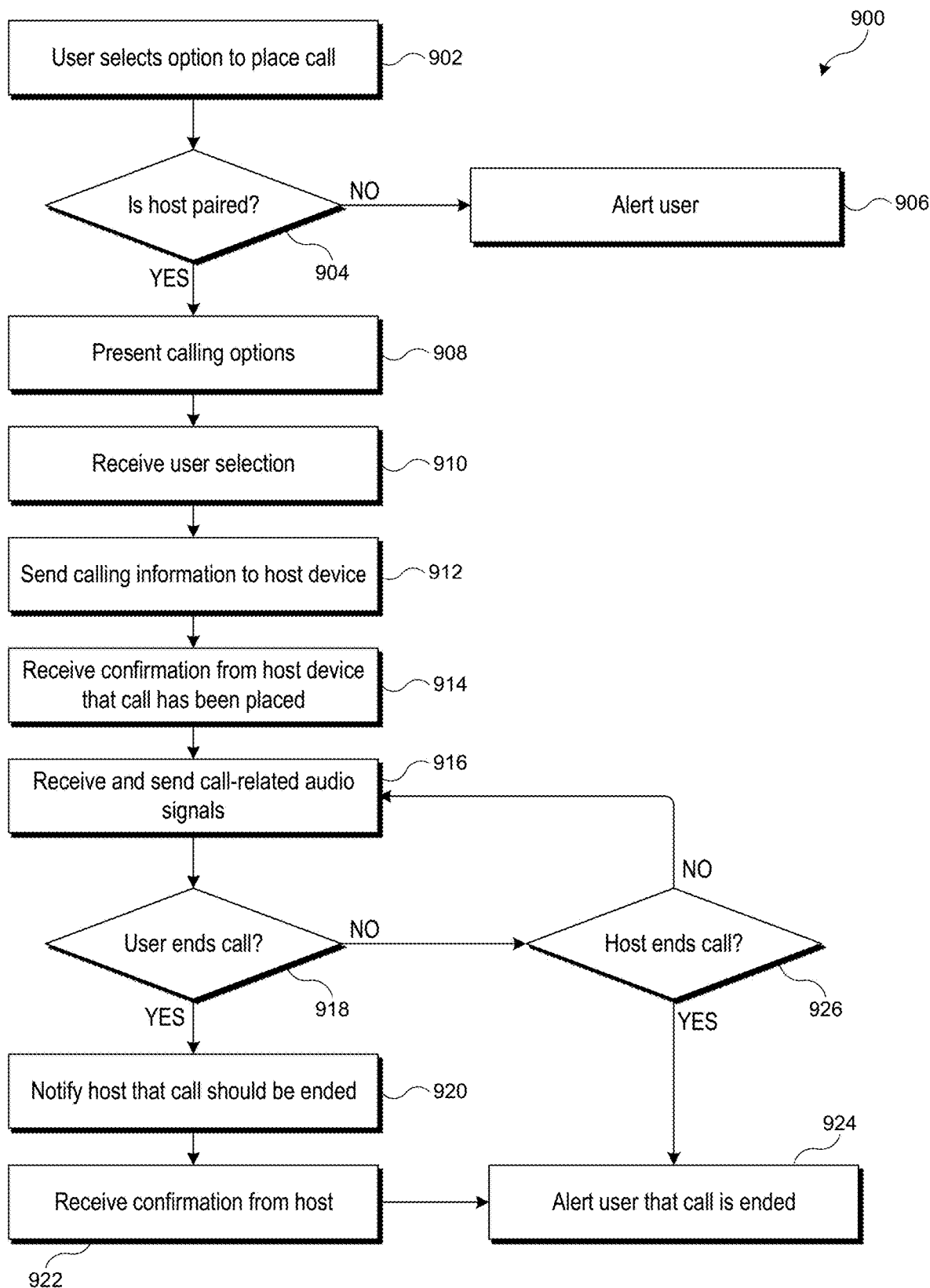
FIG. 9 is a flow diagram of a process for initiating a phone-call functionality of a host device according to an embodiment of the present invention.

In some embodiments, in addition to or instead of responding to an event on the host device, a user can use a wearable device to initiate a functionality of the host device, e.g., placing a phone call, sending a text message that is not in response to a received text message, or initiating any other functionality that is available on a particular host device. FIG. 9 is a flow diagram of a process 900 for initiating a phone-call functionality of a host device according to an embodiment of the present invention. Process 900 can be implemented in a wearable device, e.g., wearable device 100 of FIG. 1 or wearable device 200 of FIG. 2, which can be interacting with a host device 102 that provides a telephone transceiver capable of communicating over a phone network (e.g., a cellular telephony network, voice-over-IP system, or the like). In some embodiments, the implementation of process 900 can include program code executed by a processor of wearable device 100.

At block 902, a user can select an option to place a call using the user interface of wearable device 100. For example, referring to FIG. 10, a user interface of wearable device 100 can include a function selection screen 1000. Function selection screen 1000 can be a default screen that appears when the display of wearable device 100 is activated or it can be a different screen that the user can access through a touch gesture or sequence of gestures (e.g., to navigate through menus) on a touchscreen display, a hand or arm gesture detected by motion sensors built into wearable device 100, or other operations. Function selection screen 1000 can include various virtual buttons that the user can select to invoke a functionality of host device 102, such as "call" button 1002 to place a call, "text" button 1004 to send a text message, and "music" button 1006 to invoke a media player functionality of host device 102. In this example, a user can select an option to place a call by selecting button 1002.

Referring again to FIG. 9, at block 904, wearable device 100 can determine whether it is currently paired with a host device 102 that is capable of making phone calls. If not, wearable device 100 can alert the user at block 906. The user can take corrective action, such as getting within range of host device 102, turning host device 102 on, etc.

Assuming wearable device 100 is paired with a phone-capable host device 102, then at block 908, wearable device 100 can present the user with calling options, and at block 910, wearable device 100 can receive user input selecting a calling option. For example, when a user selects call button 1002 of FIG. 10, an interface such as screen 1100 of FIG. 11 may be displayed. FIG. 11 shows options for placing a call, such as an emergency call button 1102 that can be programmed to place a call to a phone number associated with an emergency service (such as 911 in the United States or 112 in many European countries), a keypad button 1104 to allow a user to dial a number, and a contacts button 1106 to allow a user to look up a contact.

Figure 12:
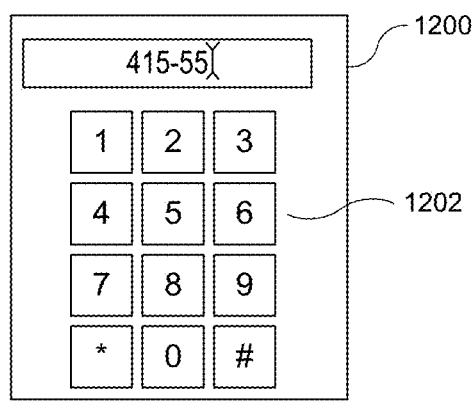
FIG. 12 illustrates a keypad user interface according to an embodiment of the present invention.

If the user selects keypad button 1104, wearable device 100 can present a keypad interface, such as screen 1200 of FIG. 12. Screen 1200 includes a virtual phone keypad 1202 (e.g., a standard phone keypad with digits 0-9 and "star" and "pound" keys) and a number box 1204 to show the digits entered so far. In some embodiments, other controls can be provided (e.g., back, cancel, and done buttons); in some embodiments, gestures can be associated with various control functions such as erasing a digit, canceling the operation, or indicating that entry of the number is complete. A user can operate keypad interface screen 1200 to dial an arbitrary number.

Figure 13:
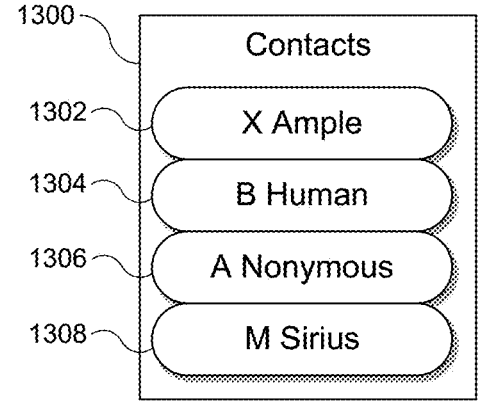
FIG. 13 illustrates a contacts user interface according to an embodiment of the present invention.

If, from screen 1100 of FIG. 11, the user chooses contacts button 1106, wearable device 100 can present a selectable contacts list, such as screen 1300 of FIG. 13. Screen 1300 can present the names of some or all of a user's contacts, e.g., as virtual buttons 1302, 1304, 1306, 1308. If the number of contacts exceeds the available space on screen 1300, the list can be scrollable (e.g., using upward or downward gestures on a touchscreen) to allow the user to view and select from any number of contacts.

Wearable device 100 can maintain various amounts of contact information. For example, wearable device 100 can maintain a list of names of the user's contacts, which it can obtain, e.g., via synchronization operations with host device 102 or with other devices. Wearable device 100 can maintain just the name and/or other information about each contact (e.g., phone numbers, photos) as desired. In some embodiments, a user can designate a subset of her contacts to be synchronized with wearable device 100, and host device 102 can have a larger list of contacts than wearable device 100 as well as more information about each contact. Alternatively, wearable device 100 can obtain contact information from host device 102 in real time, e.g., with user-defined favorite contacts or most-recently-contacted contacts being presented first and various options to retrieve additional contacts. Accordingly, a user can operate wearable device 100 to select a contact to be called.

Referring again to FIG. 9, once the user input that determines a number to be called has been received (block 910), process 900 can send a call instruction to host device 102 at block 912 to instruct host device 102 to place the call. In some instances, e.g., where keypad screen 1200 was used, the call instruction can include a phone number. In some instances, e.g., where contacts screen 1300 was used to select the party to be called, the call instruction can include the selected contact's name (or other unique identifier), from which host device 102 can determine the phone number to be called, e.g., by looking up the information in a user's contact list. Host device 102 can place the call, and at block 914, wearable device 100 can receive confirmation that the call has been placed. This confirmation can indicate whether the call connected, or it can be sent before the call is actually connected.

At block 916, wearable device 100 can receive and send call-related audio signals, allowing the user to communicate with the caller. Call-related audio signals can include input audio signals (e.g., speech of the user picked up by a microphone and delivered to the host device for transmission via the phone network) and/or output audio signals (e.g., speech of the other caller received at the host device via the phone network and delivered to a speaker). In some instances, output and/or input audio signals can be sent to and/or received from a built-in speaker and/or microphone of wearable device 100. In other instances, wearable device 100 can send output audio to and/or receive input audio from external devices such as a wired or wireless headset. It is not required that all call-related audio signals, or indeed any call-related audio signals, be routed through wearable device 100. For example, host device 102 can route input (or output) audio to (or from) a device other than wearable device 100 while using wearable device 100 to route the output (or input) audio, and wearable device 100 can process the portion of audio for which it is in the routing path. In some instances, all call-related audio signals can be routed to and from devices other than wearable device 100, in which case wearable device 100 would not receive or send call-related audio signals but may simply wait until the call is completed. In some embodiments, wearable device 100 can make other functions available to the user while a call is in progress.

In some embodiments, while a call is in progress, wearable device 100 can display a control operable by the user to end the call. At block 918, if this control is operated, then at block 920, wearable device 100 can alert host device 102 that the call should be ended. Host device 102 can terminate the call and return a confirmation to wearable device 100 at block 922. Wearable device 100 can present an alert to the user at block 924 to confirm that the call has ended.

Host device 102 can also detect a call-termination event not originating from wearable device 100, e.g., if the other party disconnects or if the connection is dropped by the phone network. If this occurs, host device 102 can send an event notification to wearable device 100. Accordingly, if the user does not end the call at block 918, then at block 926, wearable device 100 can determine whether host device 102 has sent a call termination notification. If so, then wearable device 100 can alert the user at block 924. Otherwise, the call can continue (block 1408) until either the user terminates it or the host detects a termination event.

Figure 14:
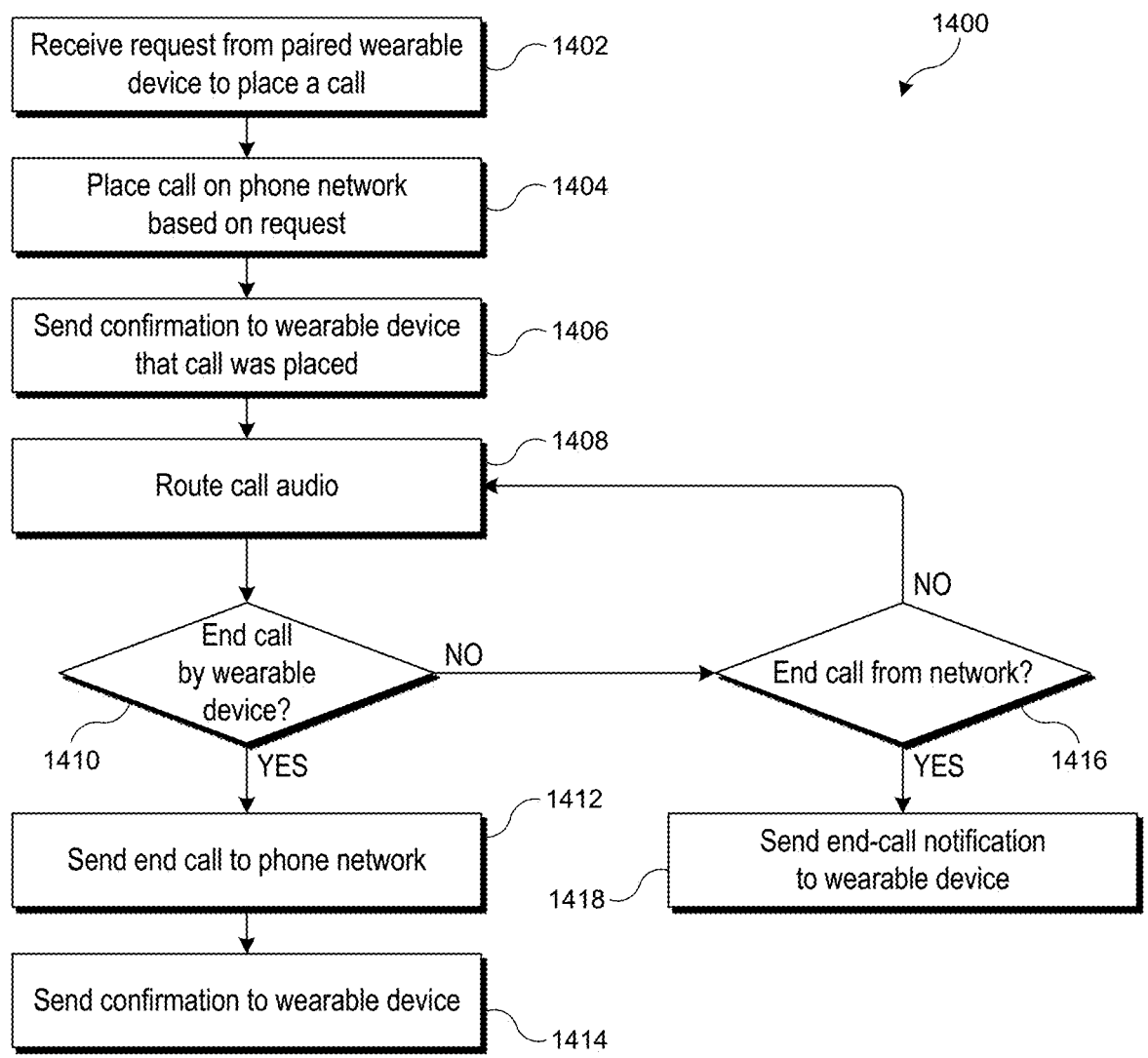
FIG. 14 is a flow diagram of a process for placing a call using a wearable device according to an embodiment of the present invention.

FIG. 14 is a flow diagram of a process 1400 for placing a call using a wearable device according to an embodiment of the present invention. Process 1400 can be implemented in a host device, e.g., host device 102 of FIG. 1, which can be interacting with a wearable device 100 that executes process 900 of FIG. 9 or similar processes, and host device 102 can provide a telephone transceiver capable of communicating over a phone network (e.g., a cellular telephony network, voice-over-IP system, or the like) In some embodiments, the implementation of process 1400 can include program code executed by a processor of host device 102.

At block 1402, host device 102 can receive a call instruction from a paired wearable device 100 that instructs host device 102 to place a phone call. The call instruction can include, e.g., a phone number to be called or an identifier of a contact. At block 1404, host device 102 can place the call. In some embodiments, placing the call can include using the contact identifier received at block 1402 to look up a corresponding phone number. At block 1406, host device 102 can send a confirmation that the call has been placed. The confirmation can be sent, e.g., while the call is still being connected.

At block 1408, host device 102 can route the call-related audio signals (including input and output audio signals as described above with reference to FIG. 9) to and from appropriate input and output devices. Audio input and output devices can include an internal microphone or speaker of host device 102 and/or an external microphone or speaker connected to host device 102 by wired or wireless connections, including in some instances wearable device 100. In some embodiments, host device 102 can determine the routing based on what other devices are currently connected to host device 102 and/or user-specified preferences regarding audio routing. Accordingly, call-related audio can be routed to wearable device 100 or to another device. In some instances, input and output audio can be routed differently; for example, host device 102 can receive input audio from wearable device 100 while providing output audio to a different device.

At block 1410, host device 102 can determine whether wearable device 100 has sent a message indicating that the call should end. If so, then host device 102 can end the call at block 1412 and send confirmation to wearable device 100 at block 1414.

If, at block 1410, wearable device 100 has not indicated that the call should end, then at block 1416, host device 102 can determine whether it has received notification via the phone network that the call has ended (e.g., that the other endpoint has terminated the call or that the connection has been dropped). In addition, in some embodiments, a user who operated wearable device 100 to place a particular call can operate the user interface of host device 102 to end the call. If host device 102 detects any of these call-ending events, then host device 102 can notify wearable device 100 that the call has ended at block 1418. In some embodiments, the notification at block 1418 can include an indication of how the call ended (e.g., terminated by the other endpoint, dropped call, etc.).

If, at block 1416, host device 102 does not detect that the call has ended, then process 1400 can return to block 1408 to continue to route audio for the call. Accordingly, the call can continue until it is terminated by either party.

Figure 15:
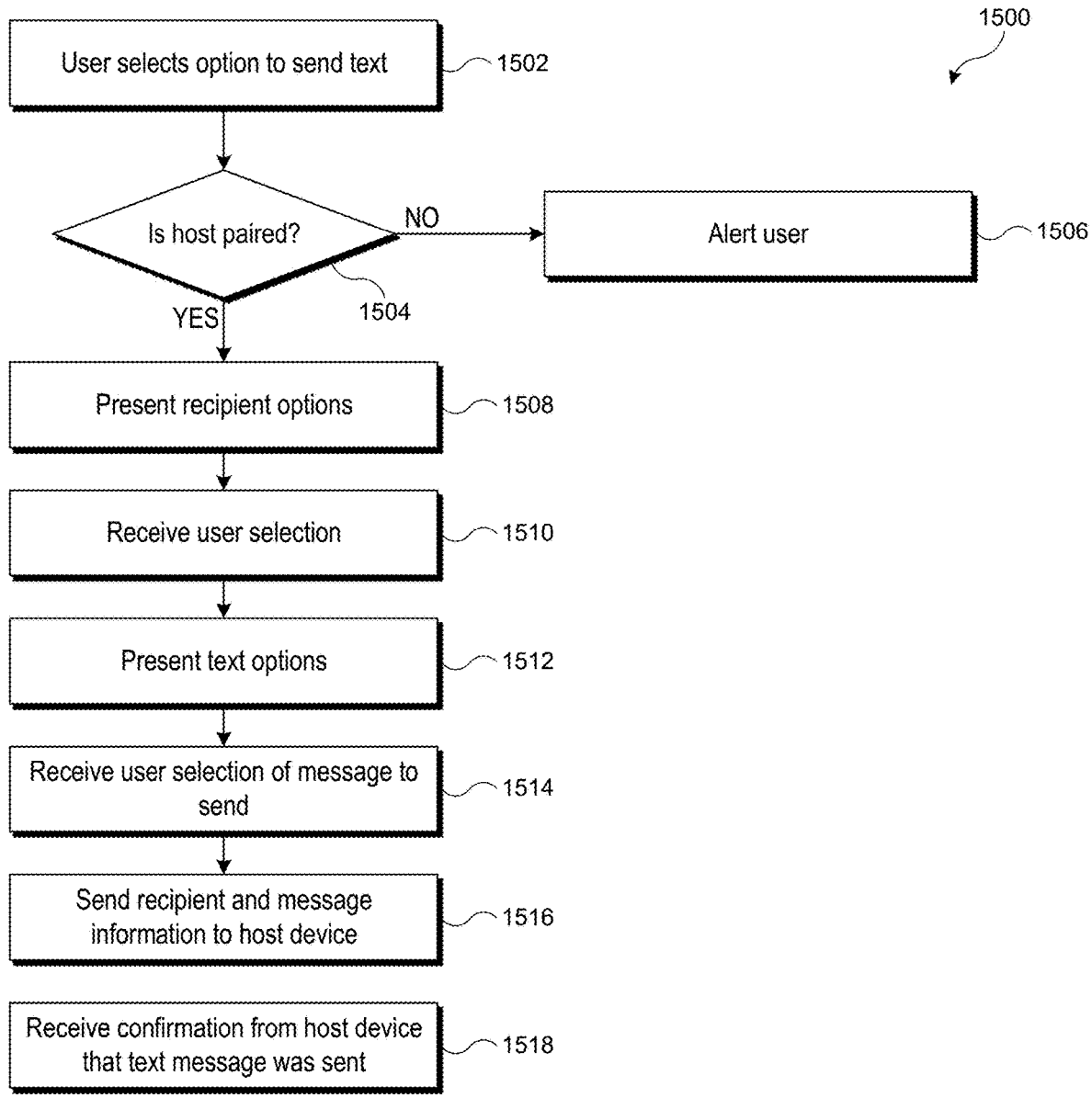
FIG. 15 is a flow diagram of a process for sending a text message using a wearable device according to an embodiment of the present invention.

Similar processes can be used to send other types of communication, such as text messaging. For example, FIG. 15 is a flow diagram of a process 1500 for sending a text message using a wearable device, e.g., wearable device 100 of FIG. 1 or wearable device 200 of FIG. 2, which can be interacting with a host device 102 that provides a telecommunication interface capable of communicating text messages over a network (e.g., a cellular telephony network, cellular data network, the Internet, or the like) In some embodiments, the implementation of process 1500 can include program code executed by a processor of wearable device 100.

Figure 10:
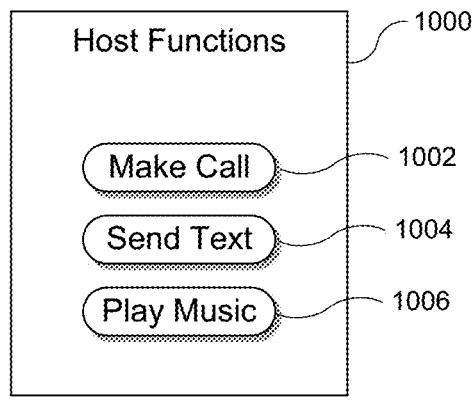
FIG. 10 illustrates a function-selection user interface according to an embodiment of the present invention.
Figure 11:
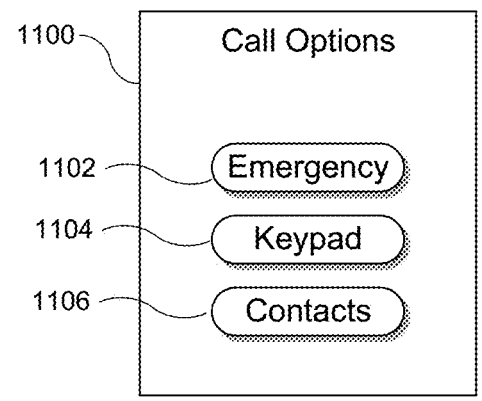
FIG. 11 illustrates a user interface for placing a call according to an embodiment of the present invention.

At block 1502, a user can select an option to send a text message, e.g., by selecting text button 1004 from interface screen 1000 of FIG. 10. At block 1504, wearable device 100 can determine whether it is currently paired with a host device 102 that is capable of making phone calls. If not, wearable device 100 can alert the user at block 1506. The user can take corrective action, such as getting within range of host device 102, turning host device 102 on, etc.

At block 1508, wearable device 100 can present the user with options for selecting a recipient, and at block 1510, wearable device 100 can receive the user's selection. In some instances, interface screens similar to those shown in FIGS. 11-13 can be used. For example, the user can send a text to an arbitrary phone number by entering the number into keypad 1202 of screen 1200, or the user can select a contact from screen 1300. In some embodiments, the same list of contacts can be used for both calls and text messages; in other embodiments, a user can define different lists of favorite contacts for different communication media.

Figure 16:
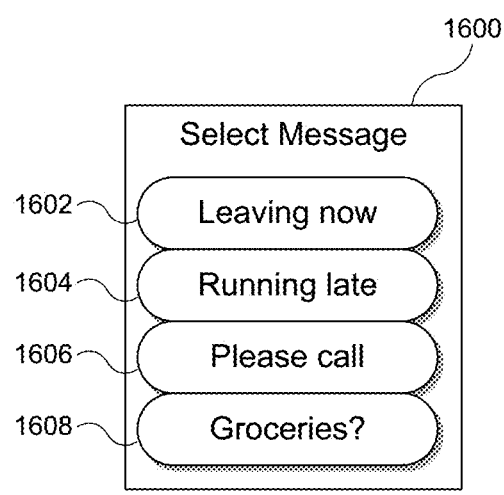
FIG. 16 illustrates a user interface for selecting a predefined message according to an embodiment of the present invention.

At block 1512, wearable device 100 can present the user with options for texts to send, and at block 1514, wearable device 100 can receive the user's selection. For example, similarly to process 400 described above, a user can have a predefined list of texts to send, allowing the user to avoid entering the text character-by-character. FIG. 16 illustrates an interface screen 1600 for selecting a predefined text message that can be used at block 1512. The predefined text messages can be different depending on whether the user is initiating a new text message (as in process 1500) or responding to a received text message (as in process 400). For example, button 1602 can be associated with a text such as "I'm leaving now" and button 1604 with a text such as "I'm running late," which are examples of text messages that a user might send to a person she is going to meet. Button 1606 can be associated with a text such as "Please call me," which requests the recipient to take a particular action. Button 1608 can be associated with a text such as "Do you need anything from the grocery store?" which a user might send while on the way to the store. Other options can be provided in addition to or instead of these examples, and in some embodiments the user can define specific text messages and short identifiers in a manner similar to that described above with reference to FIG. 7.

In some embodiments, wearable device 100 can provide an option to enter an arbitrary text using alphanumeric or other character systems. For example, each character in a character system can be mapped to a different touch gesture, and a user can enter text by making touch gestures on touchscreen display 105. As another example, each character can be mapped to a different sequence of taps (e.g., Morse code or the like), and a user can enter text by tapping touchscreen display 105. As yet another example, touchscreen display 105 can present a compact virtual keypad in which a character is determined based on the key location and number of times the user taps the key.

At block 1516, wearable device 100 can instruct the host device to send the text message and can provide an identifier of the intended recipient (e.g., phone number or name) and an identifier of the text to be sent; the identifier can be, e.g., an index, a short identifier, or the actual text entered or selected by the user. As in process 900 described above, host device 102 can use the recipient identifier to determine the phone number, and as in processes 400 and 800 described above, host device 102 can use a short identifier of the text message to identify the actual message to be sent. In some embodiments, at block 1518, wearable device 100 can receive a confirmation from host device 102 that the text was sent and/or received; if desired, wearable device 100 can present a corresponding alert or informational message to the user.

It will be appreciated that the communication-initiation processes described above are illustrative and that variations and modifications are possible. Steps described as sequential may be executed in parallel, order of steps may be varied, and steps may be modified, combined, added or omitted. Messages can be sent using various communication media and formats, including text messages (sent, e.g., via a short messaging service (SMS) provided by a cellular communication network that carries voice and/or data); email messages, instant messages, social-network messages (any of which can be sent, e.g., via an Internet interface of the host device); and other types of messages.

In some embodiments, a user can define "quick-access" actions, such as "call Mom" or "text Bob that I'm running late" that can be executed with a reduced number of input actions (e.g., a single gesture to bring up a quick-access list, followed by tapping on the appropriate entry). This can facilitate communication by and with users who are in the midst of other activities and find it inconvenient to locate their phone to send a quick message or place a call.

Control over host device functions is not limited to communication functions. For example, in some embodiments, a host device 102 can have media player capabilities, allowing a user to select and play media tracks (e.g., audio and/or video), and wearable device 100 can provide remote control over media playback operations of a host device.

Referring again to FIG. 10, interface screen 1000 for wearable device 100 includes a button 1006 that can be selected to control media playback in a host device. In some embodiments, in response to user selection of button 1006, wearable device 100 can present an interface to select and control media player functions of host device 102. For example, wearable device 100 can display lists of playlists, albums, artists, genres, or songs from which the user can select tracks to play; once a track is playing, wearable device 100 can provide playback controls such as play, pause, skip to previous or next track, rewind, fast-forward, volume control and the like, and the user can control playback using touch gestures on the display device.

In addition or instead, control can be provided based on movement of wearable device 100 itself. For example, accelerometers, gyroscopes, or the like can be used to detect motion of wearable device 100, and certain motions can be defined as spatial gestures, which in turn can be interpreted as controls. Thus, in some embodiments, a user can control the volume, e.g., by circling her wrist or arm clockwise to increase and counterclockwise to lower. Other gestures can be associated with other actions, e.g., a quick up-and-down to play, a quick down-and-up to pause, quick right-then-left to skip ahead, quick left-then-right to skip back, etc. Different gestures can be associated with different control operations as desired.

It is to be understood that other devices can be controlled by a wearable device. For example, a wearable device can provide control over environmental systems (e.g., heating, lights) through an appropriate user interface.

In some embodiments, wearable device 100 (or wearable device 200) can facilitate access to a host device. For example, many users choose to "lock" various devices (e.g., mobile phones, tablet computers, desktop or laptop computers) to prevent unauthorized persons from operating the device. A host device that supports a lock feature can require a user to define a passcode (or other login credential(s) such as a username, secret gesture, or the like) upon activating the lock feature. The host device can thereafter require entry of the previously defined passcode (or supplying of other credential(s)) in order to unlock the device, e.g., when the device awakes from a sleep or screen-off or when a user attempts to operate the device while in its locked state. Some host devices can automatically enter the locked state after a period of inactivity (e.g., 1 minute or 5 minutes), or they can enter the locked state in response to a user input such as operating a button to turn off a display of the mobile device. Since some host devices (e.g., mobile phones) tend to be sporadically used throughout the day, users may find themselves entering their passcodes many times each day.

Some embodiments of the present invention can reduce the need for a user to repeatedly enter a passcode into a host device. For example, wearable device 100 can establish a "verified" session with host device 102. When a user enters a passcode (or other login credentials) into host device 102 while wearing wearable device 100 (e.g., while wearable device 100 is in close proximity to host device 102), host device 102 can alert wearable device 100 to a sign-in event. In response to the sign-in event, wearable device 100 and host device 102 can establish a verified communication session, which can include establishing a session key (e.g., a cryptographic key). Once established, the verified session can continue until either the user removes the wearable device or the devices stop communicating, for instance due to the devices moving out of communication range (e.g., more than roughly 10 meters apart in the case of Bluetooth). At any time during a verified session, the host device can become locked, and the verified session can continue with the host device locked. As long as the verified session continues, the user can unlock the host device, e.g., by bringing the wearable device into close proximity with the host device. This can allow the host device to bypass a passcode requirement (or a requirement for other credentials) and unlock itself based on the presence of the wearable device and the continuing verified session, without requiring the user to re-enter a passcode.

In some embodiments, host device 102 can provide user-identifying information to wearable device 100, e.g., based on the credentials that were used to establish a verified session between host device 102 and wearable device 100. Wearable device 100 can use the user-identifying information to perform various operations such as establishing a persistent user identity for its wearer, selecting user-specific messages to be displayed and/or sent, customizing interfaces for a particular user's preferences (e.g., color schemes, fonts, arrangement of menu options, etc.), and so on.

Figure 17:
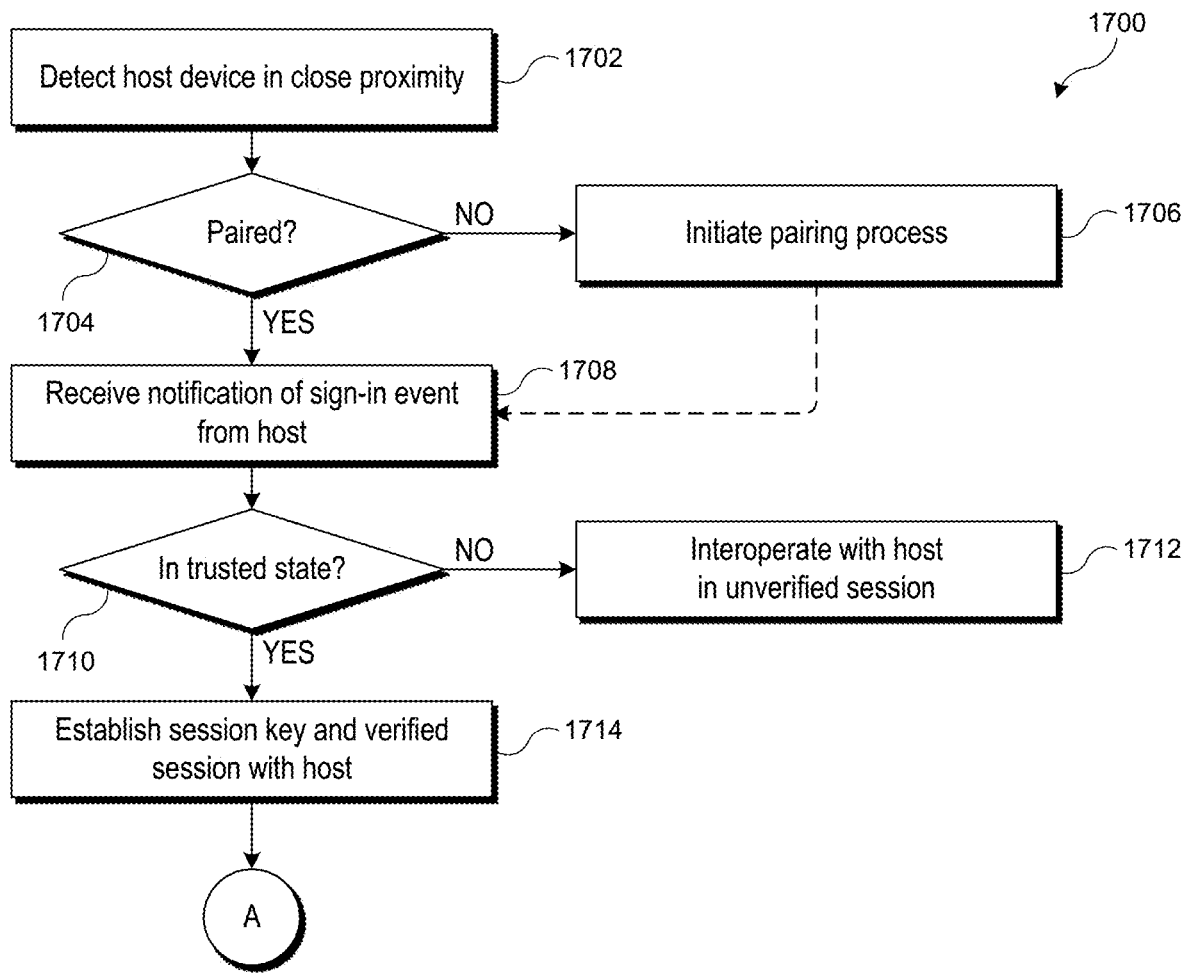
FIG. 17 is a flow diagram of a process for establishing a verified session according to an embodiment of the present invention.
Figure 18:
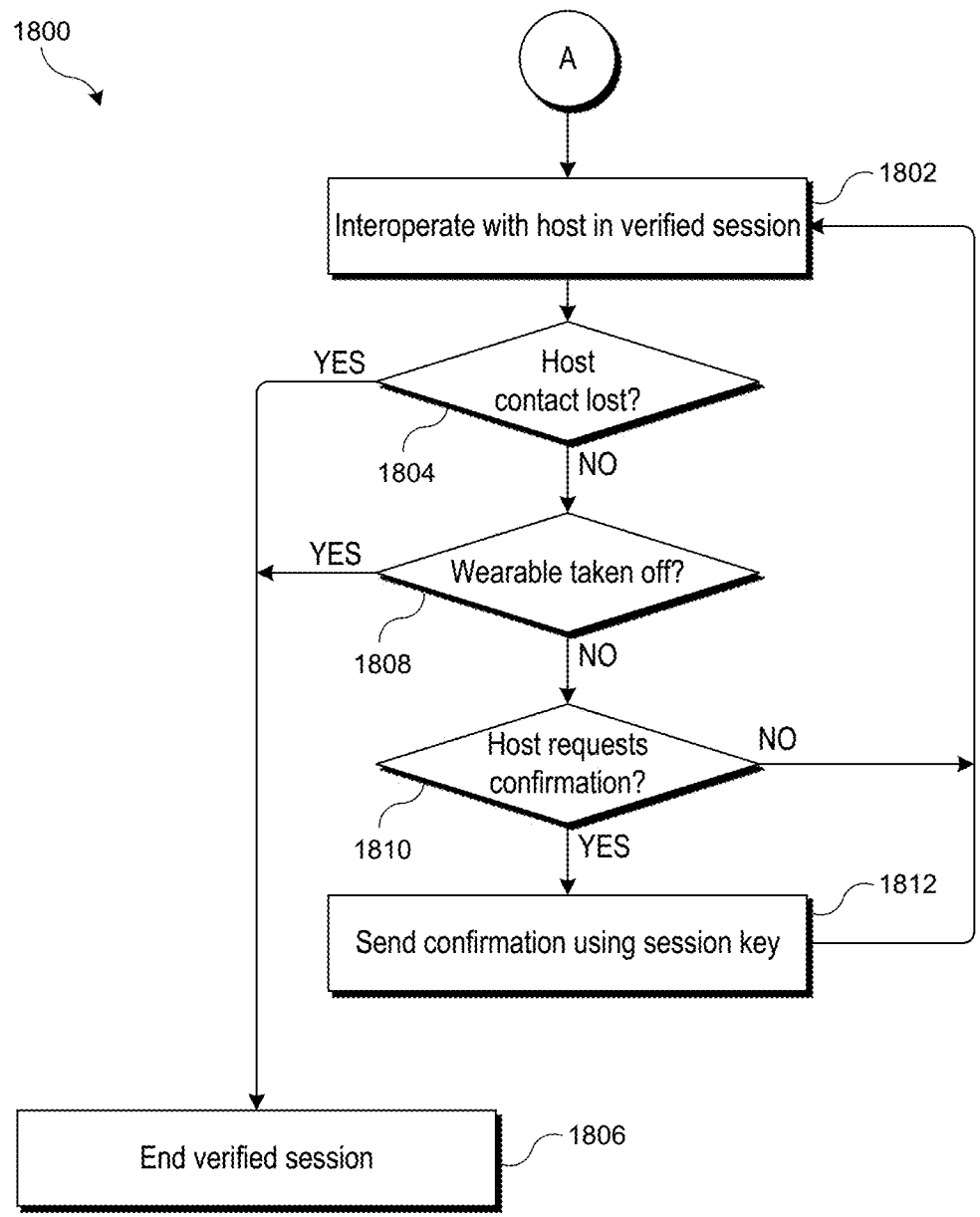
FIG. 18 is a flow diagram of a process for responding to a confirmation request from a host device during a verified session according to an embodiment of the present invention.

Examples of processes that can allow a wearable device to facilitate access to a host device will now be described. FIGS. 17 and 18 are flow diagrams of processes that can be executed by a wearable device, e.g., wearable device 100 of FIG. 1, communicating with a host device, e.g., host device 102 of FIG. 1. FIG. 17 illustrates a process 1700 for establishing a verified session according to an embodiment of the present invention, and FIG. 18 illustrates a process 1800 for responding to a confirmation request from a host device during a verified session according to an embodiment of the present invention. In some embodiments, the implementation of processes 1700 and 1800 can include program code executed by a processor of wearable device 100 (e.g., as part of host security program 260 of FIG. 2).

Referring to FIG. 17, process 1700 can begin at block 1702 when wearable device 100 detects a host device (e.g., host device 102) in close proximity. As used herein, "close proximity" refers to a state in which the devices are within a short enough range of each other to make it likely that the user wearing wearable device 100 is also operating host device 102. For example, if wearable device 100 is a wrist-worn device and host device 102 is a mobile device that would typically be operated while held in a user's hand, it is likely that a user wearing wearable device 100 and operating host device 102 would bring the two devices to within 30 or 60 centimeters of each other. Accordingly, some embodiments can define a threshold distance for close proximity, e.g., at 30 centimeters, 60 centimeters, 100 centimeters, or any other value between 30 and 100 centimeters. Other threshold distances can also be specified. Whether two devices are in close proximity can be determined by comparing the threshold distance to an estimated distance between the devices.

Wearable device 100 can estimate the distance between itself and host device 102 using various techniques. For example, some versions of Bluetooth protocols provide a relative signal strength indicator ("RSSI") that allows a receiving device to compare the actual signal strength of a signal from a transmitting device to a nominal signal strength associated with the transmitting device at a nominal distance. Since signal strength decreases with increasing distance, the receiver (e.g., wearable device 100) can use the RSSI to estimate the distance to the transmitter (e.g., host device 102). Other wireless communication protocols can provide similar techniques, and other techniques can also be used. In some instances, either of host device 102 or wearable device 100 can perform the distance estimation and determine whether the other of wearable device 100 or host device 102 is in close proximity at any given time, and either device can communicate its determination to the other.

At block 1704, wearable device 100 can determine whether it is currently paired with close-proximity host device 102. In some embodiments, if the devices are not paired, then at block 1706, a pairing process can be invoked.

As described above, in some embodiments, establishing an initial pairing may involve user interaction with one or both devices to confirm that the pairing should be established. Once the initial pairing is established, the two devices can automatically reconnect to each other (without further user intervention) any time they come within communication range and are operating their respective RF transceivers.

Assuming the devices are paired, at block 1708, wearable device 100 can receive a notification of a sign-in event from host device 102. A sign-in event can correspond to any occurrence detected by host device 102 that corresponds to the user unlocking host device 102. For example, host device 102 can notify wearable device 100 of a sign-in event when a user enters a correct passcode (or other credential) to unlock host device 102.

At block 1710, in response to receiving the notification, wearable device 100 can determine whether it is in a trusted state. As used herein, a "trusted" state refers to a state in which a sufficient likelihood exists that wearable device 100 is being worn by the same user who is operating host device 102, and in various embodiments, different criteria can be used to determine whether this sufficient likelihood exists. In some embodiments, for instance, wearable device 100 is determined to be in a trusted state if the two following conditions are met: (a) wearable device 100 is currently being worn; and (b) wearable device 100 is in close proximity (as defined above) to host device 102 at a time correlated with the sign-in event. Whether condition (a) is satisfied can be determined, for example, based on strap sensors 216 of FIG. 2 and/or other biometric or physiological sensors. Whether condition (b) is satisfied can be determined, for example, by checking the estimated distance at a time close in time (e.g., within a few microseconds) of receiving the sign-in notification at block 1708. In some embodiments, other conditions can also be applied in addition to or instead of conditions (a) and/or (b). For example, a user identifier ("user ID" or just "ID") can be assigned to wearable device 100 (some techniques for assigning a user ID are described below), and the sign-in event notification can include a user ID of the user who signed into host device 102; accordingly, wearable device 100 can compare its assigned user ID with the received user ID and can require that the user IDs match as a further condition on being in a trusted state.

At block 1710, if wearable device 100 is not in a trusted state, then at block 1712, wearable device 100 can interoperate with host device 102 in an unverified session. Such operation can include initiating and/or receiving communications (e.g., as described above), controlling host device functionality via wearable device 100, and so on. In some embodiments, some functions of host device 102 may not be accessible to wearable device 100 while in an unverified session. For example, wearable device 100 may be usable to respond to a received communication (e.g., using processes 400 and 800 described above) but not to initiate a communication (e.g., using processes 900 and 1400 described above).

If, however, at block 1710, wearable device 100 is in a trusted state, then at block 1714, wearable device 100 can establish a session key and a verified session with host device 102. The session key can incorporate a shared secret (i.e., any information item that is known to wearable device 100 and host device 102 but not generally known or readily determined by other devices) and can be, e.g., a two-factor cryptographic key. Standard cryptographic key-agreement protocols or other protocols for establishing a shared secret can be used. The session key can be usable to encrypt messages sent between host device 102 and wearable device 100, either directly or by using the session key to generate message keys. Particular algorithms and cryptographic schemes can be selected, e.g., based on the level of security desired. In some embodiments, establishing the session key and verified session can include sending various communications between host device 102 and wearable device 100, e.g., to confirm that a verified session has been established at each side and/or to test the session key.

Once a session key is established at block 1714, wearable device 100 can operate in a verified session with host device 102. Referring to FIG. 18, process 1800 can be a continuation of process 1700 and illustrates certain aspects of wearable device operation in a verified session according to an embodiment of the present invention.

At block 1802, wearable device 100 can interoperate with host device 102 in a verified session. The verified session can be established, e.g., in accordance with process 1700. In some embodiments, wearable device 100 can access host device functionality in a verified session that is not accessible in an unverified session. For example, initiating a phone call, text message, or other communication (e.g., as described above) may be permitted only in a verified session. As another example, in some embodiments, host device 102 can bypass a sign-in procedure when transitioning from a locked state to an unlocked state if a verified session is in progress.

During a verified session, the session key can be (but need not be) used to encrypt communications between wearable device 100 and host device 102; some, all, or none of the communications can be encrypted. Encryption can be selective, e.g., based on the sensitivity of the data being communicated.

The verified session can last until a terminating event occurs. For example, the session can be terminated if communication with host device 102 is interrupted or lost. This can occur, for example, if host device 102 (or its RF antenna) is powered down, if the RF antenna of wearable device 100 is powered down, or if host device 102 moves out of range of communication with wearable device 100 (e.g., a distance beyond about 10 meters for Bluetooth). Accordingly, while the verified session is in progress, at block 1804, wearable device 100 can periodically determine whether host device 102 is still present. For example, wearable device 100 can listen for a "heartbeat" or other periodic signal indicating the continued presence of host device 102, or wearable device 100 can ping host device 102 and listen for a response. Communication of information (e.g., an event notification) from host device 102 that is received by wearable device 100 can also serve as confirmation that host device 102 is still present. If contact with host device 102 is lost, then at block 1806, wearable device 100 can end the verified session.

As another example, in some embodiments, a verified session can be ended if wearable device 100 ceases to be worn by the user (also referred to as being "taken off"). Accordingly, if host device 102 remains in communication at block 1804, then at block 1808 wearable device 100 can determine if the user has taken off wearable device 100. For example, strap sensors 216 of FIG. 2 or other biometric sensors of wearable device 100 can be configured to generate an interrupt or other notification to processing subsystem 202 in the event that a change occurs indicating that the user has removed wearable device 100. Examples can include clasp sensors 250 detecting that clasp members 108a, 108b have become disengaged; contact sensor 252 detecting a loss of pressure or galvanic skin response; or pulse sensors, skin temperature sensors, and/or other biometric sensors detecting cessation of biometric activity. Any combination of sensor signals can be used to detect wearable device 100 being taken off. If wearable device 100 is taken off, the verified session can end at block 1806.

Ending the verified session at block 1806 can include various actions, such as updating state information of wearable device 100 to indicate that it is not in a verified session, destroying or invalidating the session key, and/or sending a notification to host device 102 to report that wearable device 100 has ended the verified session. After ending the verified session, wearable device 100 can continue to communicate with host device 102 (in an unverified session), and a new verified session can subsequently be established (e.g., by performing process 1700 of FIG. 17).

Assuming no event that ends the verified session has occurred, the verified session can continue. From time to time, at block 1810, host device 102 can request a session confirmation from wearable device 100. For instance, as described below, user access to some features and/or functionalities of host device 102 may depend on whether a verified session has been established. Accordingly, when a user attempts to access such features or functionalities, host device 102 can confirm that the verified session is still in progress as a condition of permitting the attempted access. To obtain confirmation, host device 102 can send a session confirmation request to wearable device 100, and wearable device 100 can receive the request at block 1810.

At block 1812, in response to a request for session confirmation, wearable device 100 can generate and send a response. The response can be based at least in part on the session key. For example, host device 102 can send a request for session confirmation that includes a random nonce. Wearable device 100 can encrypt the random nonce based on the session key (or a message key derived from the session key) and include the encrypted random nonce in its response. As described below, host device 102 can use the encrypted random nonce and its own session key to validate the response.

Figure 19:
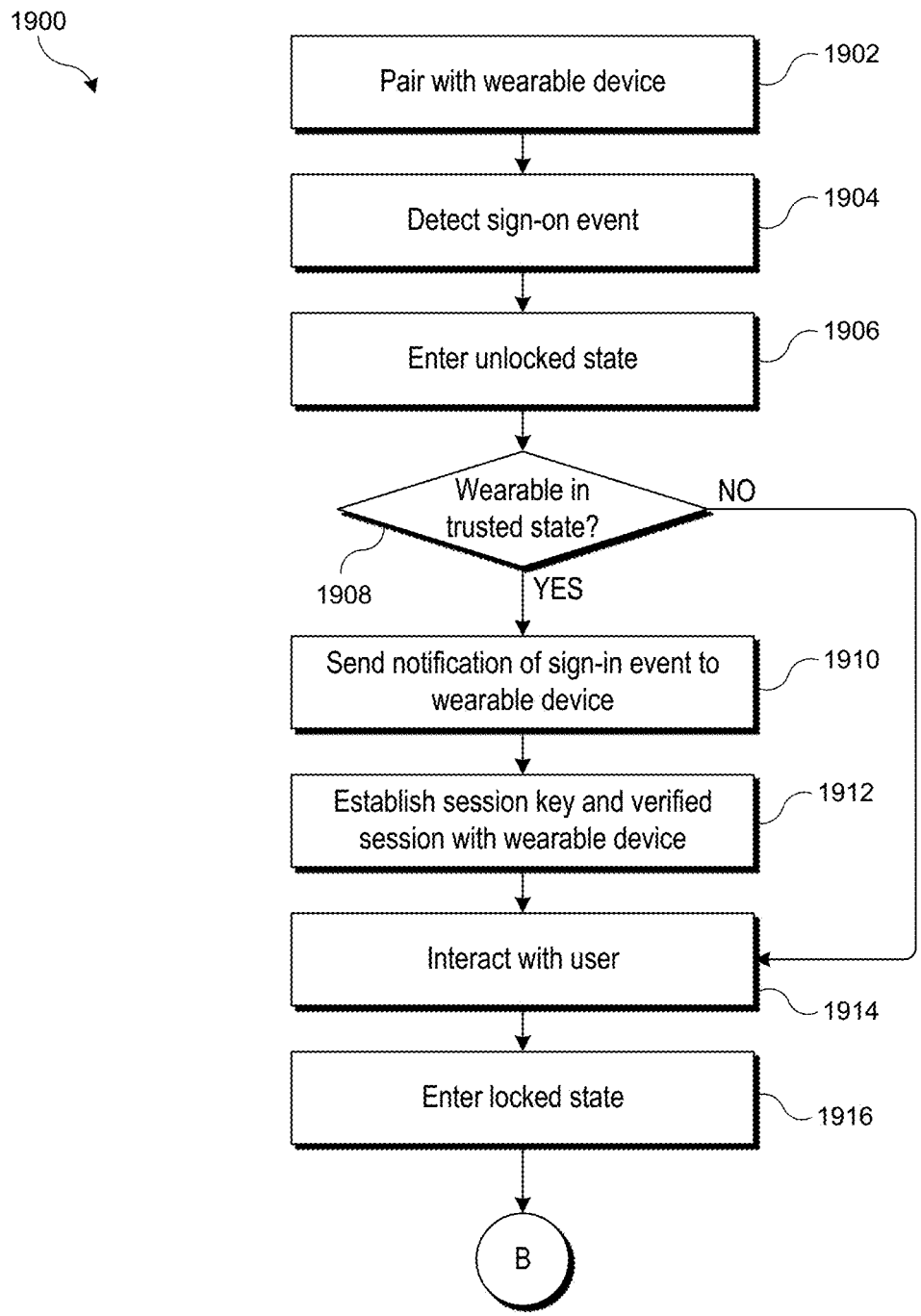
FIG. 19 is a flow diagram of a process for establishing a verified session according to an embodiment of the present invention.
Figure 20:
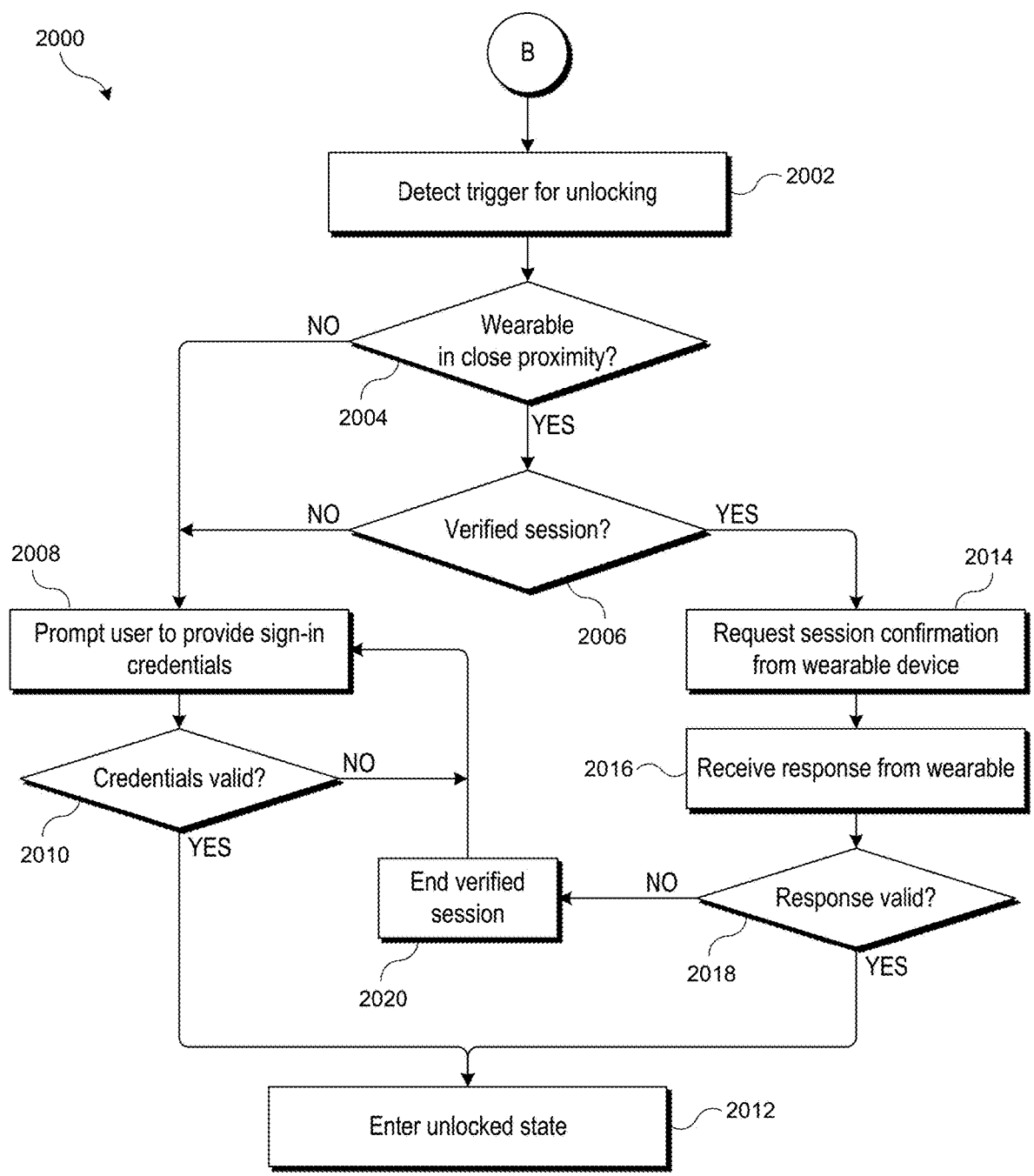
FIG. 20 is a flow diagram of a process for unlocking a host device according to an embodiment of the present invention.

In some embodiments, host device 102 can use the existence of a verified session as a security measure, which can supplement and/or substitute for other security measures provided by host device 102. For example, once a verified session has been established based on a user signing in to unlock host device 102, host device 102 can bypass a requirement for signing in during subsequent unlocking events. FIGS. 19 and 20 are flow diagrams of processes that can be executed by a host device, e.g., host device 102 of FIG. 1, communicating with a wearable device, e.g., wearable device 100 of FIG. 1. FIG. 19 illustrates a process 1900 for establishing a verified session according to an embodiment of the present invention, and FIG. 20 illustrates a process 2000 for unlocking a host device during a verified session according to an embodiment of the present invention. In some embodiments, the implementation of processes 1900 and 2000 can include program code executed by a processor of host device 102.

Referring to FIG. 19, process 1900 can begin at block 1902, where host device 102 can pair with wearable device 100. The pairing process can be similar to processes described above. At block 1904, host device 102 can detect a sign-in event. For example, a user may turn on a display or other interface of host device 102, which can trigger host device 102 to present a sign-in prompt, e.g., prompting the user to enter a passcode, and the user can respond to the prompt, e.g., by entering the passcode. A successful response by the user can generate a sign-in event, ant at block 1906, host device 102 can enter an unlocked state.

At block 1908, host device 102 can determine whether wearable device 100 is in a trusted state. The determination can be based on criteria described above (or other criteria), and the criteria can be tested by host device 102 and/or wearable device 100. For example, host device 102 can determine whether wearable device 100 is in close proximity, e.g., using RSSI as described above. Host device 102 might not be able to determine directly whether wearable device 100 is being worn; in some embodiments, host device 102 can query wearable device 100 as to whether it is being worn, while in other embodiments, host device 102 can infer whether wearable device 100 is being worn based on subsequent responses from wearable device 100.

If wearable device 100 is determined to be in the trusted state, then at block 1910, host device 102 can send a notification of the sign-in event to wearable device 100. (This can be the notification received at block 1708 of process 1700 described above.) At block 1912, host device 102 can establish a session key and a verified session with wearable device 100. The session key can be identical or complementary to the session key established by wearable device 100 at block 1714 of process 1700, and the same cryptographic or other techniques can be implemented on both devices. In some embodiments, establishing the session key can include sending various communications between host device 102 and wearable device 100, e.g., to confirm that a verified session has been established at each side. In some embodiments, if wearable device 100 is not being worn or otherwise detects that criteria for being in a trusted state are not currently met, wearable device 100 can decline to establish the verified session.

At block 1914, host device 102 can interact with the user within the verified session. In some instances, interaction with the user can also include interaction with wearable device 100, e.g., to send or receive phone calls and/or other communications as described above. As noted above, in some embodiments, host device 102 can selectively allow the user to access certain functionality based on the verified session, and host device 102 can send session confirmation requests to wearable device 100 at any time. The session key can be (but need not be) used to encrypt communications that may occur between host device 102 and wearable device 100; some, all, or none of the communications can be encrypted. Encryption can be selective, e.g., based on the sensitivity of the data being communicated.

At block 1916, host device 102 can enter a locked state. For example, host device 102 can be programmed or otherwise configured to automatically enter the locked state after a specified period of inactivity (e.g., 1 minute, 2 minutes, 5 minutes, 30 minutes, etc.). As another example, a user may be able to place host device 102 into the locked state, e.g., by operating a lock control. In some embodiments, entering the locked state can include turning off a display device and/or powering down other components.

Entering the locked state at block 1916 does not necessarily terminate the verified session. For example, if host device 102 remains in communication with wearable device 100 and wearable device 100 continues to be worn, the verified session can continue. The continuance of the verified session after locking of host device 102 can facilitate further user operation of host device 102, e.g., by allowing the user to bypass the sign-on process when unlocking host device 102.

Referring to FIG. 20, process 2000, which can be a continuation of process 1900, illustrates certain aspects of host device operation in a verified session according to an embodiment of the present invention.

A locked host device 102 can detect a triggering event for an unlocking operation at block 2002. For example, a user may pick up host device 102 or press a button indicating a desire to resume use. At block 2004, host device 102 can determine whether wearable device 100 is currently in close proximity to host device 102. Close proximity can be determined using the same techniques and definitions described above. In the process as shown in FIG. 20, lack of close proximity at block 2004 does not end the verified session; however, in some embodiments, the verified session can end.

At block 2006, host device 102 can determine whether a verified session is currently established with wearable device 100 that is in close proximity. For example, host device 102 can determine whether it has a valid session key and/or state information indicating that a verified session is currently established. If not, then host device 102 can determine that a verified session is not currently established. As another example, if host device 102 is in a verified session state but communication with wearable device 100 has been interrupted or lost, host device 102 can determine that a verified session is not currently established. As yet another example, if wearable device 100 has sent a notification that a verified session has ended, host device 102 can determine that a verified session is not currently established.

If wearable device 100 is not in close proximity (at block 2004) or if a verified session is not currently established (at block 2006), then at block 2008, host device 102 can prompt the user to provide a passcode or other sign-in credentials. At block 2010, if the user provides valid credentials, host device 102 can enter the unlocked state at block 2012. If the user does not provide valid credentials, process 2000 can return to block 2008 to prompt the user to retry. In some embodiments, the number of retries can be limited to prevent device tampering, and process 2000 can exit if the user repeatedly fails to provide valid credentials at block 2010. (Other consequences, such as erasing data from host device 102, can also ensue.)

It should be noted that if wearable device 100 is in close proximity when the user enters valid credentials at block 2010, this can result in establishing a new verified session, e.g., in accordance with process 1900 described above.

If, at block 2006, a verified session is in progress, prompting the user for sign-in credentials can be bypassed. For example, at block 2014, host device 102 can request a session confirmation from wearable device 100. For example, host device 102 can send a request for session confirmation that includes a random nonce. At block 2016, host device 102 can receive a response from wearable device 100. For example, wearable device 100 can encrypt the random nonce based on the session key (or a message key derived from the session key) and include the encrypted random nonce in its response. At block 2018, host device 102 can determine whether the response is valid. For example, host device 102 can use the encrypted random nonce and its own session key to validate the response.

If the response is valid, then at block 2012, host device 102 can enter the unlocked state, without prompting the user for sign-in credentials. In some embodiments, host device 102 can provide an indication to the user that the normal sign-in process is being bypassed due to the presence of wearable device 100, e.g., by briefly displaying an icon representing wearable device 100 or by providing a substitute prompt, such as a prompt inviting the user to operate a touchscreen control to begin using host device 102 rather than prompting the user to enter a sign-in credential.

If, at block 2018, the response is not valid, then at block 2020, host device 102 can end the verified session. Ending the verified session at block 2020 can include various actions, e.g., updating state information of host device 102 to indicate that it is not in a verified session, destroying or invalidating the session key, and/or sending a notification to wearable device 100 to report that host device 102 has ended the verified session. After ending the verified session, host device 102 can continue to communicate with wearable device 100 (in an unverified session), and a new verified session can subsequently be established.

After ending the verified session at block 2020, host device 102 can prompt the user to provide sign-in credentials at block 2008. As noted above, in some instances, this can result in establishing a new verified session.

It will be appreciated that the verified-session processes described above are illustrative and that variations and modifications are possible. Steps described as sequential may be executed in parallel, order of steps may be varied, and steps may be modified, combined, added or omitted. For instance, ending a session can be driven by interrupts when session-ending conditions are detected by either device, and either device can send a notification to the other if a session-ending event occurs. In some embodiments, either device (or both devices) can also alert the user to the establishment and/or ending of a verified session.

Session confirmation requests from a host device can be sent at any time. If a wearable device receives a session confirmation request when a verified session is not in progress (either before any verified session has been established or after the most recent verified session has been terminated), the wearable device can return a response indicating that no verified session exists, and the host device can proceed accordingly.

In some embodiments, a wearable device can send context information along with a response to a session confirmation request. This context information can include any information the wearable device has that is indicative of user activity or otherwise suggestive of the user's likely intent in operating the host device at that particular time. The host device can use the context information in its interaction with the user, e.g., to present information and/or interfaces that correspond to a user intent inferred from the context information (and in some instances other information available to host device 102). For example, as described above with reference to FIGS. 4-8, wearable device 100 can receive a notification of an incoming text message and present an alert to the user. If, rather than responding via wearable device 100, the user picks up host device 102 and triggers an unlock event, host device 102 can obtain the context information— in this case that wearable device 100 presented an incoming-text alert to which the user has not responded—and can proceed accordingly, e.g., by unlocking and immediately launching a text messaging app, based on an inference that the user most likely wants to read and/or respond to the received text message. Other examples of context information can include alerts regarding missed calls, voice mail messages received, stock market alerts, and so on. In some embodiments, context information is sent only if host device 102 and wearable device 100 are in close proximity when the request for session confirmation is sent.

In some embodiments described above, bringing host device 102 and wearable device 100 into close proximity (e.g., within 30 or 60 centimeters of each other) is a prerequisite for establishing a verified session; however, once the verified session is established, continued close proximity is not required as long as the devices remain in communication with each other. This can allow a user to establish a verified session, then put down the host device and do other activities (e.g., moving around a room where the host device is present) without ending the verified session. In other embodiments, other proximity criteria can be used. For example, requiring continuous close proximity to maintain a verified session can provide a higher degree of security. As another example, establishing a verified session need not require close proximity. All distance and proximity criteria described herein can be modified as desired, and different proximity criteria can be established for different actions. For instance, proximity criteria for establishing a verified session and subsequently allowing bypass of a sign-in operation can be based on different threshold distances.

A verified session can last indefinitely, until a terminating event occurs. Terminating events can be defined as desired and are not limited to the examples described above. In some embodiments, a verified session can have a maximum duration (e.g., four, eight, twelve, or twenty-four hours) after which it automatically ends, and a new sign-in event can be required to establish a new verified session. Powering down wearable device 100, host device 102, or various components thereof can also terminate a verified session.

Figure 21:
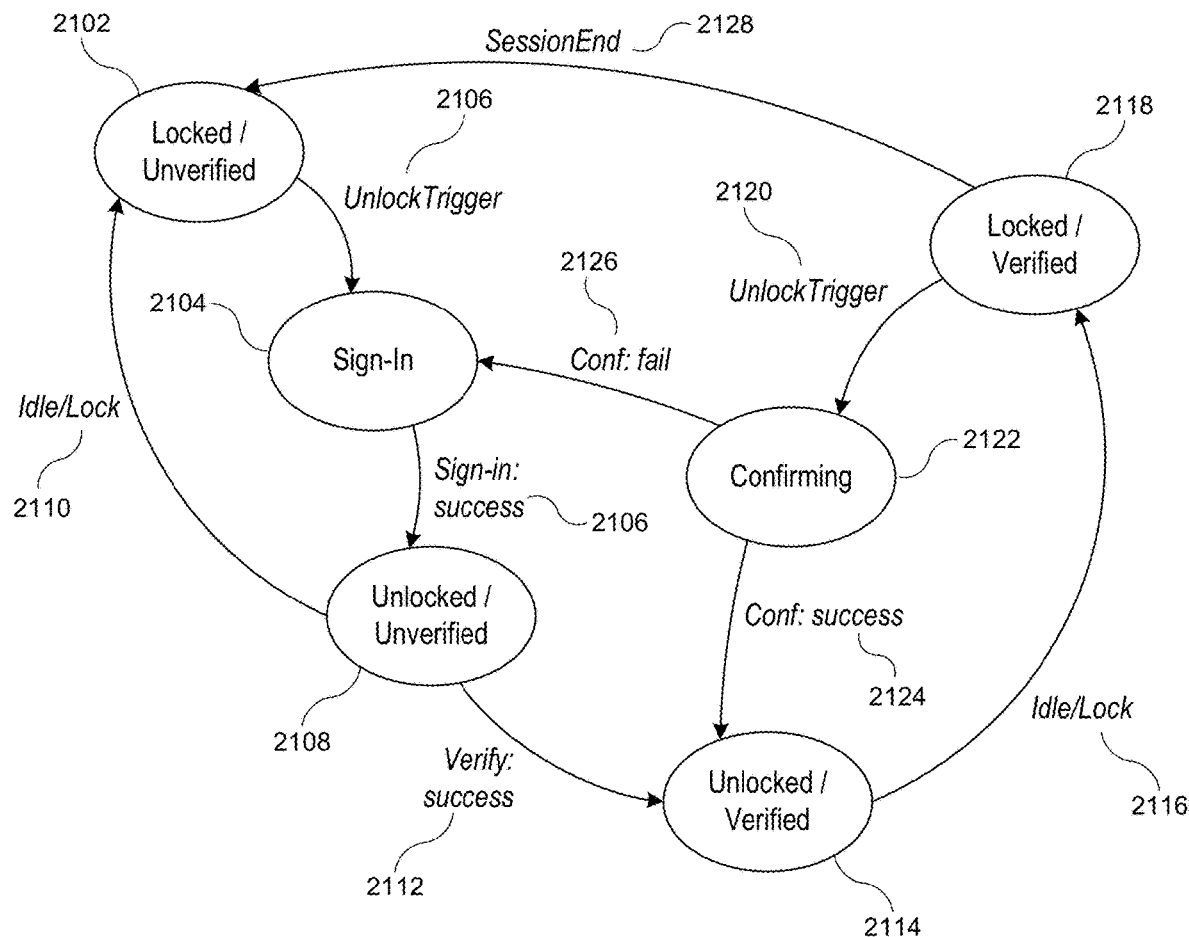
FIG. 21 shows a simplified state diagram for a host device according to an embodiment of the present invention.
Figure 22:
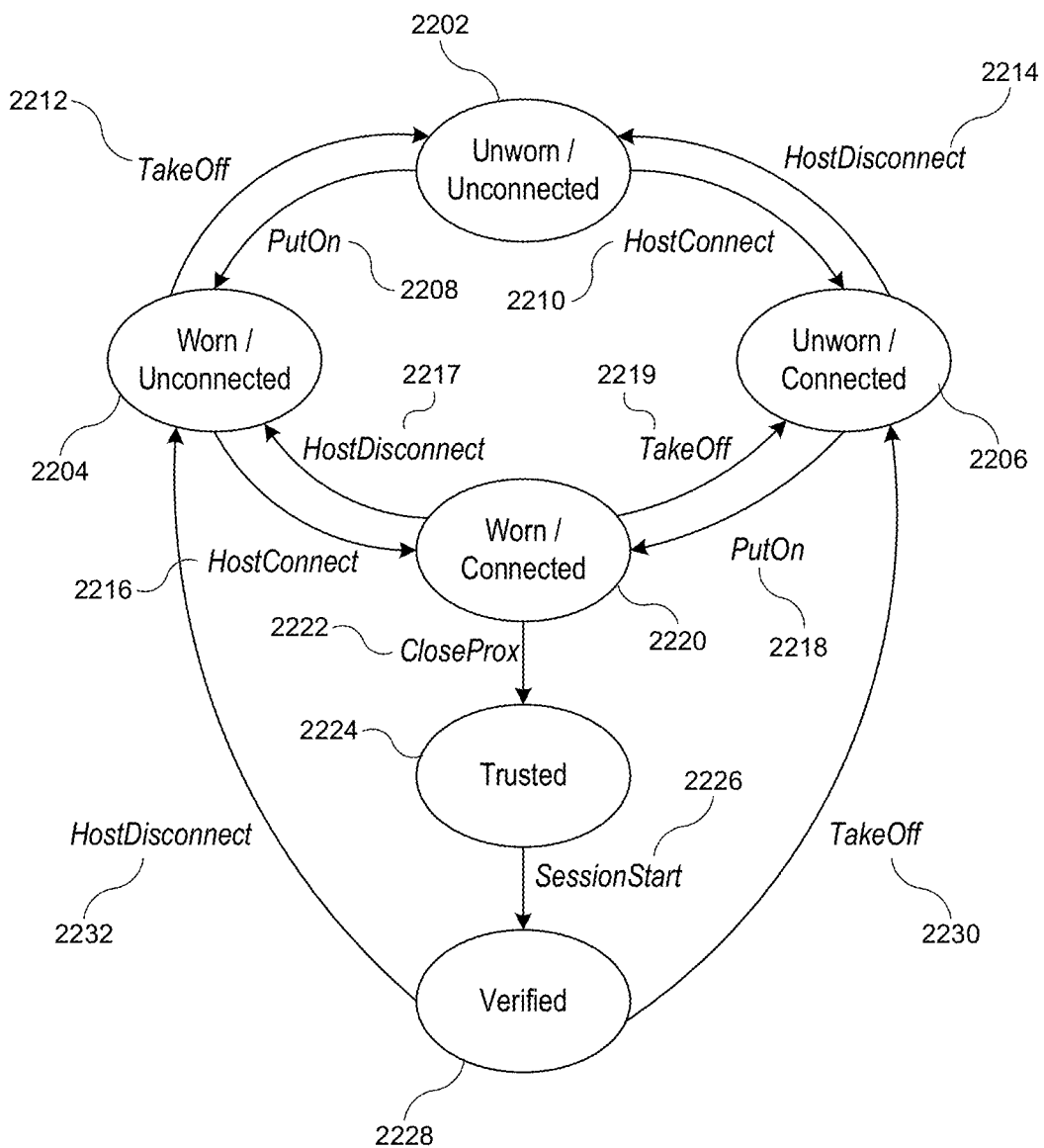
FIG. 22 shows a simplified state diagram for a wearable device according to an embodiment of the present invention.

A further understanding of verified sessions can be had with reference to the state diagrams in FIGS. 21 and 22. FIG. 21 shows a simplified state diagram for a host device according to an embodiment of the present invention. The states and transitions shown relate to verified sessions and locking and unlocking the device. These states can occur, e.g., during the course of executing processes 1900 and 2000 described above.

For example, a host device, e.g., host device 102, can initially be in a locked/unverified state 2102. In this state, host device 102 is locked, and some or all functionality is not accessible without entry of user credentials. Further, "unverified" signifies that a verified session with a wearable device 100 is not currently established.

Host device 102 can transition from locked/unverified state 2102 to sign-in state 2104 in response to an unlock trigger event 2106. Various events can serve as unlock triggers. For example, if a display of host device 102 is turned off, user operation of a button or other control that turns on the display can be an unlock trigger. In some embodiments where host device 102 is equipped with motion sensors, certain motions of host device 102 (e.g., corresponding to a user picking up host device 102) can be interpreted as unlock triggers. Other examples include a device being plugged into or otherwise physically connected to host device 102, an increase in light level at a light sensor of host device 102, etc. In sign-in state 2104, host device 102 can prompt a user for sign-in credentials.

In response to successful sign-in (event 2106), host device 102 can transition to unlocked/unverified state 2108. In this state, host device 102 is unlocked and at least some of its functions are accessible to a user, but a verified session with a wearable device is not currently established. An idle/lock event 2110 can occur, e.g., if user activity ceases for a predefined time interval, or if the user actively locks host device 102. In response to idle/lock event 2110, host device 102 can transition back to locked/unverified state 2102.

If wearable device 100 is in a trusted state (e.g., based on close proximity and/or other criteria) when host device 102 enters unlocked/unverified state 2108, host device 102 and wearable device 100 can establish a verified session, e.g., as described above. Successfully establishing the verified session (event 2112) allows host device 102 to transition to unlocked/verified state 2114.

From unlocked/verified state 2114, an idle/lock event 2116 (which can be predicated on any of the same occurrences as event 2110) allows host device 102 to transition to locked/verified state 2118 rather than back to locked/unverified state 2102.

While host device 102 is in locked/verified state 2114, an unlock trigger event 2120 can occur. Any event that can serve as unlock trigger event 2106 can serve as unlock trigger event 2120. However, instead of transitioning to sign-in state 2104, a host device 102 that is in locked/verified state 2114 can transition to confirming state 2122. In this state, host device 102 can send a session confirmation request to wearable device 100 and receive a response, e.g., as described above. If the response is valid, confirmation success event 2124 allows host device 102 to transition back to unlocked/verified state 2114. If the response is not valid, confirmation fail event 2126 allows host device 102 to transition back to sign-in state 2104.

In some embodiments, a verified session can end while host device 102 is in locked/verified state 2118. For example, host device 102 can receive a notification from wearable device 100 that the session has ended (e.g., because the user has taken off wearable device 100), contact with wearable device 100 can be lost (e.g., due to wearable device 100 moving out of communication range), or host device 102 can determine that the verified session has expired (e.g., based on a predefined limit on session duration as described above). When a verified session ends while host device 102 is in locked/verified state 2118, session end event 2128 can cause a transition to locked/unverified state 2102.

Turning to the wearable device, FIG. 22 shows a simplified state diagram for a wearable device according to an embodiment of the present invention. The states and transitions shown relate to verified sessions between a wearable device and a host device. These states can occur, e.g., during the course of executing processes 1700 and 1800 described above.

For example, a wearable device, e.g., wearable device 100, can initially be in unworn/unconnected state 2202. In this state, wearable device 100 is not being worn by a user (e.g., as determined from strap sensors 216 of FIG. 2 or other biometric sensors) and is also not connected to (e.g., paired and/or communicating with) any host device.

From unworn/unconnected state 2202, wearable device 100 can transition to either worn/unconnected state 2204 or unworn/connected state 2206. Transition to worn/unconnected state 2204 can occur if wearable device 100 detects that the user has put it on (event 2208), and transition to unworn/connected state 2206 can occur if wearable device 100 establishes communication (e.g., initial pairing or re-establishing a previous pairing) with a host device, e.g., host device 102 (event 2210). These transitions can reversible. As shown, a take-off event 2212 (which can include, e.g., sensor signals indicating the user has removed wearable device 100) can return wearable device 100 from worn/unconnected state 2204 to unworn/unconnected state 2202, and host-disconnect event 2214 (which can include, e.g., host device 102 moving out of range) can return wearable device 100 from unworn/connected state 2206 to unworn/unconnected state 2202

Alternatively, a wearable device that is worn but unconnected (state 2204) can become connected to a host in host connection event 2216 (which can be any of the same events as event 2210), and a wearable device that is connected but unworn (state 2206) can become worn in response to a put-on event 2218 (which can be any of the same events as event 2208). These transitions can also be reversible via events 2217 and 2219. Thus, there are multiple paths by which wearable device 100 can reach a worn/connected state 2220, in which wearable device 100 is both being worn by a user and in communication with a host device. In some embodiments, a put-on event can occur simultaneously with a host-connect event, and a direct transition (not shown) from state 2202 to 2204 can occur; this transition can also be reversible.

When wearable device 100 is in worn/connected state 2220, it can determine whether it is in close proximity to the host device (e.g., host device 102) with which it is in communication. Detection of close proximity (event 222) can allow wearable device 100 to transition to trusted state 2224. This can be, e.g., the trusted state described above with reference to FIGS. 17-20. While in trusted state 2224, wearable device 100 can detect a session start event 2226, e.g., establishing a session key as described above, and can transition to verified state 2228. In verified state 2226, wearable device 100 can receive and respond to requests for session confirmation from host device 102. Once in verified state 2228, wearable device 100 can remain there indefinitely, irrespective of state transitions that may be occurring in host device 102, such as transitions between unlocked/verified state 2114 and locked/verified state 2116 shown in FIG. 21.

In some embodiments, wearable device 100 can leave verified state 2228 in response to a take-off event 2230 (which can be any of the same events as event 2212) or to a host-disconnect event 2232 (which can be any of the same events as event 2214). Take-off event 2230 can lead to a transition to unworn/connected state 2206, and host-disconnect event 2232 can lead to a transition to worn/unconnected state 2204. In some embodiments, a take-off event can occur simultaneously with a host-disconnect event, and a direct transition from state 2228 to 2202 can occur.

Other events (not shown) can also cause wearable device 100 to exit verified state 2228 and return to a different state. For example, powering down wearable device 100 (or just powering down a communications interface) can cause a transition. As described above, in some embodiments, a verified session can expire after a predefined maximum duration, and expiration of the verified session can cause a transition from verified state 2228 to another state, e.g., worn/connected state 2220 (if wearable device 100 and host 102 remain in communication) or trusted state 2224 (if wearable device 100 and host 102 are in communication and in close proximity when the verified session expires).

It will be appreciated that the state diagrams of FIGS. 21 and 22 are illustrative and that variations and modifications are possible. For instance, the diagrams are not intended to illustrate all possible states or transitions between states, and a particular implementation can involve more states, fewer states, or a different combination of states from those shown. It is to be understood that operations of various kinds can occur within a device or between the devices without causing a state transition between states that are shown. For example, host device 102 can receive a phone call and the user can interact with wearable device 100 to respond to the call without either device changing between the states shown, although those skilled in the art will recognize that other aspects of device state may change.

As described above, a wearable device such as wearable device 100 can determine whether it is being worn and can detect being put on or taken off, e.g., by using various sensors. In some embodiments, a wearable device can also become assigned to a specific user (or user identifier). Being assigned to a specific user can allow the wearable device to customize itself according to the user's preferences. Further, in some embodiments, matching a user ID assigned to a wearable device with a user ID assigned to a host device can further improve security of a verified session.

A user ID can be assigned to a wearable device in various ways. For example, in some embodiments, a user can push a user ID from a host device to a wearable device during a synchronization operation (examples of which are described above). Along with the user ID, the user can push a user profile that can define various preferences (e.g., color schemes or other esthetic preferences, predefined messages that can be sent as described above, options such as when to generate alerts and what type of alert to generate, etc.). In some embodiments, a synchronization operation that pushes a user ID may be restricted to occurring only when a verified session has been established between the wearable device and the host device. The user may also be able to set a passcode (or some other access credential) on the wearable device that prevents changes to the user ID or profile from being made by a host device unless the user confirms by entering the passcode via an interface of the wearable device. It is contemplated that a wearable device can but need not require a passcode for operation, and the wearable device can be selective as to which operations require a passcode. Thus, in some embodiments, a wearable-device passcode can be required only for certain operations designated as sensitive, such as changing a user ID or user profile. (In other embodiments, a wearable-device passcode can be required for any operation, and in still other embodiments, a wearable-device passcode can be omitted entirely.)

Figure 23:
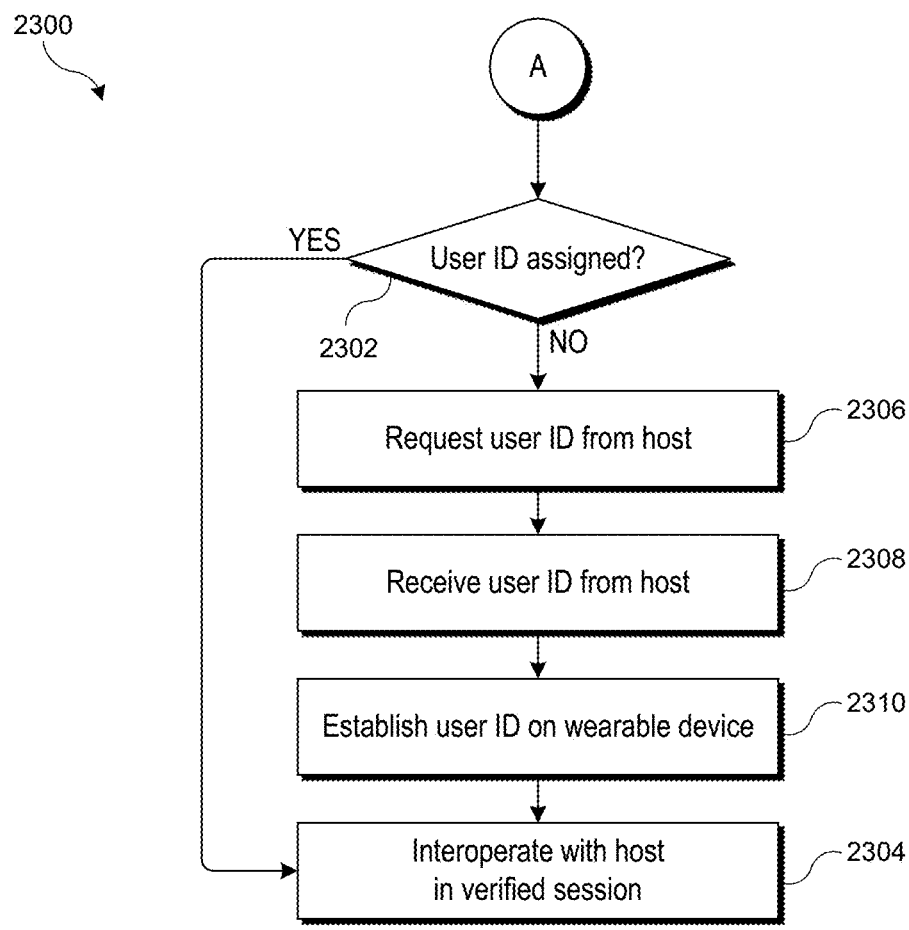
FIG. 23 is a flow diagram of a process for establishing a verified session and a user ID according to an embodiment of the present invention.

In some embodiments, establishing a verified session between a host device and a wearable device can facilitate establishing a user ID for the wearable device. FIG. 23 is a flow diagram of a process 2300 for establishing a verified session and a user ID according to an embodiment of the present invention. Process 2300 can be executed by a wearable device, e.g., wearable device 100 of FIG. 1, communicating with a host device, e.g., host device 102 of FIG. 1. In some embodiments, the implementation of process 2300 can include program code executed by a processor of wearable device 100 (e.g., as part of host security program 260 of FIG. 2), and in some embodiments, process 2300 can be implemented as an extension of processes 1700 and 1800 described above; for instance, node A in FIG. 17 can correspond to node A in FIG. 23.

Process 2300 can begin after a verified session has been established (e.g., at block 1714 of process 1700). At block 2302, wearable device 100 can determine whether it already has an assigned user ID. If so, wearable device 100 can keep its assigned user ID and interoperate with host device 102 in a verified session at block 2304, which can correspond to block 1802 of process 1800; from this point, process 1800 can continue as described above.

If, at block 2302, wearable device 100 does not have an assigned user ID, then at block 2306, wearable device 100 can request a user ID from host device 102. At block 2308, wearable device 100 can receive a user ID from host device 102. As described below, in some embodiments host device 102 can confirm with the user that the ID should be sent before responding to the request. Host device 102 can send the user ID, e.g., in a message encrypted using the session key (or a message key derived from the session key). At block 2310, wearable device 100 can establish the received user ID as its assigned user ID. This can be done without user intervention; alternatively, wearable device 100 can prompt the user to confirm that the user ID should be assigned. In some embodiments, wearable device 100 can use the newly assigned user ID to retrieve a user profile (e.g., from locally stored user data 262 of FIG. 2 or by further requests to host device 102) and can apply various customizations and settings based on the retrieved profile.

Once a user ID is assigned, wearable device 100 can interoperate with host device 102 in a verified session at block 2304. In some embodiments, host device 102 can have the option to refuse to send a user ID, in which case, block 310 can be skipped.

Figure 24:
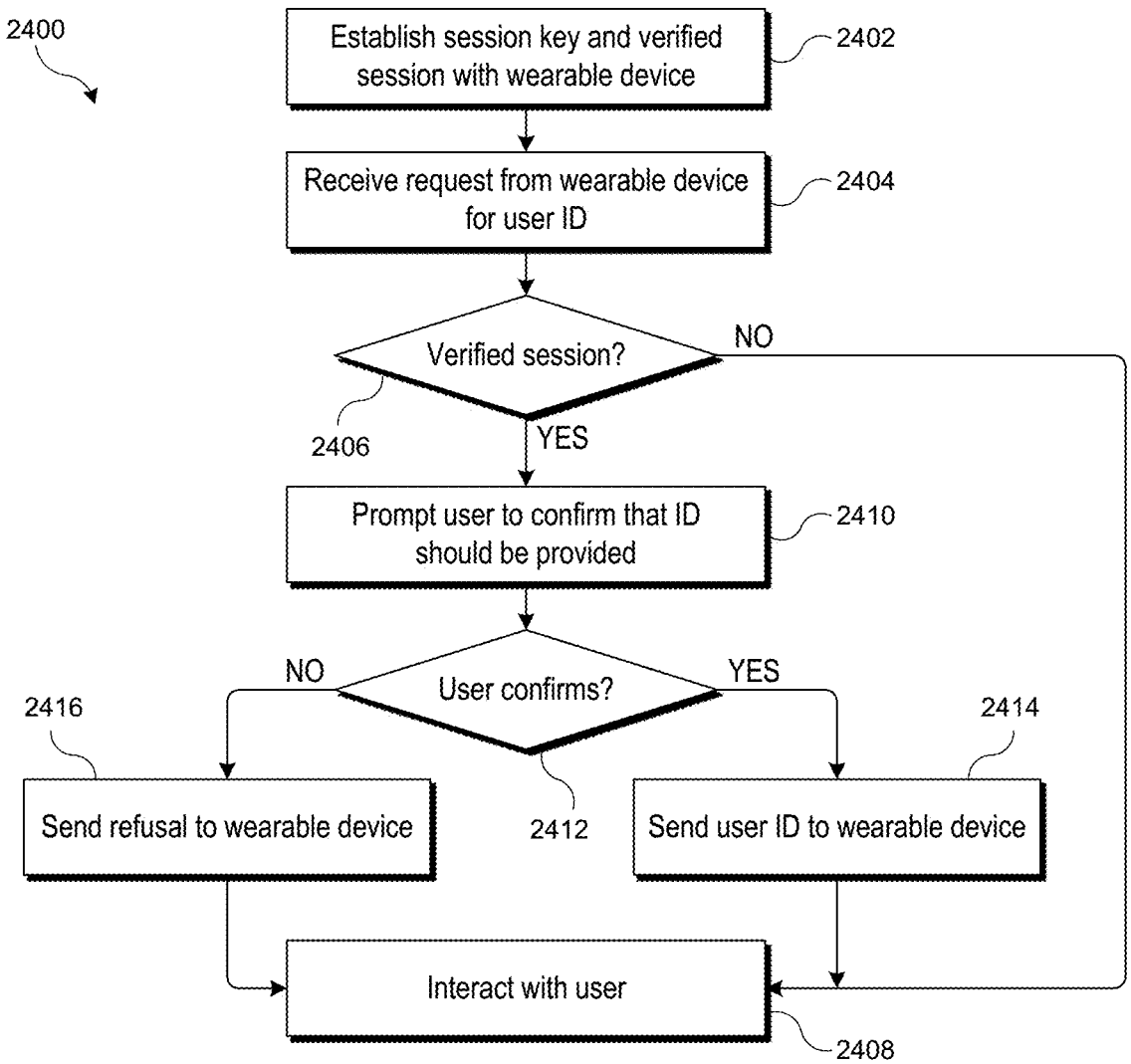
FIG. 24 is a flow diagram of a process for receiving and responding to request for a user ID assignment according to an embodiment of the present invention.

As noted above, a host device can receive and respond to a wearable device's request for a user ID to be assigned. FIG. 24 is a flow diagram of a process 2400 that can be executed by a host device, e.g., host device 102 of FIG. 1, communicating with a wearable device, e.g., wearable device 100 of FIG. 1. In some embodiments, the implementation of process 2400 can include program code executed by a processor of host device 102; process 2400 can be implemented, for example, as an extension to process 1900 of FIG. 19.

At block 2402, host device 102 can establish a verified session with wearable device 100. For example, host device 102 can execute some or all of blocks 1900-1912 of process 1900. At block 2404, host device 102 can receive a request from wearable device 100 for a user ID to be assigned to wearable device 100.

At block 2406, before responding to wearable device 100, host device 102 can confirm that the verified session is still in progress. Confirmation can include, e.g., sending a session confirmation request to wearable device 100 as described above and/or verifying that no interruption in communication with wearable device 100 has occurred. Host device 102 can also implement additional conditions on its response, such as verifying that wearable device 100 is in close proximity before responding to the request. In some embodiments, if the request at block 2404 is received within a predefined interval (e.g., 100 microseconds) of establishing the verified session, host device 102 can treat the session as confirmed. As another example, host device 102 can require that any request to assign a user ID be received within a predefined time interval (e.g., 100 microseconds or 5 seconds) of establishing a verified session and can refuse any request that arrives outside this interval regardless of the current status of the session.

If the decision at block 2406 is negative, then host device 102 can ignore the request and continue to interact with the user at block 2408 (e.g., similarly to block 1914 of FIG. 19). Where a verified session is not in progress, host device 102 can also interoperate with wearable device 100 in an unverified state as described above. In some embodiments, instead of simply ignoring the message, host device 102 can return a refusal message that can indicate that a user ID will not be provided; the refusal message can also include a status code indicating the basis for the refusal.

If, at block 2406, the decision is positive, then at block 2410, host device 102 can prompt the user to confirm that the user ID should be sent to the wearable device. Host device 102 can select a user ID to send, e.g., based on the user ID that is currently signed in to or otherwise associated with host device 102. For example, a host device that is a mobile phone may have a single user ID associated with it and can select that user ID. A host device that is a desktop computer may have multiple user IDs associated with it (e.g., for different family members) and can select the ID based on which user is currently logged in. The user ID can be an ID associated with the user's account on the host device itself or an ID associated with the user's account on a different service such as a cloud-based information storage and retrieval system.

The user confirmation can be a simple yes/no option, or additional options such as selecting a different user ID or defining a new user ID can be presented. In some embodiments where the user ID that the host device proposes to send is associated with a password, passcode, or other identification credential, the host device can prompt the user to provide that credential as part of the confirmation.

Figure 25:
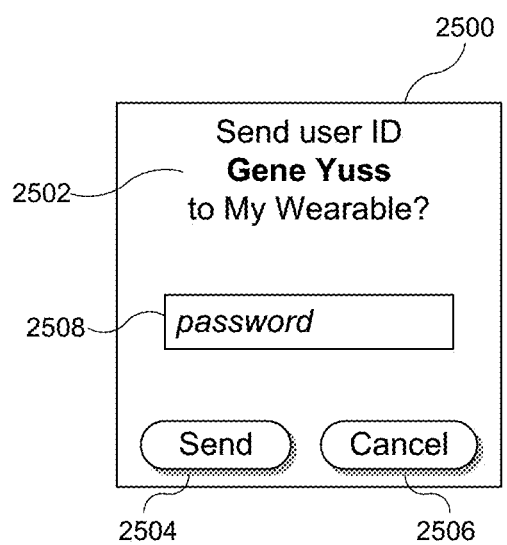
FIG. 25 illustrates an example of an interface screen for confirming a user ID assignment according to an embodiment of the present invention.

FIG. 25 illustrates an example of a confirmation interface screen 2500 according to an embodiment of the present invention. Interface screen 2500 can present a description 2502 of the proposed transaction (sending a specific user ID to a specific wearable device), a confirmation button 2504, and a cancel button 2506. In some embodiments, screen 2500 can also include a password entry section 2508, and the user can be required to enter a password associated with the user ID specified in description 2502 to provide further confirmation that the user of host device 102 is authorized to use the ID that is to be sent. Other screens can also be used.

Referring again to FIG. 24, host device 102 can receive the user's confirmation decision at block 2412. If the user confirms, then at block 2414, host device 102 can send the selected user ID to wearable device 100. The ID can be sent, e.g., in a message encrypted using the session key of the verified session (or a message key based on the session key). If the user does not confirm at block 2412, then at block 2416, host device 102 can send a refusal message to wearable device 100 indicating that a user ID is not being provided. In either case, host device 102 can continue interacting with the user at block 2408. Where a verified session is not in progress, host device 102 can also interoperate with wearable device 100 in an unverified state as described above.

It will be appreciated that the processes for assigning a user ID described above are illustrative and that variations and modifications are possible. Steps described as sequential may be executed in parallel, order of steps may be varied, and steps may be modified, combined, added or omitted. Assignment of a user ID by a host device in response to a request from a wearable device can be subject to a variety of conditions, including but not limited to those described above (verified session, close proximity, time-based constraints, etc.). The amount and kind of user interaction can also be varied. For example, in some embodiments, assignment of a user ID can be accomplished without user intervention; in some embodiments, a wearable device may request a user ID in response to an input from the user (e.g., the wearable device may prompt the user to indicate whether the wearable device should attempt to obtain an ID when it connects to a host device). In some embodiments, user interactions with both the host device and the wearable device can be required, e.g., in order to further increase the difficulty of spoofing a legitimate request.

In some embodiments, wearable device 100 can incorporate its assigned user ID into responses to session confirmation messages. This can provide an additional confirmation to host device 102 that the user is present. For example, if wearable device 100 has a user ID that host device 102 is not expecting, host device 102 can go into locked state or take other actions to prevent unauthorized use.

In some embodiments, a user ID assigned to wearable device 100 can be a persistent property; for example, wearable device 100 can maintain its user ID even after termination of the verified session in which the ID was assigned. If desired, the assignment can be permanent, e.g., retained until a hard reset of wearable device 100 (e.g., restoring factory settings). In other embodiments, a user interface can be provided on wearable device 100 and/or a host device that allows a user to change or clear the assigned user ID, or the assigned user ID can be automatically cleared in response to events such as the user taking off wearable device 100. An assigned ID that has been cleared can be re-established, e.g., by executing processes 2300 and 2400 again.

It is to be understood that clearing an assigned user ID signifies only that the wearable device no longer has a current assigned user ID. For example, the wearable device can continue to store user profile information for that user ID even after it ceases to be the currently assigned ID, although it may discontinue using the user profile information as input to operations. Thus, for example, a particular user's contacts, customized text responses, or the like may only be accessible while the wearable device has that user's ID as its assigned ID; at other times they can be stored on the wearable device but not accessible to the user.

Embodiments described above can facilitate user interaction with a host device, e.g., by allowing the host device to bypass a sign-in process when a verified wearable device is present. This can reduce the user's need to repeatedly enter a passcode or other sign-in credential into the same host device. Operation of a wearable device can also be facilitated, e.g., by allowing the user to establish an identity on the wearable device via a host device and to transfer or synchronize personal settings between the host device and the wearable device.

In some embodiments, defining a pairing (e.g., via Bluetooth pairing or another process) between the host device and the wearable device can be a prerequisite of establishing a verified session. Defining a pairing can refer to any process by which a user indicates to two devices that they should recognize and communicate with each other. In some instances, a pairing can be defined by executing a device discovery process on one device (e.g., the host device) that allows the host device to obtain information about any other wireless devices that happen to be within communication range. The host device can present a list of discovered devices, and the user can select the wearable device as the device to be paired. The host device and wearable device can exchange various information to define the pairing (e.g., device names, MAC addresses or other unique identifiers, security codes, and any other information that may be used to establish an operating communication link between the devices). Once the pairing is defined, the host device and wearable device can automatically re-establish communication whenever each device detects the other within its communication range. Where verified sessions are limited to devices that have a pairing defined, inadvertent creation of verified sessions of one user's host device with another user's wearable device can become less likely. As noted above, in some embodiments, when a host device and a wearable device detect are in proximity but not paired, a pairing process can be invoked, and this can include prompting the user to indicate whether the pairing should be defined or not.

In some embodiments, a user or administrator of a particular host device may have the option to disable bypassing of the sign-in procedure or to select conditions under which bypassing should be allowed. For example, the user or administrator can set distance thresholds for determining close proximity, limits on how far out of close proximity a host device and wearable device can be without ending the verified session, time limits on verified sessions, and so on, limiting the establishment of a verified session to instances where the wearable device already has an assigned user ID (which can be required to be assigned through a separate process such as direct user input into the wearable device or a synchronization operation with a trusted host or the like), and so on.

Certain embodiments of the present invention can use the existence of a verified session to control user access to sensitive information that may be stored in or otherwise accessible to a host device. Sensitive information can include, for example, personal information such as financial account numbers or records, medical records, confidential business documents such as business plans or trade secrets, and any other type of information that may be subject to access restrictions. A host device can execute various application programs (also referred to as "apps") that provide access to sensitive information. The host device and/or the application programs themselves can be configured (e.g., via suitable program code) to restrict a user's ability to invoke program functionality that accesses sensitive information based on whether a verified session with a wearable device is currently in progress.

For example, the host device can maintain information (metadata) identifying an app as "protected," e.g., because the app can provide access to sensitive information. In response to a request to initiate execution of the app (also referred to as "launching" the app), the host device can confirm the verified session with the wearable device (e.g., as described above) and launch the app only if the session is confirmed. Thus, access to an app can be restricted to instances where a wearable device is present and a verified session is in progress. In some cases, further restrictions can be applied; for example, that the user ID assigned to the wearable device matches a user ID associated with the host device.

As another example, an app may have a "public" mode and a "protected" mode of operation. The public mode can support a subset of app functionality that does not involve accessing sensitive information, while the protected mode can support additional functionality that may involve accessing sensitive data. For instance, a banking app may provide public-mode functions such as locating a nearby branch or obtaining general information about available services, which do not involve any particular customer's data and may be of interest to customers and non-customers alike. The same app may also provide protected-mode functions such as checking a specific customer's account balances, paying bills from the customer's account, transferring funds to another account, or the like; such functions do involve sensitive customer data and are not of (legitimate) interest to non-customers. Accordingly, the app can be launched in the public mode regardless of whether a verified session is in progress, while any transition to the protected mode (either upon launch or in response to subsequent user input) can be contingent on determining that a verified session is in progress. In some instances, an app can require both a verified session with a wearable device and user entry of a password or other credential as a condition of accessing protected functionality.

To the extent that the presence of the wearable device and/or the current existence of a verified session between the wearable device and a host device reliably indicates the presence of an authorized user, access restrictions of the kind described herein can help to protect sensitive information against unauthorized access.

Figure 26:
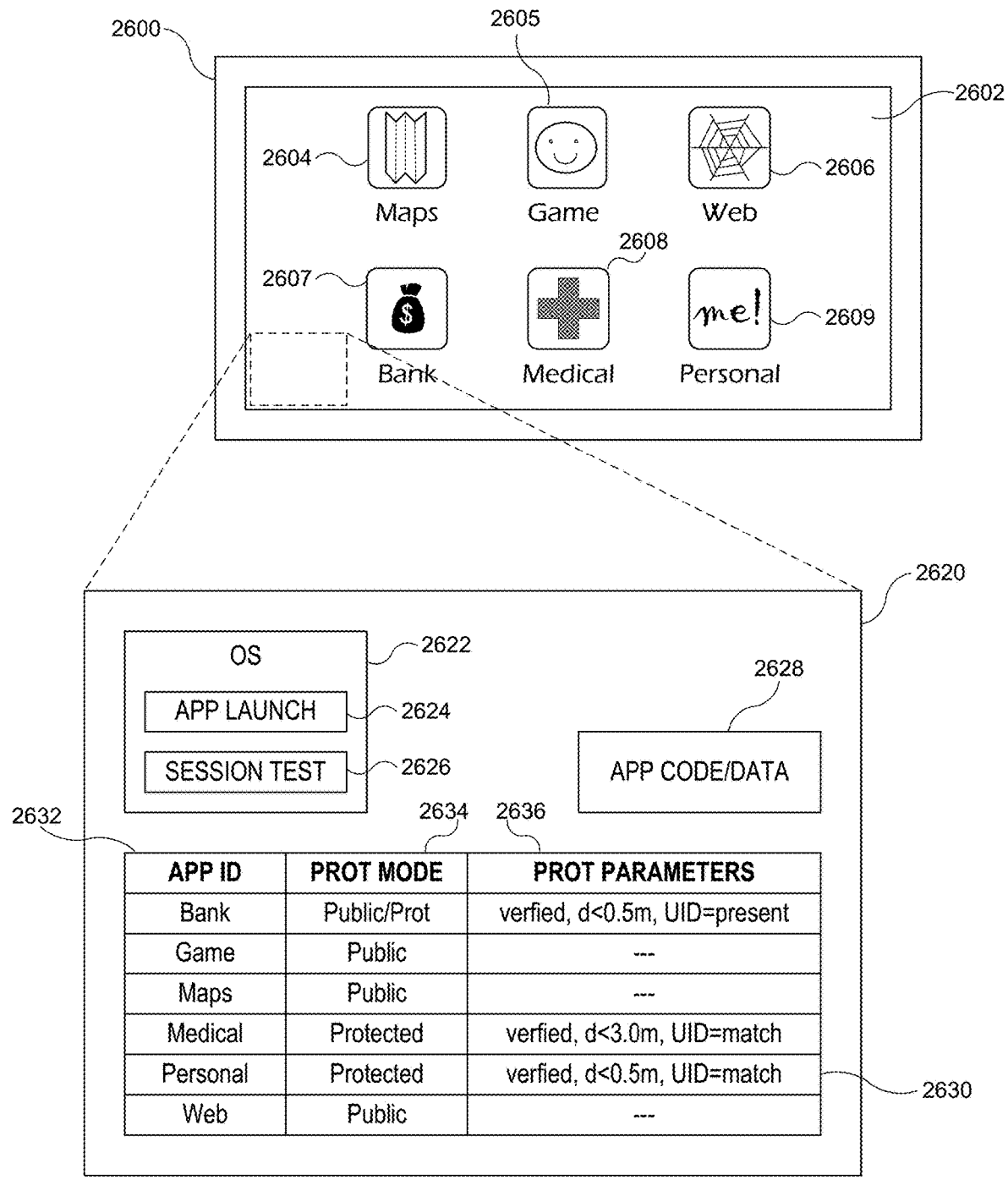
FIG. 26 shows a host device according to an embodiment of the present invention.

Application-level protection can be applied to all, some or none of the apps on a particular host device. FIG. 26 shows a host device 2600 according to an embodiment of the present invention. Host device 2600, which can be an example of host device 102 of FIG. 1, has a display 2602 that can display icons 2604-2609 corresponding to various apps that can be executed on host device 2600. A user can launch an app by selecting the associated one of icons 2604-2609, e.g., by touching the icon on a touchscreen interface or by operating a point-and-click device such as a mouse. A particular user interface is not required.

Any number and combination of apps can be supported by a given host device. In this example, icon 2604 corresponds to a maps app that can display maps of an area and provide navigation assistance. Icon 2605 corresponds to a game app that plays an interactive game with the user (e.g., a video game, puzzle game, or the like). Icon 2606 corresponds to a web browser app that allows the user to obtain and view content from various web servers (e.g., using HTTP and/or other data transfer protocols). Icon 2607 corresponds to a banking app that allows the user to access general information about a bank and to access the user's accounts at that bank (e.g., to view balances, transfer funds, make deposits, pay bills, etc.). Icon 2608 corresponds to a medical app that provides access to the user's medical records and may also provide other information such as general or personalized health tips. Icon 2609 corresponds to a personal-information app that allows a user to collect and store a range of data items including driver's license, passport, and/or other identification records (either numbers or full copies can be stored); credit card and/or other financial account information; and so on. Other apps, or different apps or combinations of apps, can also be used.

Internally, as shown in inset 2620, host device 2600 can store program code and other information. For example, host device 2600 can store an operating system (OS) 2622, which can include components such as an app launcher 2624 that cam be invoked, e.g., when a user selects an app to launch, and a session tester 2626 that can be invoked, e.g., by app launcher 2624, by an executing app, or by other system processes such as an unlocking process described above.

Host device 2600 can also store application program code and data 2628 for various installed apps. As used herein, an app is "installed" if host device 2600 has been provided with sufficient information to access the program code and begin executing it in response to a user instruction to launch an app (e.g., selecting one of icons 2604-2609). Local storage of application program code and/or data is not required; in some instances, host device 2600 can obtain some or all of application program code and data 2628 on demand (e.g., via the Internet or other communication networks).

Host device 2600 can also maintain a metadata table 2630 for installed apps. Table 2630 can have an entry (shown as a row) for each installed app, and each entry can be indexed by an app identifier ("app ID") 2632. The entry can store any information that may be useful to host device 2600 in launching and initializing the app. For instance, an app may save state information upon exit, and host device 2600 can store the state information in table 2630, allowing the app to re-launch later in the same state it was last in. Some apps may also allow a user to customize various settings, such as associated data files or accounts on other systems to be accessed, and customization information can also be stored as metadata in table 2630. As another example, metadata table can include information indicating specific resources required for execution of a given app (e.g., memory requirements, requirements for particular input and/or output devices to be present, network connectivity requirements, any data files or helper apps that must be present, etc.).

In some embodiments, metadata table 2630 can include security settings associated with the app. For example, each entry can include a protection mode 2634, indicating whether launch of the app should be protected by requiring a verified session. In this example, maps app 2604, game app 2605, and web browser app 2606 have a protection mode of "public," meaning that these apps should be launched regardless of whether a verified session is in progress. Medical app 2608 and personal-information app 2609 have a protection mode of "protected," meaning that these apps should only be launched if a verified session is in progress. Banking app 2607 has a protection mode of "prot/public," meaning that the user can be prompted to select whether to launch in protected mode or public mode. It is to be understood that other modes can also be defined and that some embodiments may have more, fewer, or different protection modes than those described herein.

Some embodiments can allow different apps to specify different criteria for allowing protected-mode access; examples are shown as protection parameters 2636. For example, banking app 2607 can require not only that a verified session is in progress but also that the wearable devices is within a distance threshold of 50 centimeters from host device 2600; a short distance threshold makes it very likely that the person wearing the wearable device is not only present but is actually operating host device 2600. Medical app 2608 can require that a verified session is in progress with a different distance constraint, e.g., 3 meters, which makes it likely that the person wearing the wearable device is in the room but is not necessarily operating host device 2600. (The operator could be, for instance, the user's doctor.)

As another example, personal information app 2609 can require not only that a verified session is in progress but also that a user ID assigned to the wearable device matches a current user ID of host device 2600 (UID=match), while banking app 2607 can require that the wearable device has an assigned user ID (UID=present) but not that it matches the host's user ID. As described below, in some embodiments an app that does not require a user ID match between the wearable device and the host can require a user ID match between the wearable device and another account, such as a bank account or other account that the app is attempting to access.

It will be appreciated that host device 2600 is illustrative and that variations and modifications are possible. The particular apps can be modified as desired, and protection modes and protection parameters can be defined in any combination. Host device 2600 can be implemented in computer systems or other electronic devices having a variety of form factors, storage capacities, and processing capabilities, provided that the device is capable of communicating with a wearable device such as wearable device 100 of FIG. 1.

Figure 27:
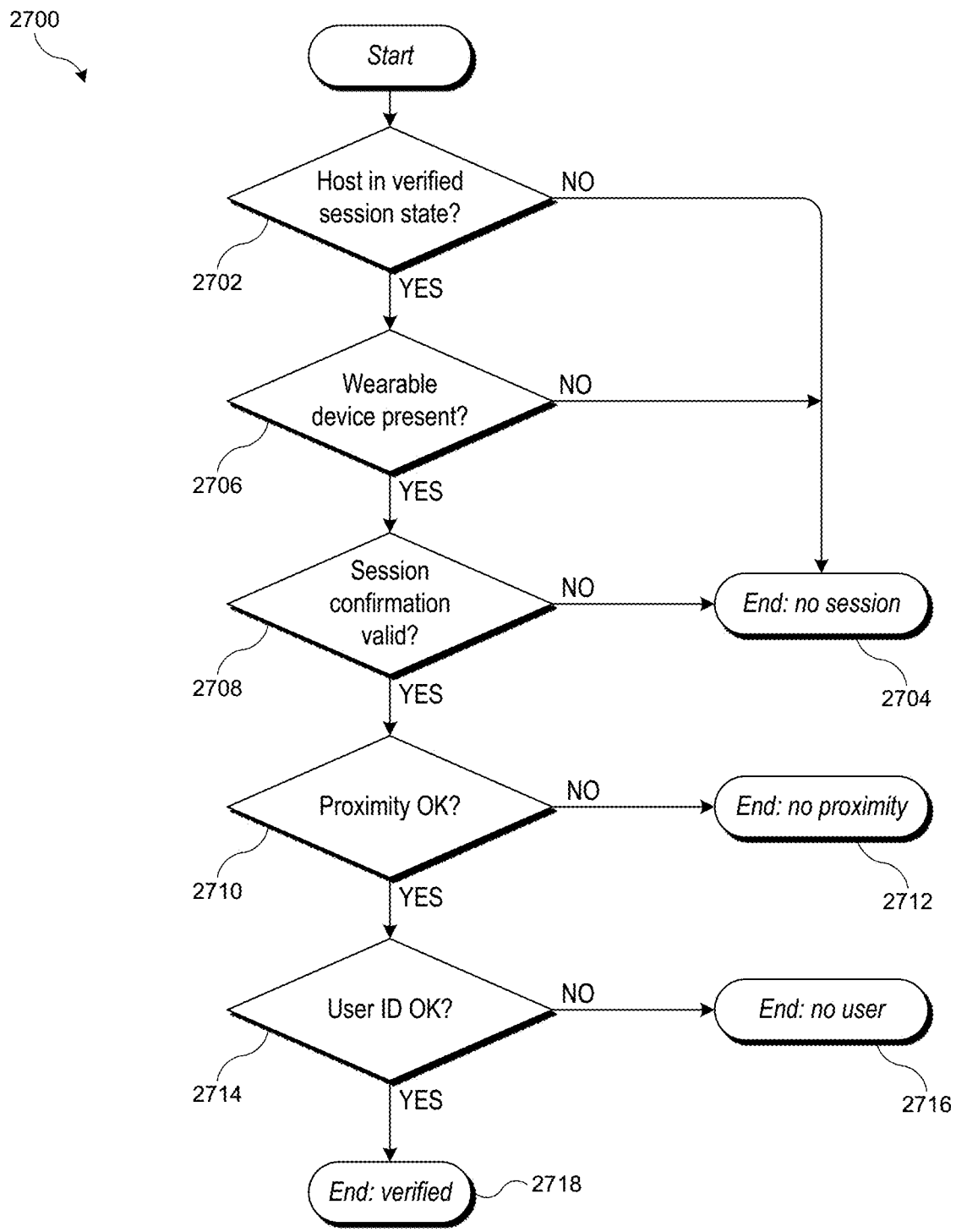
FIG. 27 is a flow diagram of a process for testing whether a verified session is in progress according to an embodiment of the present invention.

Session tester 2626 and app launcher 2624 can be implemented, e.g., as system services that can be invoked at various times by operating system 2622 or by apps executing on host device 2600 (via application-program interface (API) calls or the like). Session tester 2626 can perform various tests to determine whether a verified session is in progress at the time it is invoked. FIG. 27 is a flow diagram of a process 2700 that can be implemented in session tester 2626 according to an embodiment of the present invention.

Process 2700 can start when session tester 2626 is invoked. At block 2702, session tester 2626 can determine whether host device 2600 is currently in a state associated with a verified session with a wearable device (e.g., wearable device 100 of FIG. 1). For example, session tester 2626 can determine whether host device 2600 has a valid session key. If not, process 2700 can exit with a status indicating that no verified session is in progress at block 2704.

If host device 2600 is in a verified-session state, then at block 2706, process 2700 can determine whether the wearable device is still present (e.g., by sending a ping, listening for a heartbeat, or receiving some other communication from the wearable device). If the wearable device is not present, process 2700 can exit at block 2704 with a status indicating that no verified session is in progress.

If the wearable device is present, then at block 2708, process 2700 can perform a session confirmation with the wearable device. For example, as described above, host device 2600 can send a session confirmation request (e.g., including a random nonce) to the wearable device and receive a response (e.g., including an encrypted nonce). If the response is valid (e.g., the decrypted nonce matches the nonce that was sent), the session is confirmed. If not, process 2700 can exit at block 2704 with a status indicating that no verified session is in progress.

If a verified session is in progress, then at block 2710, process 2700 can perform a proximity test to determine whether the wearable device is within a threshold distance of host device 2600. The proximity test can be similar to proximity tests described above (e.g., estimating distance based on received signal strength and comparing estimated distance to a threshold). In some embodiments, the threshold distance can be specified as an input parameter by a calling process that invokes session-tester process 2700 (e.g., the app launcher, as described below, or an executing app), and in some instances the calling process can include a parameter value (e.g., zero or a negative number) indicating that the proximity test is waived (in which case the proximity criterion can be treated as always met without actually performing a test). If the proximity criterion is not met, process 2700 can exit at block 2712 with a status indicating that a verified session is in progress but the wearable device is not in close enough proximity.

If the proximity test at block 2710 is satisfied (or waived), process 2700 can perform a user ID check at block 2714. For example, the session confirmation response at block 2708 can include the user ID (if any) assigned to the wearable device, or process 2700 can send a separate request for the assigned user ID to the wearable device; in either case, the wearable device can provide its currently assigned user ID or a null value indicating that no user ID is currently assigned. The particular criteria used to check the user ID can be set based on input parameters from the calling process. For instance, the calling process can require that a user ID be present on the wearable device, in which case a non-null response satisfies the user ID check. As another example, the calling process can require that the user ID assigned to the wearable device match the active user ID of host 2600, and block 2714 can include comparing the user IDs. In some embodiments, the calling process can waive the user ID requirement (in which case the user ID check can be treated as always having passed without actually performing a test). If the user ID check is not passed, process 2700 can exit at block 2716 with a status indicating that the user ID check failed.

If all tests pass, process 2700 can exit at block 2718 with a status indicating that the session is verified.

As described above, process 2700 can exit with different status depending on the outcome of various tests. In some embodiments, session tester 2626 can return a report to the calling process. The report can include the exit status of process 2700 as well as other information, such as an identifier of the wearable device and/or the user ID assigned to the wearable device in instances where a verified session is in progress. Calling processes can use information from the report in further operations, e.g., to determine whether and what type of access to grant in a particular instance.

It will be appreciated that session-tester process 2700 is illustrative and that variations and modifications are possible. Steps described as sequential may be executed in parallel, order of steps may be varied, and steps may be modified, combined, added or omitted. For instance, the various tests described above can be performed in a different order or in parallel. Other tests can be added, and/or fewer tests performed.

If process 2700 exits with a status other than complete verification (block 2718), other operations of host device 2600 can be invoked. For example, if session tester 2626 reports that no verified session is in progress (block 2704), host device 2600 can update its state information to indicate that the verified session has ended. Host device 2600 can also invoke a process to attempt to create a verified session (which can include, e.g., detecting a wearable device in proximity, prompting the user to create a verified session by entering a passcode or other sign-in credential, etc.). Similarly, if session tester 2626 reports that a session is in progress but the wearable device is not in proximity, host device 2600 can prompt the user to move the wearable device closer and try again. If session tester 2626 reports that a user ID is not assigned, host device 2600 can report this condition to the user and prompt the user to assign a user ID. In some instances, host device 2600 can send a notification to the wearable device to prompt the user to move closer to the host device and/or to assign a user ID to the wearable device.

Figure 28:
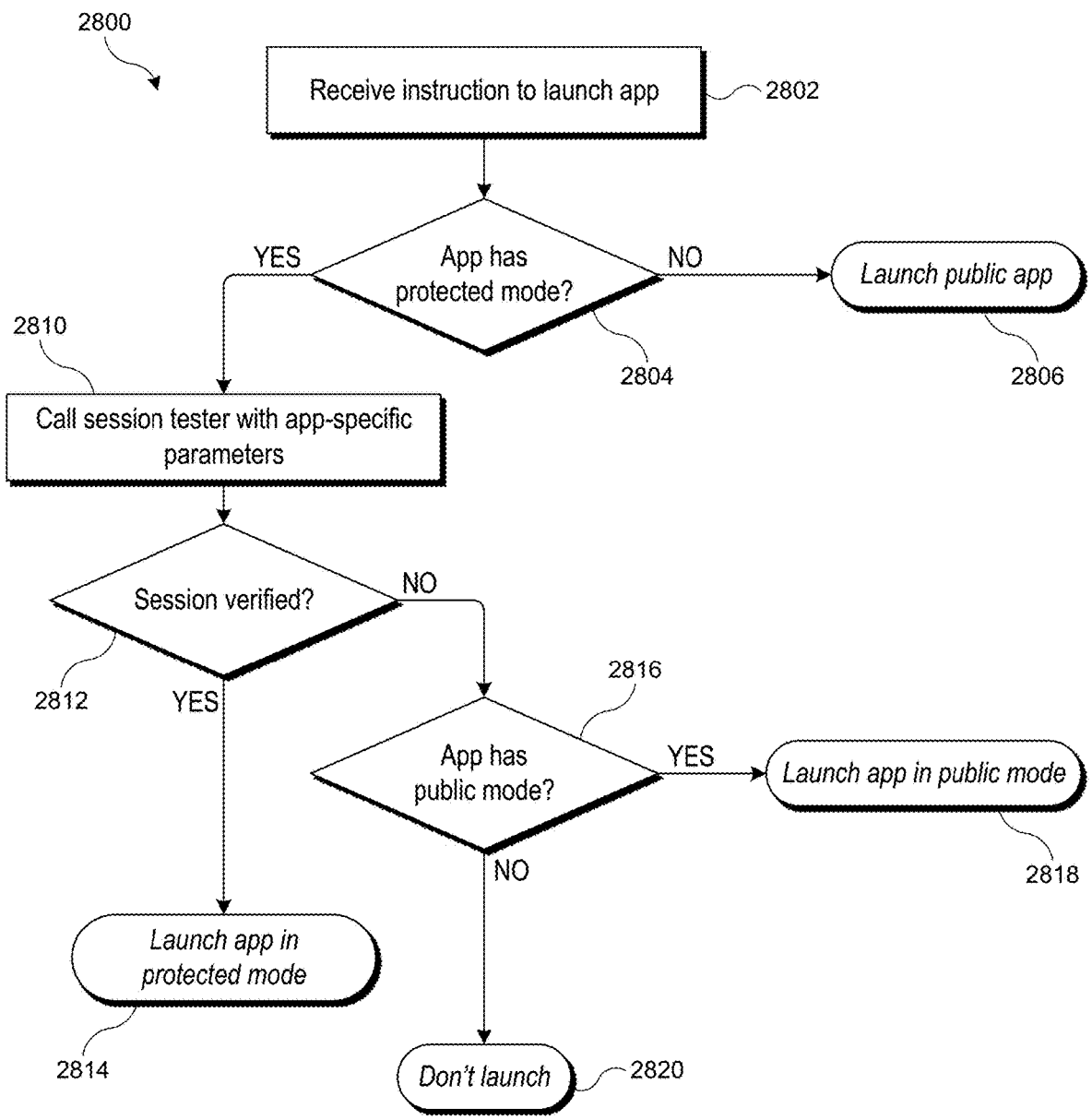
FIG. 28 is a flow diagram of a process for launching an application according to an embodiment of the present invention.

Session tester 2626 can be invoked by various calling processes. For example, app launcher 2624 can call session tester 2626 when launching an app that has a protected mode. FIG. 28 is a flow diagram of a process 2800 for launching an application according to an embodiment of the present invention. Process 2800 can be implemented, e.g., in app launcher 2624 of host device 2600 in FIG. 26.

App-launcher process 2800 can begin at block 2802, with receipt of an instruction to launch an app. The instruction can be generated by another OS process executing on host device 2600 or from another app if host device 2600 allows one app to launch another. The launch instruction can include an identifier of the app to be launched and other information, such as an identifier of the process that called process 2800.

At block 2804, process 2800 can determine whether the app has a protected mode. For instance, process 2800 can use the received app identifier to retrieve metadata for the app from metadata table 2630 of FIG. 26. As described above, the metadata for an app can include protection mode 2634. Process 2800 can make the determination at block 2804 based on a protection mode in the app's metadata or other sources of information as to protection modes for specific apps.

If the app does not have a protected mode, then at block 2806, process 2800 can launch the app (in public mode). At this point, process 2800 can exit and the app can begin execution.

If, at block 2804, the app does have a protected mode, then at block 2810, the app-launcher process can call session tester 2626 to determine whether a verified session is currently in progress. If metadata table 2630 provides protection parameters 2636 (e.g., threshold distance for proximity, user ID requirements, etc.), process 2800 can provide the protection parameters as inputs to session tester 2626.

As described above, session tester 2626 can execute process 2700 of FIG. 27 (or similar processes) and can return a report indicating whether a verified session with a wearable device is currently in progress. In some instances, the report can include a device identifier of the wearable device and/or a user ID assigned to the wearable device.

At block 2812, process 2800 can receive the report from session tester 2626. If the report indicates that a verified session is in progress, then at block 2814, process 2800 can launch the app in the protected mode. If, at block 2812, the report indicates that a verified session is not in progress, then at block 2816, process 2800 can determine whether the app has a public mode (e.g., based on metadata from table 2630). If so, then at block 2818, the app can be launched in public mode. If not, process 2800 can exit at block 2820 without launching the app.

In some embodiments, process 2800 can include alerting the user if an app with a protected mode is launched in public mode or if an app that has only a protected mode is not launched due to the absence of a verified session. The user can be prompted to create a verified session and try again. When process 2800 launches an app that has both public and protected modes, process 2800 can pass a parameter to the app to indicate which mode was launched.

It will be appreciated that the app-launcher process is illustrative and that variations and modifications are possible. Steps described as sequential may be executed in parallel, order of steps may be varied, and steps may be modified, combined, added or omitted. For instance, an app launcher can also apply other conditions prior to launching an app, such as making sure needed system resources (e.g., memory, interface devices, network resources, data files, etc.) are available.

Processes such as those described above can provide security for an app, for instance by ensuring that a wearable device is present and in a verified session when the app is launched. In some embodiments, an app can operate in public or protected mode based solely on the mode selected by the app launcher.

Figure 29:
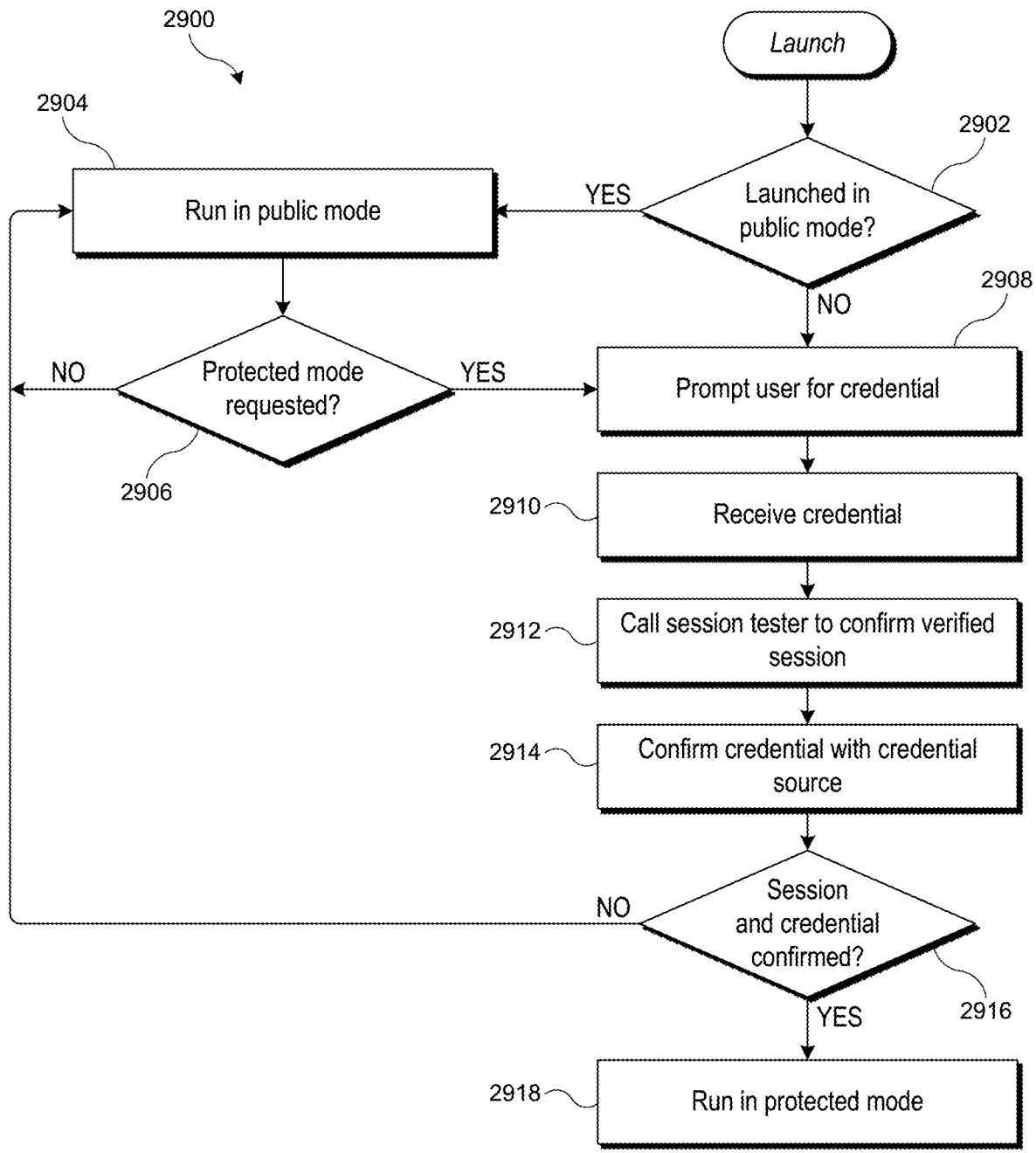
FIG. 29 is a flow diagram of a security process according to an embodiment of the present invention.

In some embodiments, apps can also implement additional post-launch security features that can be based at least in part on the presence of a wearable device such as wearable device 100 of FIG. 1. FIG. 29 is a flow diagram of a security process 2900 that can be implemented in an app (e.g., any of the apps corresponding to icons 2604-2609 of FIG. 26) according to an embodiment of the present invention. In this example, it is assumed that the app has both a public mode and a private mode.

Process 2900 can begin, e.g., when the app is launched. At block 2902, the app can determine whether it is in public or protected mode (e.g., based on an indicator provided by app launcher 2624 as a result of process 2800). If the app was launched in public mode, then at block 2904, operation in public mode can begin. In some embodiments, an app launched in public mode remains in public mode until it terminates. In the embodiment shown in FIG. 29, the app can provide an option to switch from public mode to protected mode. This can be, for example, a user interface control that explicitly directs the switch (e.g., "run in protected mode" can be provided as a menu item), or the switch can happen in response to some other user action such as attempting to access a functionality that is only available in protected mode. At block 2906, the app can detect whether an event triggering a switch to protected mode has occurred; if not, the app can continue executing in public mode at block 2904.

At block 2908, the app attempts to enter private mode (either at launch from block 2902 or in response to a mode-switching trigger at block 2906). In this example, the app uses a user-entered security credential (such as a username and/or password) to protect private-mode functionality. The "correct" credential for a given user or host device can be maintained locally to the app (e.g., stored on local storage of host device 2600) or at a remote server with which the app communicates. For example, in the case of a banking app, the credential can include a username and password associated with the user by an online banking service provided by the user's bank. Other credentials can be used.

Accordingly, at block 2908, the app can prompt the user for the credential, and at block 2910, the app can receive a credential entered by the user. At block 2912, the app can call session tester 2626 to determine whether the verified session with the wearable device is still in progress. It should be noted that receiving the credential at block 2910 can be remote in time from when the app was launched; accordingly, even if the app initially launched in protected mode, it may be desirable to run the session test again. Further the session test at block 2626 can use different parameters from the test that was run by the app launcher (e.g., a closer threshold distance in the proximity test). At block 2914, the app can confirm the credential with a credential source, e.g., by comparing the credential obtained at block 2908 to a locally stored credential or by transmitting the credential to a remote server. In some instances, session confirmation at block 2912 and credential confirmation at block 2914 can occur concurrently.

At block 2916, the app can determine whether the session confirmation and the credential confirmation both succeeded. If so, then at block 2918, the app can enter protected mode and allow the user to access protected functionality. In some embodiments, an app running in protected mode can call session tester 2626 periodically or in an event-driven manner to confirm that the verified session remains in progress and can switch to public mode or terminate entirely if an end of the verified session is detected.

If, at block 2916, one or both of the session confirmation or the password verification failed, then at block 2904, the app can run in public mode. In some embodiments, the app can generate an alert to the user indicating that the attempt to enter protected mode failed and optionally the reason (e.g., incorrect password, wearable device not present), and the user can be prompted to retry. A retry can be processed as a request to enter protected mode at block 2906, and the number of retries can be limited if desired. In some embodiments, a failed attempt to enter protected mode can cause the app to terminate.

It will be appreciated that process 2900 is illustrative and that variations and modifications are possible. Steps described as sequential may be executed in parallel, order of steps may be varied, and steps may be modified, combined, added or omitted. For example, if an app does not have a public mode, the app can prompt the user for a password on launch and allow no other interaction unless protected mode is successfully entered at block 2918. Similar processes can be implemented at any point within an app to provide a desired degree of confidence that an authorized user is present and/or operating the host device on which the app is executing.

In some embodiments, a credential to be confirmed by a credential source can incorporate an element that is provided by or derived from information provided by the wearable device in addition to an element that is obtained independently of the wearable device (e.g., a password entered into a user interface of host device 2600). For example, as described above, session tester 2626 can return a report that includes a device identifier of the wearable device (if a verified session is in progress) and/or an assigned user identifier of the wearable device (if a verified session is in progress and the wearable device has an assigned user ID). The app can compare either or both of these identifiers to a set of authorized identifiers maintained at the credential source (which can be local or remote as described above), and access to some or all app functionality can be restricted based on the presence or absence of an authorized wearable device as determined from the device identifier and/or the assigned user identifier in combination with a user-entered credential. Where an app maintains a list of authorized identifiers, a user can have a device identifier or user identifier added to the list, e.g., by providing the device identifier or user identifier to a remote server through an interface separate from the app, such as an account-setup interface provided at a website affiliated with the provider of the app. The app can obtain the authorized-user and/or authorized device information from the remote server, for example during credential confirmation, or the app can send the user and/or device identifiers to the remote server for confirmation.

Embodiments described above allow a host device and a wearable device to establish a verified session and further allow apps executing on the host device to make some or all of their operations conditional on the presence of a wearable device in a verified session, with additional proximity constraints, constraints on device and/or user identifiers of the wearable device, and/or other constraints as desired. Apps having a protected mode can be provided by a maker of a particular host device and/or third parties; session-testing capabilities can be made accessible to any app (including third-party apps), e.g., via an API call. Thus, the security measures to be imposed can be varied for different apps and/or for different functionalities within an app.

In examples described above, a verified session can be established when the user successfully unlocks the host device (by entering a passcode or other credential) while wearing the wearable device in close proximity to the host device. In some instances, a user may want to establish a verified session while the host device is already unlocked; for instance, the user may put on the wearable device in order to obtain access to a protected application or to protected functionality within a currently-executing application. Using processes described above, a user can establish the session, e.g., by locking the host device, then unlocking it again while wearing the wearable device.

Figure 30:
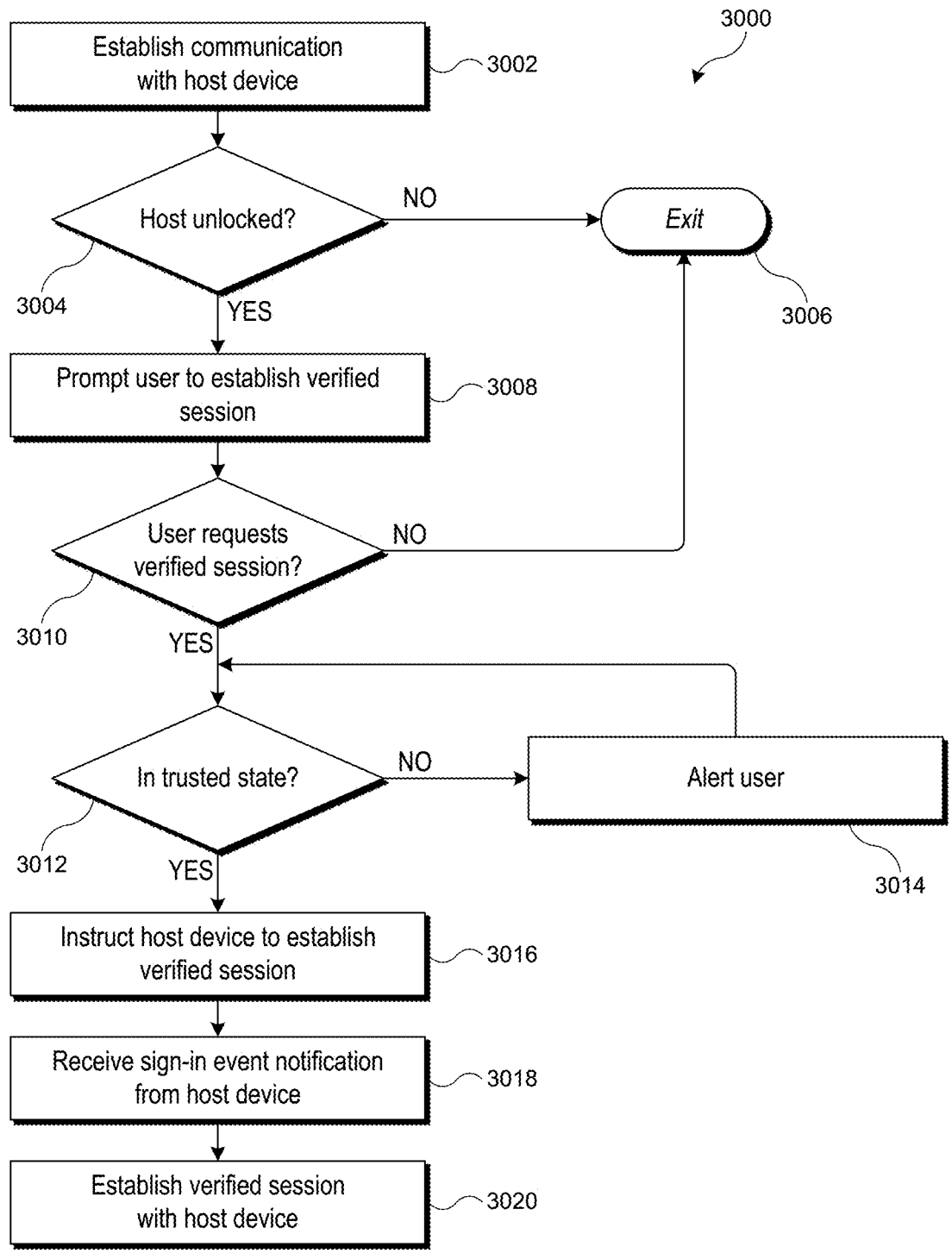
FIG. 30 is a flow diagram of a process for establishing a verified session with an unlocked host device according to an embodiment of the present invention.

Some embodiments can also provide an option to establish a verified session without locking and unlocking the host device. For example, if the user puts on the wearable device while the host device is unlocked, the wearable device can communicate with the host device to determine that the host device is unlocked and can prompt the user to establish a verified session with the host device. FIG. 30 is a flow diagram of a process 3000 for establishing a verified session with an unlocked host device according to an embodiment of the present invention. Process 3000 can be implemented in a wearable device, e.g., wearable device 100 of FIG. 1, communicating with a host device, e.g., host device 102 of FIG. 1 or host device 2600 of FIG. 26. In some embodiments, the implementation of process 3000 can include program code executed by a processor of wearable device 100 (e.g., as part of host security program 260 of FIG. 2).

At block 3002, process 3000 can detect a paired host device and establish an unverified communication session with the detected host device. As described above, in some embodiments, establishing an initial pairing may involve user interaction with one or both devices to confirm that the pairing should be established. Once the initial pairing is established, the two devices can automatically reconnect to each other (without further user intervention) any time they come within communication range and are operating their respective RF transceivers. In the embodiment shown in FIG. 30, wearable device 100 can ignore a host device with which a pairing has not yet been established; in other embodiments, a pairing process can be invoked if an unpaired host device is detected.

At block 3004, process 3000 can determine whether the host device is unlocked, e.g., by sending a status request message to the host device and receiving a response. If the host device is locked, process 3000 can exit at block 3006 or wait until the host becomes unlocked. If the host device is unlocked, then at block 3008, process 3000 can prompt the user to establish a verified session with the host device, e.g., by presenting a message on display 105 of wearable device 100 and providing response buttons operable by the user to indicate whether to proceed or cancel. At block 3010, process 3000 can receive the user's response (e.g., a selection of a response button). If the user chooses not to establish a verified session, process 3000 can exit at block 3006.

If the user chooses to establish a verified session, then at block 3012, wearable device 100 can determine whether it is in a trusted state; this can be similar or identical to block 1710 of process 1700 described above. If wearable device 100 is not in a trusted state, then at block 3014, wearable device 100 can prompt the user to make adjustments (e.g., getting closer to the host device) and return to block 3012 to determine whether it is now in a trusted state. In some embodiments, process 3000 can exit if a trusted state is not established within a timeout period (e.g., 5 seconds or 10 seconds or the like) or after some number of attempts (e.g., 5 or 10 attempts).

Once a trusted state is established, at block 3016, wearable device 100 can send a message instructing the host device to establish a verified session. As described below, a host device can respond to this message by prompting the user to enter a sign-in credential. Assuming the user enters a correct credential, at block 3018, wearable device 100 can receive a sign-in event notification from the host device. At block 3020, wearable device 100 can establish the verified session; this can be similar or identical to block 1714 of process 1700 described above. After the verified session is established, interoperation of wearable device 100 with the host device can proceed as described above.

Figure 31:
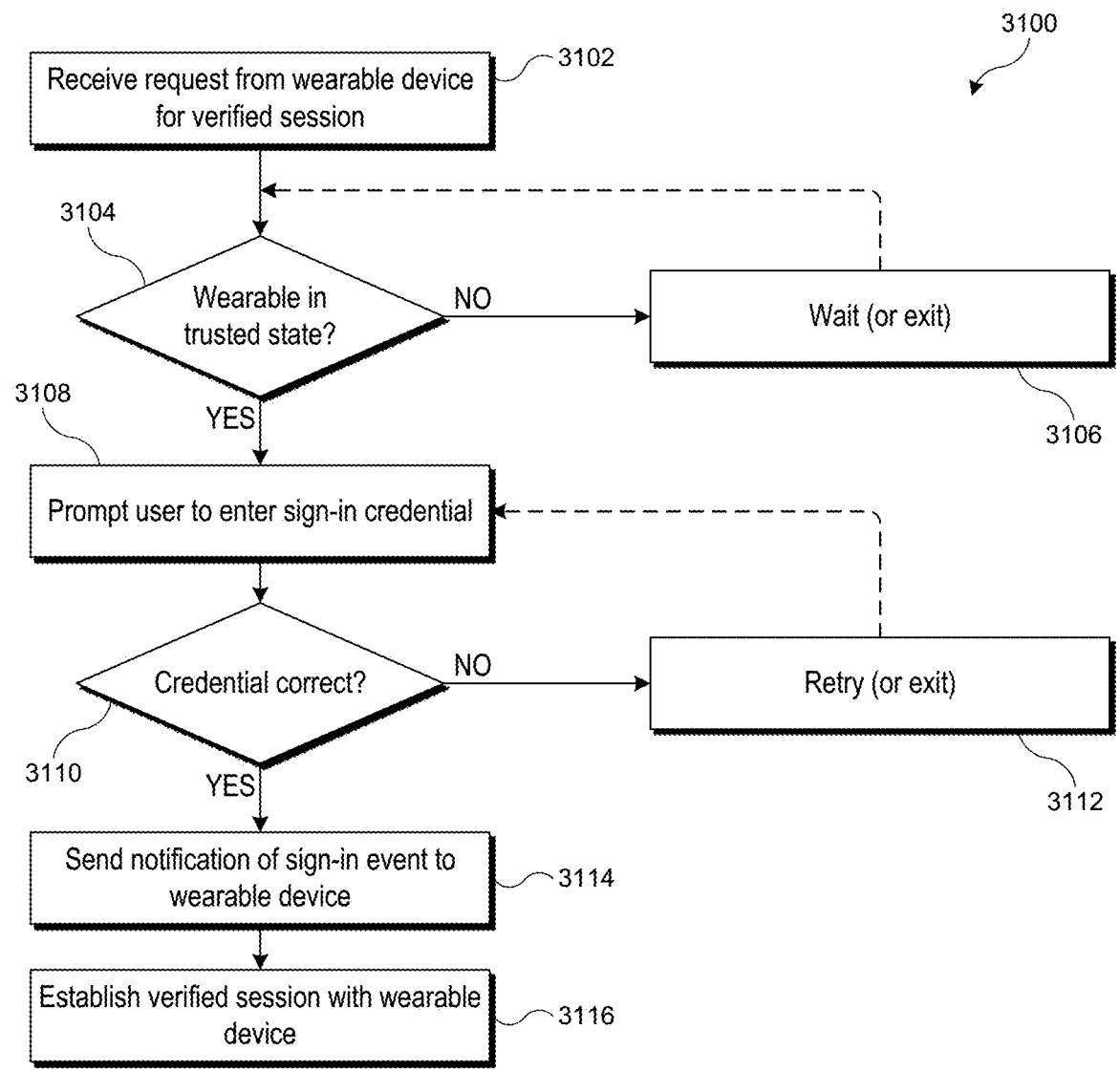
FIG. 31 is a flow diagram of a process for establishing a verified session with a wearable device according to an embodiment of the present invention.

FIG. 31 is a flow diagram of a process 3100 for establishing a verified session that can be executed in an unlocked host device, e.g., host device 102 of FIG. 1 (or host device 2600 of FIG. 26), according to an embodiment of the present invention. In some embodiments, the implementation of process 3100 can include program code executed by a processor of host device 102.

Process 3100 can begin at any time when an unlocked host device 102 is in communication with a (paired) wearable device. At block 3102, host device 102 can receive an instruction from the wearable device to establish a verified session. In response, at block 3104, host device 102 can determine whether the wearable device is in a trusted state (e.g., similarly to block 1908 of FIG. 19 described above). If not, process 3100 can wait at block 3106 for a trusted state to be established; as with process 3000, process 3100 can exit if a trusted state is not established within a timeout period (e.g., 5 seconds, 10 seconds, or the like) or after some number of attempts (e.g., 5 or 10 attempts).

Once a trusted state is established, at block 3108, host device 102 can prompt the user to enter a sign-in credential (e.g., a passcode). For example, host device 102 can present a pop-up window or overlay asking the user to enter the credential in order to verify the wearable device. In some embodiments, the user can have the option to dismiss the window, in which case process 3100 can exit without establishing a verified session.

At block 3110, process 3100 can determine whether the correct credential was entered. If not, then at block 3112, process 3100 can determine whether to retry (returning to block 3108) or exit. If the credential is correct, then at block 3114, host device 102 can send a sign-in event notification to wearable device 100; this can be similar or identical to the notification sent at block 1910 of FIG. 19. At block 3116, host device 102 can establish a verified session with the wearable device; this can be similar or identical to block 1912 of FIG. 19. After the verified session is established, operation of host device 102 can proceed as described above. In some embodiments, host device 102 can close the pop-up window and return to an operation that was in progress when process 3100 began (e.g., executing an app or the like).

It will be appreciated that processes 3000 and 3100 are illustrative and that variations and modifications are possible. Steps described as sequential may be executed in parallel, order of steps may be varied, and steps may be modified, combined, added or omitted. In some embodiments, host device 102 rather than wearable device 100 can prompt the user to establish a verified session when a trusted wearable device becomes present. The prompts on either device can include an identifier of the other device, to avoid inadvertently establishing verified sessions the user does not want. In the example described above, a user is prompted to establish a verified session only if the host device and wearable device have already been paired (e.g., using Bluetooth pairing procedures or other processes in which a user confirms that the two devices should communicate with each other). This can avoid the user being prompted every time a compatible host or wearable device passes close by (as may happen frequently, e.g., in crowded environments).

Other events can also be used to trigger an attempt to establish a verified session. For example, if a user launches an app that has a protected mode while a wearable device is in a trusted state, the host device can attempt to establish a verified session with the wearable device (e.g., in response to the app launcher determining that a verified session is not in progress). A host device or wearable device can also include a control operable by a user to initiate establishment of a verified session, e.g., in a menu of system functions.

A host device can make use of verified sessions in any manner desired. For example, a host device that uses verified sessions to provide app security as described herein might or might not also use a verified session to bypass a sign-in procedure when transitioning from locked to unlocked state. As another example, one protected-mode functionality of an app or system process executing on a host device can relate to transferring sensitive information from the host device to the wearable device (or vice versa). A request to transfer sensitive data can originate from the host device or the wearable device, and the response to the request can be made conditional on whether a verified session is in progress.

Where verified sessions are supported, a host device can run a session monitoring process that periodically calls the session tester (or a similar system service) to determine whether the verified session is still in progress. For example, the host device can maintain state registers indicating whether a verified session is in progress and providing other information such as the session key, an identifier of the wearable device and/or the assigned user ID of the wearable device, and the session monitoring process can update these registers. In some embodiments, if the session monitoring process detects the end of a verified session or any discrepancy between the information in the state registers and information reported by the session tester, the session monitoring process can generate a system-level interrupt. In response to the interrupt, the host device can terminate any apps that are running in protected mode (or force an app into public mode if the app has a public mode); alternatively, the host device can notify the app that the verified session has ended, and the app can determine whether to terminate, switch to public mode, or continue.

While the invention has been described with respect to specific embodiments, one skilled in the art will recognize that numerous modifications are possible and that components, operations, and/or other features that may be described with respect to different embodiments can be incorporated into the same embodiment. Wearable devices can interact with host devices to facilitate a variety of operations with increased convenience to the user.

All user interfaces shown herein are also illustrative. Sizes of user interfaces or graphical elements thereof can be modified according to a particular desired form factor of a wearable device and/or host device. Icons can be used in addition to or instead of text to identify associated functions, and the number and arrangement of controls can be varied to facilitate user operation. In some embodiments, the user may be able to scroll the display, e.g., by dragging one or two fingers along the surface of a touchscreen display to see more options than can be presented at once. Further, while the foregoing description may refer to graphical user interfaces, other interfaces can also be used. For example, an audio input interface can be provided by allowing the user to speak into a microphone of a wearable device; the wearable device can interpret the audio signal locally to determine a corresponding instruction or send the audio to a host device for interpretation. Similarly, an audio output interface can be provided by using a speaker on the wearable device to produce sounds. The sounds can include tones (beeps, whirrs, etc.) and/or speech sounds; for example, synthesized speech can be generated on a host device and transmitted to the wearable device as a digital audio signal, or the wearable device can include its own speech synthesizer. In some embodiments where a wearable device is worn on the user's hand, wrist, or arm, user input can include spatial gestures with the hand, wrist, and/or arm that are detected using motion sensors of the wearable device in addition to or instead of touch gestures involving contact with a touch-sensitive surface of the wearable device. Different gestures can be assigned different meanings, and the meaning of a gesture can be context-dependent, e.g., depending on what operations of the host device and/or wearable device are currently in progress. Thus, the same gesture can, in different contexts, indicate hanging up a call or stopping playback of a media track. Touch gestures and spatial gestures can be used in various combinations as desired.

The foregoing description may make reference to specific examples of a wearable device (e.g., a wrist-worn device) and/or a host device (e.g., a smart phone). It is to be understood that these examples are illustrative and not limiting; other devices can be substituted and can implement similar functional blocks and/or algorithms to perform operations described herein and/or other operations.

Embodiments of the present invention, e.g., in methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A wearable device, comprising:
  a memory configured to store computer-executable instructions;
  a touch-screen display; and
  a processor configured to access the memory and execute the computer-executable instructions to at least:
    detect that the wearable device is being worn by a user;
    while the wearable device is in a first position with respect to the user:
      maintain a backlight of the touch-screen display in an off-state; and
      determine, based at least in part on sensor data from one or more sensors of the wearable device, that the wearable device has moved from the first position with respect to the user to a second position where the touch-screen display is viewable by the user;
    in accordance with the determination that the wearable device has moved from the first position to the second position:
      maintain the backlight of the touch-screen display in the off-state; and determine that the wearable device has been rotated to a third position where the touch-screen display is substantially facing the user and is substantially at a same height as the second position; and in accordance with the determination that the wearable device has been rotated from the second position to the third position, transition the backlight of the touch-screen display of the wearable device to an on-state.

2. The wearable device of claim 1, wherein detecting that the wearable device is being worn by the user comprises receiving information, from at least a second sensor, indicative that the wearable device is being worn.

3. The wearable device of claim 1, wherein the second position comprises a location wherein the touch-screen display is not viewable by the user.

4. The wearable device of claim 1, wherein the third position comprises a location wherein the touch-screen display is oriented towards the user.

5. The wearable device of claim 1, wherein the first position and the second position comprise locations wherein the touch-screen display is not viewable by the user.

6. The wearable device of claim 1, wherein the first position and the second position comprise locations wherein the touch-screen display is oriented away from the user.

7. The wearable device of claim 1, wherein the one or more sensors comprises at least one of an accelerometer sensor or a gyroscope sensor.

8. The wearable device of claim 1, wherein the wearable device is viewable by the user in the first position.

9. A method of operating a wearable device with one or more sensors and a touch-screen display, comprising:

detecting that the wearable device is being worn by a user;

while the wearable device is in a first position with respect to the user:
maintaining a backlight of the touch-screen display in an off-state; and
determining, based at least in part on sensor data from one or more sensors of the wearable device, that the wearable device has moved from the first position with respect to the user to a second position that is viewable by the user;

in accordance with the determination that the wearable device has moved from the first position to the second position where the touch-screen display is viewable by the user:
maintaining the backlight of the touch-screen display in the off-state; and
determining that the wearable device has been rotated to a third position where the touch-screen display is substantially facing the user and is substantially at a same height as the second position; and in accordance with the determination that the wearable device has been rotated from the second position to the third position, transitioning the backlight of the touch-screen display of the wearable device to an on-state.

10. The method of claim 9, wherein detecting that the wearable device is being worn by the user comprises receiving information, from at least a second sensor, indicative that the wearable device is being worn.

11. The method of claim 9, wherein the third position comprises a location wherein the touch-screen display is oriented towards the user.

12. The method of claim 9, wherein the wearable device being rotated from the second position to the third position corresponds to the touch-screen display of the wearable device being rotated into a line of sight of the user.

13. A wearable device, comprising:
a memory configured to store computer-executable instructions;
a touch-screen display; and
a processor configured to access the memory and execute the computer-executable instructions to at least:
detect that a user is wearing the wearable device;
while the wearable device is in a first position with respect to the user:
maintain a backlight of the touch-screen display in an off-state; and
detect a first event that indicates that the user has moved the wearable device from the first position with respect to the user to a second position where the touch-screen display is viewable by the user;
while the wearable device is in the second position with respect to the user:
maintain the backlight of the touch-screen display in the off-state; and
detect a second event that indicates that the user has rotated the wearable device from the second position with respect to the user to a third position where the touch-screen display is substantially facing the user and is substantially at a same height as the second position; and
transition the backlight of the touch-screen display of the wearable device to an on-state in accordance with the second event.

14. The wearable device of claim 13, wherein the second event comprises the wearable device being rotated, on an arm of the user, from the second position to the third position.

15. The wearable device of claim 13, wherein the first position comprises a location wherein the touch-screen display is not viewable by the user.

16. The wearable device of claim 13, wherein the processor is further configured to execute the computer-executable instructions to at least determine, using one or more motion sensors that are accessible to the processor, that the wearable device is being worn by the user.

17. The wearable device of claim 16, wherein the processor is further configured to execute the computer-executable instructions to only transition the backlight of the touch-screen to the on-state when the wearable device is being worn by the user.

18. The wearable device of claim 13, wherein the second position comprises a location wherein the wearable device is viewable by the user and the touch-screen display is not viewable by the user.

19. The wearable device of claim 13, wherein the touch-screen display of the wearable device is not within view of the user in the first position or the second position.

20. The wearable device of claim 13, wherein the touch-screen display of the wearable device is within view of the user in the third position.

* * * * *